US009143541B1

(12) United States Patent
Szamonek et al.

(10) Patent No.: US 9,143,541 B1
(45) Date of Patent: Sep. 22, 2015

(54) SYSTEMS, COMPUTER-IMPLEMENTED METHODS, AND COMPUTER-READABLE MEDIA TO TARGET INTERNET-BASED SERVICES ON A GEOGRAPHIC LOCATION

(71) Applicant: GOOGLE Inc., Mountain View, CA (US)

(72) Inventors: Zoltan Szamonek, Zurich (CH); Krzysztof Duleba, Pfaffikon (CH)

(73) Assignee: GOOGLE INC., Mountain View, CA (US)

( * ) Notice: Subject to any disclaimer, the term of this patent is extended or adjusted under 35 U.S.C. 154(b) by 488 days.

(21) Appl. No.: 13/679,590

(22) Filed: Nov. 16, 2012

Related U.S. Application Data

(60) Provisional application No. 61/561,000, filed on Nov. 17, 2011.

(51) Int. Cl.
*G06F 15/16* (2006.01)
*H04L 29/06* (2006.01)

(52) U.S. Cl.
CPC .................................. *H04L 65/403* (2013.01)

(58) Field of Classification Search
CPC ... H04L 43/08; H04L 43/062; H04L 43/0876; H04L 67/18; H04L 67/1097; H04L 67/7095; H04L 67/26; H04L 67/1014; H04L 67/1021; H04L 67/1023; H04L 67/16; H04L 29/08468; H04L 45/04; H04L 51/28; H04L 12/2697; H04L 12/2803; H04L 12/2809; H04L 12/2856; H04L 12/287; H04L 47/78; H04L 61/1541; G06F 17/30864; G06F 17/3053; G06Q 30/02; G06Q 30/0261; G06Q 30/0277; H04W 4/02; H04W 4/18; H04W 4/023

USPC .......... 709/204, 220–228, 238, 245; 707/3–5, 707/722, 723, 754, 768, 830
See application file for complete search history.

(56) References Cited

U.S. PATENT DOCUMENTS

| 6,684,250 | B2 |   | 1/2004 | Anderson et al. |
|---|---|---|---|---|
| 7,805,450 | B2 |   | 9/2010 | Santi et al. |
| 8,478,701 | B2 | * | 7/2013 | Murdock et al. ................. 706/12 |
| 2003/0009594 | A1 |   | 1/2003 | McElligott |
| 2003/0074471 | A1 | * | 4/2003 | Anderson et al. ............. 709/245 |
| 2008/0005071 | A1 |   | 1/2008 | Flake et al. |

(Continued)

*Primary Examiner* — Oscar Louie
*Assistant Examiner* — Da T Ton
(74) *Attorney, Agent, or Firm* — Marshall, Gerstein & Borun LLP

(57) ABSTRACT

Systems, computer-implemented methods, and computer-readable media are provided to target internet-based services on a geographic location relating to a plurality of candidate geographic locations. A targeted geographic location may be provided based on usefulness, to a user probabilistically located among the plurality of candidates, of internet-based services being targeted thereon. From a first server, a plurality of candidate geographic locations may be obtained, each of which may be associated with a client IP address and a plurality of candidate confidence levels. A plurality of route-utility factors for each respective candidate geographic location, a plurality of probabilistic utility scores for each respective candidate geographic location, and an aggregate probabilistic utility score may be determined for each candidate geographic location. Further, a geographic location having an aggregate probabilistic utility score satisfying preselected criteria may be selected and transmitted to a second server so that geographically-targeted internet-based services can be provided.

20 Claims, 21 Drawing Sheets

(56) References Cited

U.S. PATENT DOCUMENTS

| | | |
|---|---|---|
| 2008/0086368 A1 | 4/2008 | Bauman et al. |
| 2009/0006190 A1 | 1/2009 | Lucash et al. |
| 2009/0248663 A1 | 10/2009 | Maniyar et al. |
| 2009/0327286 A1* | 12/2009 | Ge et al. .......... 707/5 |
| 2010/0049609 A1 | 2/2010 | Zhao et al. |
| 2010/0174703 A1 | 7/2010 | Dandekar et al. |
| 2010/0287178 A1 | 11/2010 | Lambert et al. |

* cited by examiner

SYSTEMS, COMPUTER-IMPLEMENTED METHODS, AND COMPUTER-READABLE MEDIA TO TARGET INTERNET-BASED SERVICES ON A GEOGRAPHIC LOCATION

RELATED APPLICATIONS

This application relates to, claims priority to, and claims the benefit of U.S. Provisional Patent Application Ser. No. 61/561,000, titled "Systems, Computer-Implemented Methods, and Computer-Readable Media to Target Internet-Based Services on a Geographic Location," filed Nov. 17, 2011, and is incorporated herein by reference in its entirety.

BACKGROUND

1. Technical Field

The invention disclosed herein generally relates to internet-based services, and it more particularly relates to providing internet-based services according to a potential geographic location of a user.

2. Description of the Related Art

The Internet is a global system of interconnected computer networks serving billions of users worldwide. It is a network of networks that consists of millions of different networks of local and global scope (e.g., including private, public, academic, business, and government networks), which are linked by a broad array of electronic networking technologies including wired (e.g., copper cable, fiber optic, etc.) and wireless (e.g., radio-frequency, optical, etc.) technologies, using the standard Internet Protocol Suite (TCP/IP). Data transmitted (e.g., carried) over the Internet relates to a vast range of information resources and services, such as the interlinked hypertext documents (e.g., web pages) of the World Wide Web (WWW). Services available on the Internet (or connected to the Internet) to provide or process information are referred to herein as "internet-based services," and human beings interacting with or otherwise using internet-based services are referred to herein as "users."

Various internet-based services may relate to the physical world of users, including, for example, internet-search services (e.g., provided by search engines), social-networking services (e.g., provided by social networks), electronic-commerce services (e.g., provided by online retailers), publishing services (e.g., provided by online publishers), electronic mail services, and so on. One way in which internet-search services may relate to the physical world of users, for example, is that users may intend to interact with resources in the physical world relating to the results of internet search (e.g., a user may desire to visit restaurants that appear in the search results for an internet search directed to "restaurants").

Some internet-based services provided with specific relevance to a geographic location can be said to be "targeted" on a particular geographic location (a "targeted geographic location"). Various attempts in the art have been made to identify a targeted geographic location that is the likely geographic location of a user. In some circumstances, providers of internet-based services can be informed of the geographic location of a user by receiving an unambiguous indication of the user's geographic location. For example, a subscriber to an internet-based service can create a profile for the internet-based service, which can specify the user's geographic location in various degrees of detail (e.g., time zone, country, state/province, county, city, postal code, dialing code, etc.). By way of further example, a subscriber to an internet-based service may create a profile indicating that the subscriber is in Palo Alto, Calif.; and the internet-based service provider deliver advertisements to the subscriber targeting the Palo Alto, Calif. market. Many providers of internet-based services, however, do not or cannot always receive such an unambiguous indication of the user's geographic location. As a result, internet-based services may be not targeted, or internet-based services may be mistakenly targeted.

So-called geolocation services are known to estimate or ascertain one or more geographic location of a computer device (e.g., a time zone, country, state/province, county, city, postal code, dialing code, etc.). So-called IP-geolocation services are known to do the same based on an internet address (e.g., an IP address) of the computing device. For example, a user accessing the internet from a computer on a university computer network in Palo Alto, Calif. may use an IP address relating to the geographic locations "Palo Alto" [city] or "94305" [postal code]; and search services targeted on either of those geographic locations may to yield search results related to (e.g., located in or near) the city of Palo Alto or, more particularly, the postal code 94305.

One particular disadvantage of IP-geolocation services is that internet addresses can relate to more than one geographic location, some of which may be geographically remote (e.g., San Francisco, Calif. and Los Angeles, Calif.) or geographically broad (e.g., California). Conventional geolocation services relating an internet address to more than one geographic location can provide confidence levels associated therewith. Accordingly, for any one internet address, IP-geolocation services may return a plurality of "candidate geographic locations," and a confidence level for each, e.g., a plurality of candidate geographic location confidence levels or, simply, "candidate confidence levels." In some examples of the prior art, candidate confidence levels can reflect probability values that a user (who is associated with an internet address) is physically located in or near a particular candidate geographic location. Further, in some examples of the prior art, a candidate confidence level for a particular candidate geographic location can reflect a relative probability that the user is physically located in or near the particular candidate geographic location, over all other candidate geographic locations of the plurality of candidate geographic locations. In certain examples in the prior art, internet-based services have been targeted on a candidate geographic location that is most likely (e.g., according to a relative probability) to be that which the user is located in or near ("probabilistic locality").

SUMMARY

Applicants recognize disadvantages of examples of prior-art techniques targeting internet-based services based on probabilistic locality. For example, a probabilistic locality may be disadvantageously remote (e.g., in distance, time, cost, etc.) from the actual positional location of the user. Also, for example, a probabilistic locality may have a disadvantageously coarse resolution (e.g., at the state or country level rather than the city level), including geographic locations that are physically remote from the positional location of the user. Such disadvantages may be acute, for example, when several candidate geographic locations having lower candidate confidence levels are physically proximate (e.g., Palo Alto, Calif. at %30 and Mountain View, Calif. at %30), and a more remote candidate geographic location has a higher candidate confidence level (e.g., San Francisco, Calif. at %40). For example, if the positional location of the user is at or near Palo Alto or Mountain View (which are more proximate to each other than either is to San Francisco), internet-based services targeted on either Palo Alto or Mountain view may be more useful to the user than internet-based services targeted on San Francisco.

Of the plurality of candidate geographic locations, if San Francisco is targeted based on having the greatest probabilistic locality (with a candidate confidence level of %40), users at or near Palo Alto or Mountain View may be disadvantaged—even though users are more likely to be in either Palo Alto or Mountain View (both having a combined candidate confidence level of %60) than in San Francisco (%40). Rather than clustering Mountain View and Palo Alto into a geographic location having a coarser resolution (e.g., Silicon Valley), embodiments can allow, for example, either Mountain View or Palo Alto to be selected based on which geographic location has a greater utility score.

Applicants recognize that internet-based services can be enhanced by targeting a geographic location that is most likely to be useful to the user (which can be referred to as the "utility" of the targeted geographic location). In one example, utility can be estimated to decrease according to an increase in distance between the targeted geographic location and the positional location of the user. That is, in the above example, search results targeted on geographic locations that are more remote from the positional location of the user may be less useful (i.e., producing a lower utility for the targeted location) than search results targeted on a geographic location that is more proximate to the positional location of the user. Applicants further recognize that factors other than remoteness can affect the utility of a targeted geographic location, such as factors relating to the positional location of a user, factors relating to a targeted geographic location, or factors relating to both the positional location of the user and the targeted geographic location.

Although the positional location of the user may not be known with 100% confidence, each of the candidate geographic locations can serve as a proxy for a probabilistic positional location of the user according to the corresponding candidate confidence level ("a probabilistic user location"). Therefore, a probabilistic utility score can be determined for a particular geographic location with respect to the user being assumed to be at one of the probabilistic user locations. Also, therefore, an aggregate probabilistic utility score can be determined for a particular geographic location with respect to all of the probabilistic user locations (e.g., recognizing that the user is probabilistically located among the probabilistic user locations according to the candidate confidence levels).

Embodiments of the present invention include systems, methods, and computer readable media to identify a targeted geographic location according to the aggregate probabilistic utility score for the targeted geographic location. The targeted geographic location can be used, for example, for targeting internet-based services. Internet-based services can include, for example, internes search services, internet advertisement presentation services, e-commerce services, internet usage logging and reporting services, social networking services, electronic media publishing services, etc. Targeting internet search services, for example, on a targeted geographic location can include obtaining or providing search results most relevant to the targeted geographic location. Targeting internet advertisement presentation services on a targeted geographic location can include, for example, obtaining or presenting advertisements most relevant to the targeted geographic location. Targeting e-commerce services on a targeted geographic location can include, for example, obtaining or identifying products or services most relevant to the targeted geographic location. Targeting internet usage logging and reporting services on a targeted geographic location can include, for example, associating data (e.g., an internet message-forum post) with a targeted geographic location. Those having skill in the art will appreciate various other types of internet-based services and the applicability for targeting such services on particular geographic locations.

In some embodiments, the targeted geographic location can be selected from the plurality of candidate geographic locations. Such embodiments may provide for the calculation of an aggregate probabilistic utility score for each of the plurality of candidate geographic locations based upon a plurality of individual probabilistic utility scores for each respective candidate geographic location (e.g., as a hypothetical targeted geographic location). In further embodiments, the targeted geographic location can be selected from any geographic location, including non-candidate geographic locations. Such embodiments may provide for the calculation of an aggregate probabilistic utility score for that geographic location based upon a plurality of individual probabilistic utility scores for that geographic location.

An individual probabilistic utility score for any geographic location (e.g., a targeted geographic location) also corresponds to a probabilistic user location (e.g., any of the candidate geographic locations). For example, one individual probabilistic utility score for a hypothetical targeted geographic location "A" can correspond to the probabilistic user location "B"; and another individual probabilistic utility score for the targeted geographic location "A" can correspond to the probabilistic user location "C." Notably, in some circumstances, an individual probabilistic utility score for a hypothetical targeted geographic location "A" can correspond to the probabilistic user location "A"—which reflects that a targeted geographic location and a probabilistic user location, in some circumstances, can be the same geographic location.

In various embodiments, determining the individual probabilistic utility score for a geographic location includes factoring in the candidate confidence level for the corresponding probabilistic user location. In some embodiments, determining the individual probabilistic utility score for a geographic location includes factoring in one or more utility factors for the geographic location. In some embodiments, a utility factor for the geographic location can also correspond to the probabilistic user location.

In some embodiments, a route between or among geographic locations can provide a framework for measuring remoteness, e.g., according to burdens that may be encountered in travelling along a route. In some embodiments, for example, a utility factor corresponding to a probabilistic user location can be related to parameters indicative of a route between the targeted geographic location and a probabilistic user location. Such parameters can include any parameter being indicative of a burden associated with travel on the route between the targeted geographic location and the probabilistic user location (a "route-burden parameter"). In certain embodiments, for example, the route-burden parameter can be indicative of a driving distance, a transit distance, a walking distance, a driving time, a transit time, a walking time, a driving cost, a transit cost, a walking cost, etc. More specific examples of route-burden parameters include, for example, traffic conditions, weather conditions, transit timetables, and taxi fares. A utility factor as specifically described above (e.g., a route-utility factor) can be determined responsive to a route-burden parameter as is described further herein. A route-utility factor, for example, may reflect that the utility of targeting internet-based services tends to decrease as the burdens of transportation between the probabilistic user location and the targeted geographic location increases.

In even further embodiments, utility factors unrelated to remoteness can be provided. For example, a utility factor unrelated to remoteness but corresponding to a probabilistic user location can be related to parameters indicative of the relative favorability of comparable qualities of both the targeted geographic location and the probabilistic user location (a "trip-utility parameter"). Such parameters can include, for example, data indicative of: a nation, a language, demographics, historical patterns of activity between or among geographic locations, attractions, activities or amenities, editorial content, etc. A utility factor as specifically described above (e.g., a trip-utility factor) can be determined responsive to a trip-utility parameter as described further herein. A trip-utility factor, for example, may reflect that the utility of targeting internet-based services tends to increase when certain qualities of the targeted geographic location are favorable (i.e., just as favorable or more favorable) with respect to comparable qualities of the probabilistic user location.

In even further embodiments still, a utility factor not corresponding to a probabilistic user location can be related to parameters indicative of the absolute favorability of qualities of the targeted geographic location (a "destination-utility parameter"). Such parameters can include, for example, language, demographics, historical patterns of activity between or among geographic locations, attractions, activities or amenities, editorial content, etc. A utility factor as specifically described above (e.g., a destination-utility factor), can be determined responsive to a destination-utility parameter as described further herein. A destination-utility factor, for example, may reflect that the utility of targeting internet-based services tends to increase when qualities of the targeted geographic location are objectively favorable. Those having skill in the art will appreciate other types of route-utility factors, trip-utility factors, and destination-utility parameters may be apparent from the disclosure and are expressly within the scope hereof.

As is described further herein, some embodiments may include a system to provide internet-based services targeted on a targeted geographic location based on usefulness, to a user probabilistically located among any of a plurality of candidate geographic locations, of the internet-based services being targeted on the targeted geographic location. In certain aspects, embodiments of systems may include one or more processors. Embodiments of systems may also include one or more input/output unit being configured to be in communication with a first server and a second server. In certain embodiments, the first server may relate one or more IP addresses to one or more candidate geographic locations, and the second server may process internet-based services targeted on a geographic location. In certain aspects, an input/output unit may be configured to transmit data to and receive data from each of the first server and the second server. Embodiments of systems may further include, for example, non-transitory computer-readable storage media having stored thereon a set of executable instructions that, when executed by the one or more processors, causes the system to perform various operations.

Some embodiments, for example, may include an instruction that, when executed, causes the system to obtain, from the first server, a plurality of candidate geographic locations associated with a client IP address and a plurality of candidate confidence levels. In particular aspects, each of the plurality of candidate confidence levels can be a relative probability that a corresponding candidate geographic location, out of all of the plurality of candidate geographic locations, includes a positional location of a client device associated with a request for internet-based services.

Also, some embodiments, for example, may include an instruction that, when executed, causes the system to determine a plurality of route-utility factors for each respective candidate geographic location of the plurality of candidate geographic locations. In particular aspects, each of the plurality of route-utility factors can correspond to one of the candidate geographic locations, thereby defining a probabilistic client geographic location (e.g., a probabilistic user location). Also, in particular aspects, each of the route-utility factors can be determined responsive to an inverse relationship with one or more parameters indicative of a burden associated with travel along a route between the respective candidate geographic location and the probabilistic client geographic location.

Further, some embodiments, for example, may include an instruction that, when executed, causes the system to determine a plurality of probabilistic utility scores for each respective candidate geographic location of the plurality of candidate geographic locations. In particular aspects, each of the plurality of probabilistic utility scores may correspond to a respective route-utility factor for the respective candidate geographic location. Also, in particular aspects, each of the plurality of probabilistic utility scores can be determined responsive to the respective route-utility factor and a candidate confidence level for the probabilistic client geographic location that corresponds to the respective route-utility factor. Further, in particular aspects, each of the plurality of probabilistic utility scores may be indicative of usefulness, to a user probabilistically located at or adjacent to the probabilistic client geographic location, of internet-based services being targeted on the respective candidate geographic location.

Even further, some embodiments, for example, may include an instruction that, when executed, causes the system to calculate a plurality of aggregate probabilistic utility scores, responsive to the plurality of probabilistic utility scores for the respective candidate geographic location. In particular aspects, each of the plurality of aggregate probabilistic utility scores may correspond to a respective candidate geographic location. Also, in particular aspects, each of the plurality of aggregate probabilistic utility scores may be calculated responsive to the plurality of probabilistic utility scores for the respective candidate geographic location. Further, in particular aspects, each of the plurality of aggregate probabilistic utility scores may be indicative of usefulness, to a user probabilistically located at or adjacent to any of the plurality of candidate geographic locations, of internet-based services being targeted on the respective candidate geographic location.

Further still, some embodiments, for example, may include an instruction that, when executed, causes the system to select, from the plurality of candidate geographic locations, a candidate geographic location having an aggregate probabilistic utility score satisfying preselected criteria, to define a targeted geographic location. Even further still, some embodiments, for example, may include an instruction that, when executed, causes the system to transmit, to the second server, the targeted geographic location so that the second server may provide geographically-targeted internet-based services for the client device.

BRIEF DESCRIPTION OF THE DRAWINGS

So that the manner in which the features and benefits of the invention, as well as others which will become apparent, may be understood in more detail, a more particular description of the embodiments may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

Figure 1A:
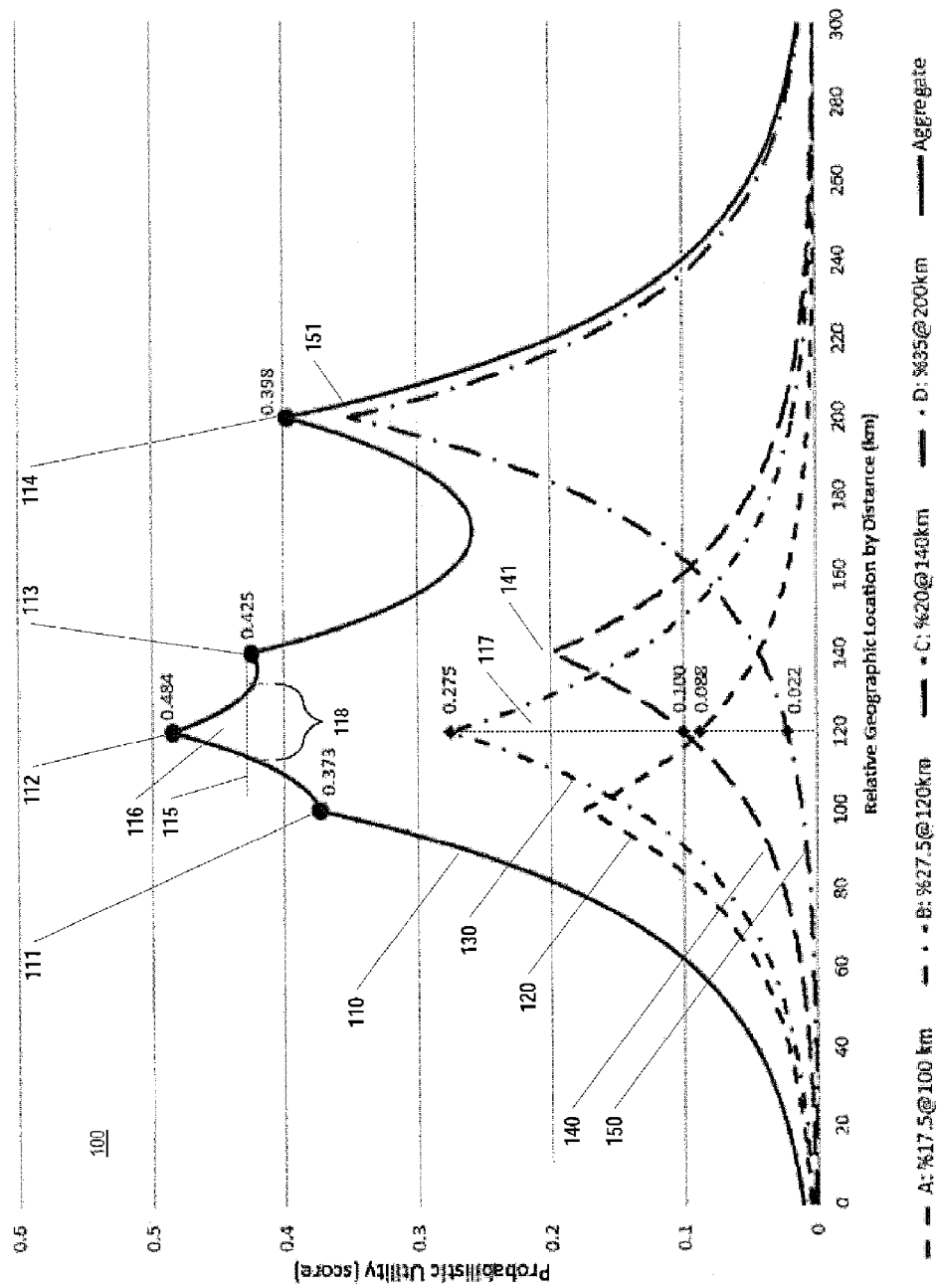
FIG. 1A includes a two-dimensional graph of probabilistic utility for a range of geographic locations, according to various embodiments, having probabilistic utility on the y-axis and a route-burden parameter (distance) on the x-axis.

While the invention is susceptible to various modifications and alternative forms, specific embodiments thereof are shown by way of example in the drawings and will herein be described in detail. In the drawings and description that follow, like parts are marked throughout the specification and drawings with the same reference numerals, respectively. Prime notation, if used, indicates similar elements in alternative embodiments. The drawings are not necessarily to scale. Certain features of the disclosure may be shown exaggerated in scale or in somewhat schematic form and some details of conventional elements may not be shown in the interest of clarity and conciseness. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

The present invention will now be described more fully hereinafter with reference to the accompanying drawings, which illustrate various embodiments of the invention. This invention, however, may be embodied in many different forms and should not be construed as limited to the embodiments set forth herein. Rather, these embodiments are provided so that this disclosure will be thorough and complete, and will fully convey the scope of the invention to those skilled in the art. It is to be fully recognized that the different teachings of the various embodiments discussed below may be employed separately or in any suitable combination to produce desired results. The various characteristics mentioned above, as well as other features and characteristics described in more detail below, will be readily apparent to those skilled in the art upon reading the following detailed description of the various embodiments, and by referring to the accompanying drawings.

Embodiments of the present invention include systems, methods, and computer readable media to identify a targeted geographic location according to the aggregate probabilistic utility score for the targeted geographic location. The targeted geographic location can be used, for example, for targeting internet-based services. An example of the calculation of an aggregate probabilistic utility score for each of the plurality of geographic locations based upon a plurality of individual probabilistic utility scores for each geographic location can, perhaps, best be shown with reference to FIG. 1. Any particular individual probabilistic utility score for any geographic location corresponds to a respective probabilistic user location. The probabilistic user location can be, for example, any of the candidate geographic locations. Accordingly, an individual probabilistic utility score for any geographic location m that corresponds to any probabilistic user location n can be represented as an individual probabilistic utility score for (m,n), and the pair (m,n) represents m being the hypothetical targeted geographic location and n being the corresponding probabilistic user location.

As is explained further herein, determining an individual probabilistic utility score for any (m, n) includes factoring in the candidate confidence level for n and one or more utility factors for (m, n) or for m.

Figure 1B:
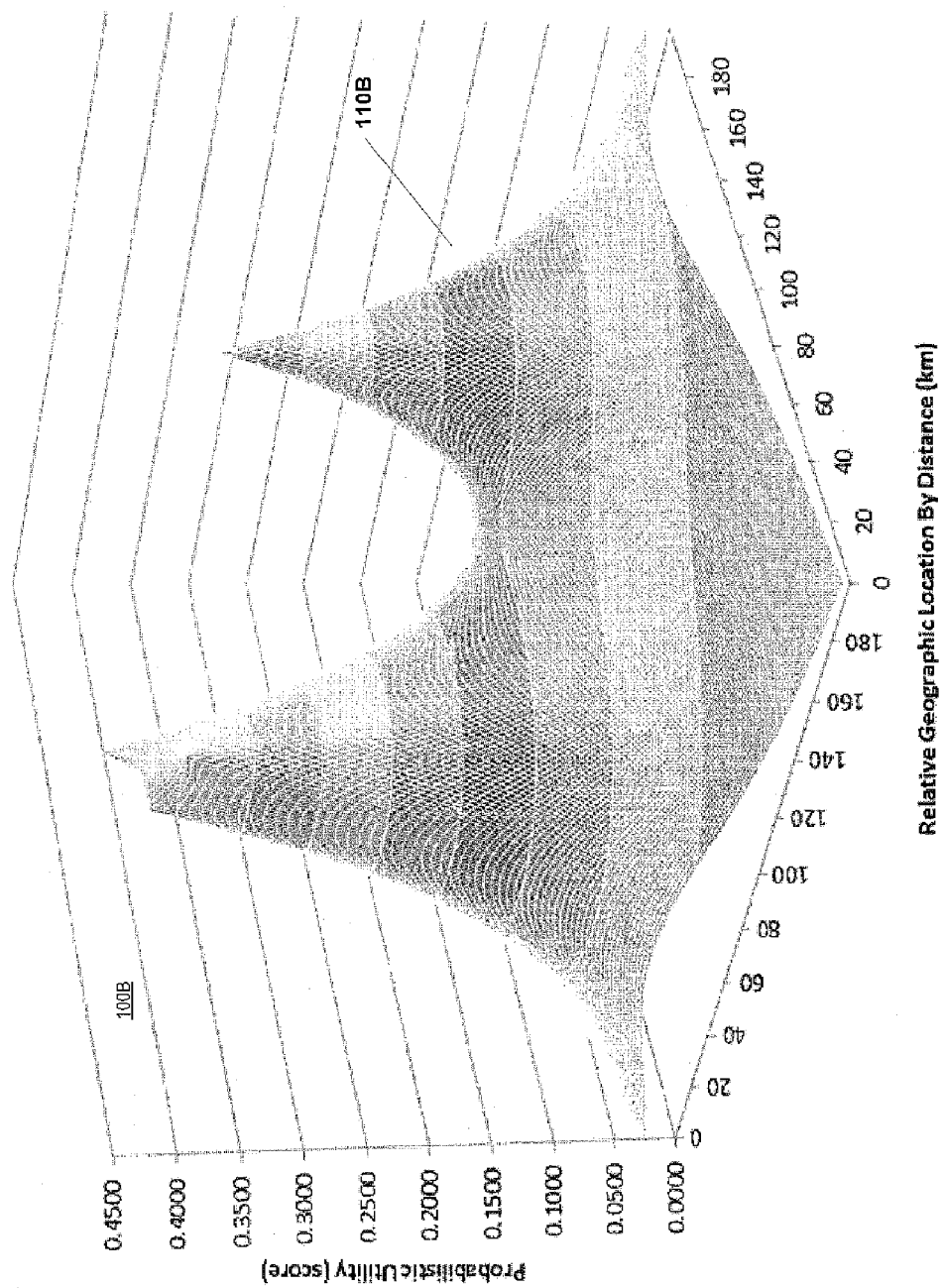
FIG. 1B includes a three-dimensional graph of probabilistic utility for a range of geographic locations, according to various embodiments, having probabilistic utility on the z-axis and a route-burden parameter (distance) on the x-axis and on the y-axis.

In the example depicted in FIG. 1A, an example of a route-burden parameter represents spatial distance between geographic locations, such that there is provided a distance parameter for any (m, n). An illustration of the relation between individual probabilistic utility scores and the distance parameter can be shown with reference to the utility-distance graph (100). The utility-distance graph (100) represents individual probabilistic utility scores (as well as the aggregate probabilistic utility score) along the y-axis and distance in kilometers along the x-axis. The illustration provided in the utility-distance graph (100) is simplified because it represents distance in one dimension only (i.e., straight-line distance).

The relative position of various geographic locations in FIG. 1A is represented on the X-axis in kilometer distance units. For example, examples of candidate geographic locations are shown at each of the 100 km mark (candidate geographic location "A"), the 120 km mark (candidate geographic location "B"), the 140 km mark (candidate geographic location "C"), and the 200 km mark (candidate geographic location "D"). In the example provided, candidate geographic location A corresponds to a %17.5 candidate confidence level, candidate geographic location B corresponds to a %27.5 candidate confidence level, candidate geographic location C corresponds to a %20 candidate confidence level, and candidate geographic location D corresponds to a %35 candidate confidence level.

Probabilistic utility curves (120, 130, 140, and 150) are provided to show individual probabilistic utility scores corresponding to respective candidate geographic locations. Each of the probabilistic utility curves (120, 130, 140, and 150) represents a relation between distance and probabilistic utility for different geographic locations m positioned along the X-axis. Each probabilistic utility curve (120, 130, 140, and 150) corresponds to a different probabilistic user location n being selected from {A, B, C, D}. Each of the probabilistic utility curves reflects the corresponding candidate confidence level for the respective probabilistic user location, as evidenced by the value of the peaks of the probabilistic utility curves, e.g., peak (141) represents candidate confidence level 0.20 for candidate geographic location C.

By way of example, probabilistic utility curve (120) shows continuous individual probabilistic utility scores for any (m, A). Also, probabilistic utility curve (130) shows continuous individual probabilistic utility scores for any (m, B). Also, probabilistic utility curve (140) shows continuous individual probabilistic utility scores for any (m, C). Also, probabilistic utility curve (150) shows continuous individual probabilistic utility scores for any (m, D). Each of the probabilistic utility curves (120, 130, 140, and 150) therefore provides an individual probabilistic utility score for any geographic location m along the x-axis as a function of distance from a respective probabilistic user location n.

In certain embodiments, each of the probabilistic utility curves (120, 130, 140, and 150) can represent an inverse relation between distance for any (m, n) and the individual probabilistic utility score for any m. For example, the peak (151) of probabilistic utility curve (150) for (m, D) shows that the individual probabilistic utility score is greatest for m=D (i.e., at 200 km) and decreases in either direction as m moves along the x-axis. According to some embodiments, each of the probabilistic utility curves (120, 130, 140, and 150) represents an exponential decay of individual probabilistic utility score along the x-axis as a function of distance for any (m, n). The exponential decay can be a function of a utility-decay factor. Although the relationship between the route-burden parameter in the example provided by FIG. 1A (distance) is shown as being exponentially related to utility, various embodiments may include various types of inverse relationships, including for example, a linear relationship.

The individual probabilistic utility score for any (m, {A,B,C,D}) can be shown with reference to the y-axis values for respective probabilistic utility curve (e.g., 120, 130, 140, and 150) at any point m on the x-axis. For example, for m=B, the intersection of line (117) with probabilistic utility curves (120, 130, 140, 150) represents the individual probabilistic utility score for (B, {A,B,C,D}). Accordingly, it can be shown that the probabilistic utility for any m may differ depending on which of n (i.e., which of {A,B,C,D}) considered (i.e., depending on the distance for (m, n)). For example, the individual probabilistic utility score for (B, A) is 0.088 according to probabilistic utility curve (120). Likewise, the individual probabilistic utility score for (B, B) is 0.275 according to probabilistic utility curve (130). Likewise, the individual probabilistic utility score for (B, C) is 0.100 according to probabilistic utility curve (140). And likewise, the individual probabilistic utility score for (B, D) is 0.0022 according to probabilistic utility curve (150).

The plurality of probabilistic utility curves (120, 130, 140, and 150) can be summed to determine an aggregate probabilistic utility curve (110). The aggregate probabilistic utility curve (110) provides an aggregate probabilistic utility score for any geographic location m positioned along the x-axis. Because the aggregate probabilistic utility curve (110) represents the sum of the probabilistic utility curves (120, 130, 140, 150), the aggregate probabilistic utility curve (110) therefore provides an aggregate probabilistic utility score for all geographic locations m a function of distance from each of the probabilistic user locations, e.g., distances for (m,{A,B,C,D}). Accordingly, the aggregate probabilistic utility curve (110) for any m represents the aggregate probabilistic utility score, to a user probabilistically located at any of the plurality of probabilistic user locations {A,B,C,D}. The aggregate probabilistic utility curve, can be used, for example, to select a targeted geographic location (i.e., any point m along the x-axis) based on the aggregate probabilistic utility score (i.e., a point along the y-axis) for that targeted geographic location. In certain embodiments, for example, the geographic location having the greatest aggregate probabilistic utility score can be selected.

Figure 2A:
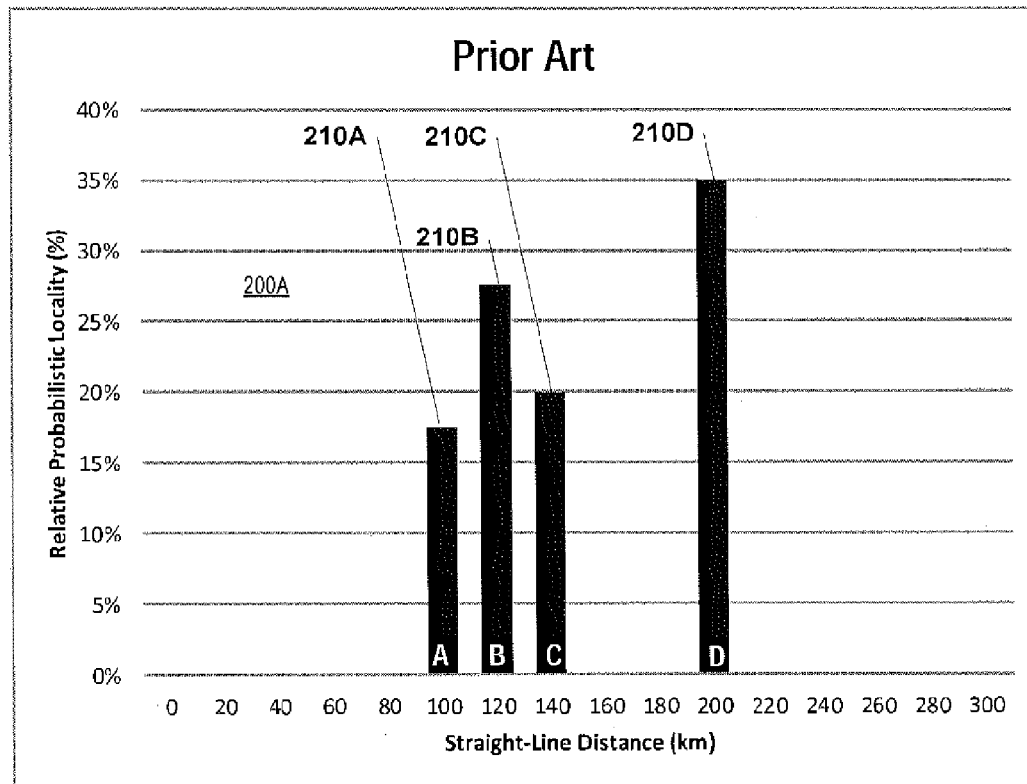
FIG. 2A includes a bar graph of probabilistic locality for a plurality of candidate geographic locations, according to the prior art, having probability on the y-axis and relative position of a geographic location (distance) on the x-axis.
Figure 2B:
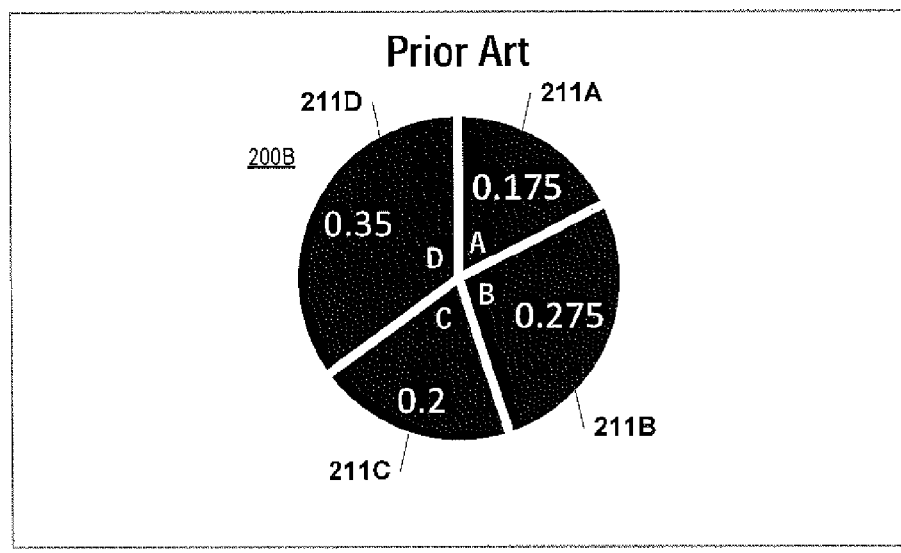
FIG. 2B includes a pie chart of probabilistic locality of a plurality of candidate geographic locations, according to the prior art, having the probabilities of FIG. 2A being relative probabilities.

Advantages of targeting internet-based services based on an aggregate probabilistic utility score (as opposed to based on relative probabilistic locality, i.e., the most likely location of the user) can be shown with reference to FIGS. 2A and 2B, which provide examples of relative probabilistic locality from the prior art. In bar chart 200A, the bars (210A, 210B, 210C, 210D) represent the candidate confidence levels, i.e., the probability that any of the candidate geographic locations (i.e., the position along the x-axis) are the probabilistic user location. As in FIG. 1A, FIG. 2A represents the existence of multiple probabilistic user locations at each of the 100 km mark, the 120 km mark, the 140 km mark, and the 200 km mark. Also, as in FIG. 1A, probabilistic user location "A" is at the 100 km mark and corresponds to a %17.5 candidate confidence level, probabilistic user location "B" is at the 120 km mark and corresponds to a %27.5 candidate confidence level, probabilistic user location "C" is at the 140 km mark and corresponds to a %20 candidate confidence level, and probabilistic user location "D" is at the 200 km mark and corresponds to a %35 candidate confidence level. Further, in pie chart 200B, the slices (211A, 211B, 211C, 211D) represent the same confidence levels, but also showing that the candidate confidence levels are relative probability values among the pool of all candidate geographic locations.

For example, by comparing FIGS. 1A and 2A, it can be shown that the geographic location having the greatest aggregate probabilistic utility score is not necessarily the same as the candidate geographic location having the greatest relative probabilistic locality. FIG. 2A shows that the candidate geographic location having the greatest relative probabilistic locality is the candidate geographic location "D" (210D) at position "200 km," having a candidate confidence level of 35%. In contrast, FIG. 1A shows that the geographic location having the greatest aggregate probabilistic utility score is the candidate geographic location "B" (112) at position "120 km" having aggregate probabilistic utility score of 0.484. According to embodiments described herein, an aggregate probabilistic utility score for any candidate geographic location can be higher than the candidate confidence level for the same candidate geographic location (or, perhaps, for other candidate confidence levels) because the aggregate probabilistic utility score for any geographic location factors in individual probabilistic utility scores for corresponding to each of the plurality of candidate geographic locations, whereas the candidate confidence levels are limited in scope to only the corresponding candidate geographic location.

Even further, discrete aggregate probabilistic utility scores can be determined even for non-candidate geographic locations (e.g., including geographic locations near or surrounding candidate geographic locations), which allows even non-candidate geographic locations to be selected as targeted geographic locations, in certain circumstances. As can be shown with reference to the aggregate probabilistic utility curve (110), the only the peaks (111, 112, 113, 114) correspond to the candidate geographic locations "A", "B", "C", and "D"—all other points along the aggregate probabilistic utility curve (110) provide discrete data points for non-candidate geographic locations. In contrast, candidate confidence levels lack information relating discretely to non-candidate geographic locations (see FIG. 2A).

Selecting such non-candidate geographic locations may be advantageous, for example, to the extent that some non-candidate geographic locations can have a higher aggregate probabilistic utility score than even the second-greatest aggregate probabilistic utility score for a candidate geographic location. As can be shown with reference to the portion of the aggregate probabilistic utility curve (110) surrounding the highest peak (112), there is a range (118) of geographic locations having an aggregate probabilistic utility score greater than the second-highest peak (113). This portion of the aggregate probabilistic utility curve (110) represents non-candidate geographic locations that have greater aggregate probabilistic utility scores than even candidate geographic location "C", which has the second greatest aggregate probabilistic utility score (0.425). Accordingly, the second greatest aggregate probabilistic utility score among the candidate geographic locations can be used to define a "floor" (115) thereby used to define a peak area (116) under the aggregate probabilistic utility curve (110) and to define a corresponding peak range (118). Those having skill in the art will appreciate that other values can be used to define a floor to capture a different peak area and a different peak range.

The illustration provided in FIG. 1A, representing distance in only one dimension, is provided for ease of explanation, and those having skill in the art will appreciate applications including relative positions of various geographic locations in a coordinate space analogous to portions of the surface of the earth, including, for example, a longitude axis and a latitude axis. For instance, a more complex relation between probabilistic utility scores and route-burden parameters in multiple dimensions can be shown with reference to utility-distance graph (100B) set forth in FIG. 1B. The utility-distance graph (100B) represents individual probabilistic utility score along the z-axis and distance in kilometers along both the x-axis and the y-axis. The illustration provided in FIG. 1B, perhaps, provides a more realistic model by representing distance in two dimensions. For example, the three-dimensional surface (110B) in graph (100B) represents the aggregate probabilistic utility score, for example, for internet-based services being targeted to any geographic location having a certain position (on the X-axis and on the Y-axis), as a function of distance between that position and all probabilistic client geographic locations.

According to various examples of embodiments described or mentioned herein, information described herein can be included in data stored in a data repository, including, for example, computer-readable storage media, such as a non-transitory computer memory or multiple non-transitory computer memories as is described further herein. Data repositories can be any sort of organized collection of data in digital form, unless otherwise expressly described as limited to a particular structure herein. Data repositories may be, for example, in files or directories in a file system or according to any database model available in the art, including, for example, flat file databases, hierarchical databases, network databases, relational databases, dimensional databases, objectional databases, etc. References to data collections, data structures, or data operations herein that imply that any one type of structure or model exists shall not be interpreted to exclude any other type of structure or model for achieving the described purpose, unless expressly limited herein.

The one or more data repositories can include a geolocation repository (391), a geographic information repository (392), a local information repository (393), and a services information repository (394). The following paragraphs describe exemplary functions and structures of one or more data repositories with reference to FIG. 3A.

Various types of geolocation repositories are known in the art. A geolocation repository (391), for example, can store data relating to internet addresses (such as IP addresses or MAC addresses), including specific internet addresses, internet address blocks, internet address masks, and other information relating to internet addresses as will be known to those having skill in the art ("internet address data"). The geolocation repository (391), for example, can also store data relating to geographic locations, including geographic location identifiers for geographic locations of various resolutions (e.g., continent, country, state/province, county, metropolitan area, city, neighborhood, postal code, area code, street name, address, street number, building identifier, geographic coordinates, etc.) The geolocation repository (391), for example, can also store data relating to geolocation confidence levels including confidence levels. The geolocation repository (391) can also include data organization schemes or data structures to relate internet address data to data relating to geographic locations. For example, the geolocation repository (391) can include one or more data structures to relate an IP address of "192.168.0.1" to a geographic location "California, USA" and a confidence level of 0.90 (or 90%). Also, for example, the geolocation repository (391) can include one or more data structures to relate an IP address of "192.168.0.1" to a geographic location "San Francisco, Calif. USA" and a confidence level of 0.30 (or 30%).

Various types of geographic information repositories (392) are known in the art. A geographic information repository (392), for example, can store data relating to geographic positions (e.g., global coordinate positions) on the earth surface, including areas of the earth surface being defined according to geographic position ("geographic positional data"). The geographic information repository (392), for example, can also store data relating to geographic locations, including geographic location identifiers for geographic locations of various resolutions (e.g., continent, country, state/province, county, metropolitan area, city, neighborhood, postal code, area code, street name, address, street number, building identifier, geographic coordinates, etc.) ("geographic locations data"). The geographic information repository (392), for example, can also store data relating to various types of natural or man-made geographic features, such as buildings, structures, bridges, mountains, telecommunication base stations, wireless access points, bodies of water, borders, tunnels, and other points of interest ("geographic features data"). The geographic information repository (392), for example, can also store data relating to various route networks (e.g., roads, paths, trails, rails, waterways, or any other type of navigation, transportation, or transit route) ("route network data"). Route network data can include, for example, rate-of-travel information, live traffic information, timetable information, live scheduling information, road conditions, weather conditions, environmental conditions, fuel prices, and other data relating to such route networks as will be known to those having skill in the art. The geographic information repository (392), for example, can include data structures to relate any of the geographic positional data, the geographic locations data, the geographic features data, and the route network data. For example, the geographic information repository (392) can include one or more data structures linking a position of 37° 49'11"N 122° 28'43"W to the geographic feature for "Golden Gate Bridge," to geographic location data for "Marin County, California," to route network data for "US 101" or "California SR1.

Various types of local information repositories (393) are known in the art. A local information repository (393), for example, can store data relating to geographic locations, including geographic location identifiers for geographic locations of various resolutions (e.g., continent, country, state/province, county, metropolitan area, city, neighborhood, postal code, area code, street name, address, street number, building identifier, geographic coordinates, etc.) ("geographic locations data"). The local information repository (393), for example, can also store data relating to various attractions, amenities, sites, or other points of interest ("attractions data") including, for example, employers, restaurants, parks, public forums, buildings. The attractions data can include, for example, factual data or editorial data (e.g., online user reviews and rankings) relating to any of the various attractions, amenities, sites, or other points of interest. The local information repository (393), for example, can also store data relating to various societal, political, or demographic aspects ("societal data") including, for example, income, property, crime, employment, activities, preferences, etc. The societal data can include, for example, factual data or editorial data (e.g., online user reviews and rankings) relating to any of the various societal, political, or demographic aspects. The local information repository (393), for example, can include data structures to relate any of the geographic locations data, the attractions data, and the societal data. For example, the local information repository (393) can include one or more data structures linking "Marin County, California" to "Golden Gate National Recreation Area," to a restaurant having a 4-star rating, to a median household income of 70,000 in U.S. dollars, or to a travel-website ranking in the 90$^{th}$ percentile.

Various types of service content repositories (394) are known in the art. A service content repository (394), for example, can include, for example web-index data, web document data, spelling data, advertisement data, customer data, account data, product data, inventory data, activity-logging data, publication data, media data, social network data, etc. for various internet-based services, including, for example, internet search, internet advertisement, internet e-commerce, internet publications, social networking, electronic media delivery, and other internet resources.

Databases may include the data itself, the structure or organization of the data, as well as the computer programs that define a set of operations that can be performed on the data. Databases can further include one or more computers dedicated to running such computer programs (i.e., a database server). Databases may include, for example, a database management system ("DBMS") consisting of software that operates the database, supports query languages, provides storage, access, security, backup and other facilities. The DBMS may further include interface drivers, which are code libraries that provide methods to prepare statements, execute statements, fetch results, etc. DBMS may further include a relational engine to implement relational objects such as Table, Index, and Referential integrity constraints. DBMS may further include a storage engine to store and retrieve data from secondary storage, as well as managing transaction commit and rollback, backup and recovery, etc. Data stored in the databases may be updated as needed, for example, by a user with administrative access to the database or to an area of the database, such as to add new data to tables or libraries in the database as they become supported. It will be appreciated by those having skill in the art that data described herein as being stored in the databases may also be stored or maintained in non-transitory memory and accessed among two or more subroutines, functions, modules, objects, program products, or processes for example, according to objects or variables of such subroutines, functions, modules, objects, program products or processes. Any of the fields of the records, tables, libraries, and so on of the database may be flat files or multi-dimensional structures resembling an array or matrix and may include values or references to other fields, records, tables, or libraries. Any of the foregoing fields may contain actual values or a link, a join, a reference, or a pointer to other local or remote sources for such values. Further, any database may be, for example, a single database, multiple databases, or a virtual database, including data from multiple sources, for example, servers on the World Wide Web.

Figure 3A:
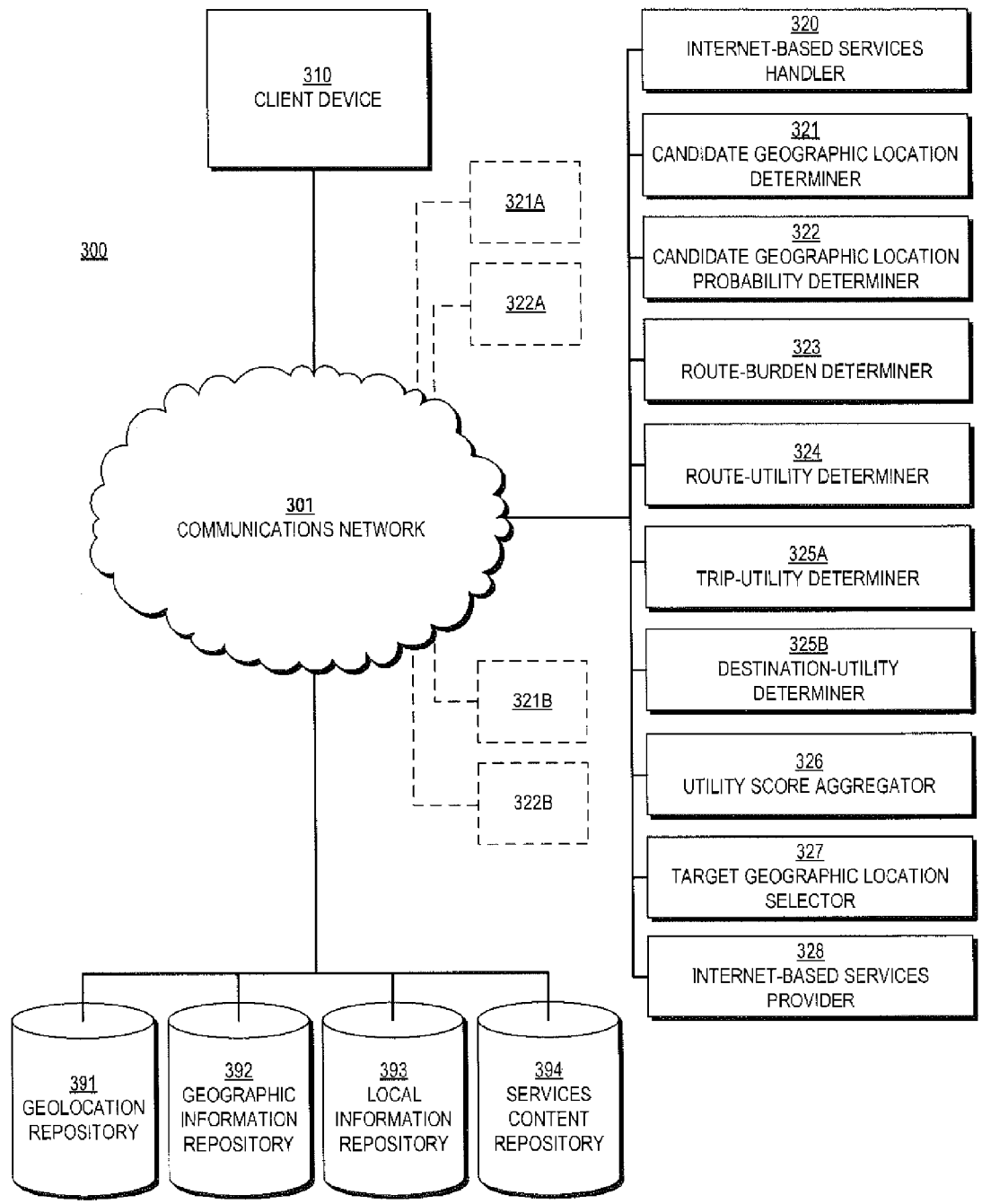
FIG. 3A includes a schematic diagram of various modules according to various embodiments.

Various functions of various embodiments can, perhaps, be best described with reference to systems including one or more modules, including, for example, application modules, computing devices, data repositories, etc. FIG. 3A depicts an example of a system (300) including one or more specially-configured modules for the specific functions described further below. Some of the modules, as is described further below, can communicate with other modules such that each of the communicating modules can receive as input the output produced, transmitted, or returned by another module. According to various embodiments, each of the modules in the example system (300) described below can be implemented, for example, as specially-configured computing devices or as specially-configured software (e.g., applications) to be stored on a memory of a computing device and to be executed by a processor of a computing device. Accordingly, each of the modules described below can be implemented as hardware, as software, or as hardware and software. From the embodiments described herein it will be apparent to those having skill in the art that other embodiments are possible including any number of memories of any number of computer devices and operable on any number of processors, and all of such combinations are within the scope of this disclosure.

Each of the modules described below can communicate over a communications network (301), which can include multiple interconnected communications networks, for example, implemented over various types of physical communication links and various layers of communications protocols. For instance, an example communications network (301) can include local area networks (LANs), wide-area networks (WANs), virtual private networks (VPNs), telecommunications networks (e.g., CDMA networks, GSM networks), as well as the Internet.

Figure 3B:
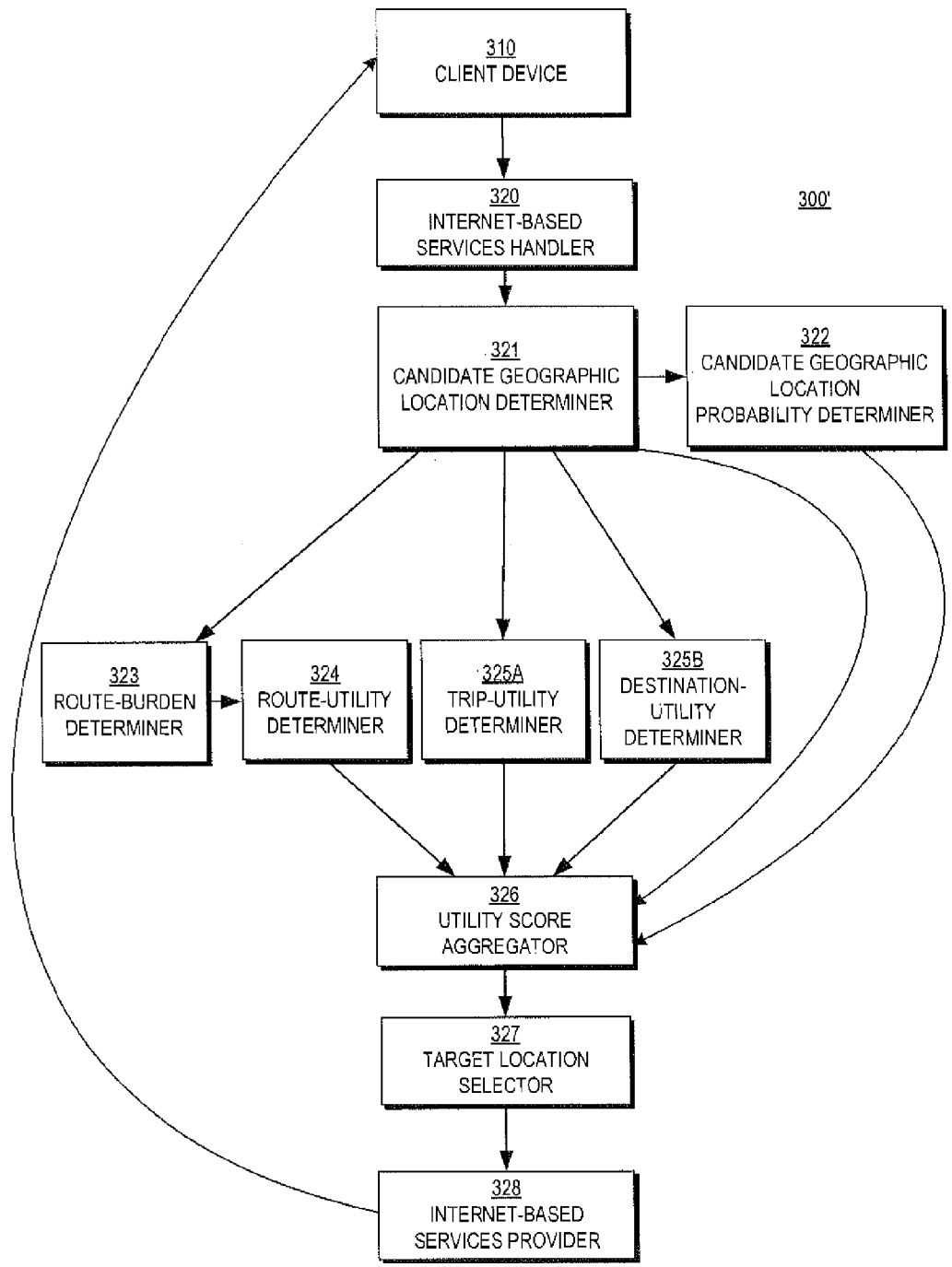
FIG. 3B includes a schematic diagram of various modules according to various embodiments.
Figure 3C:
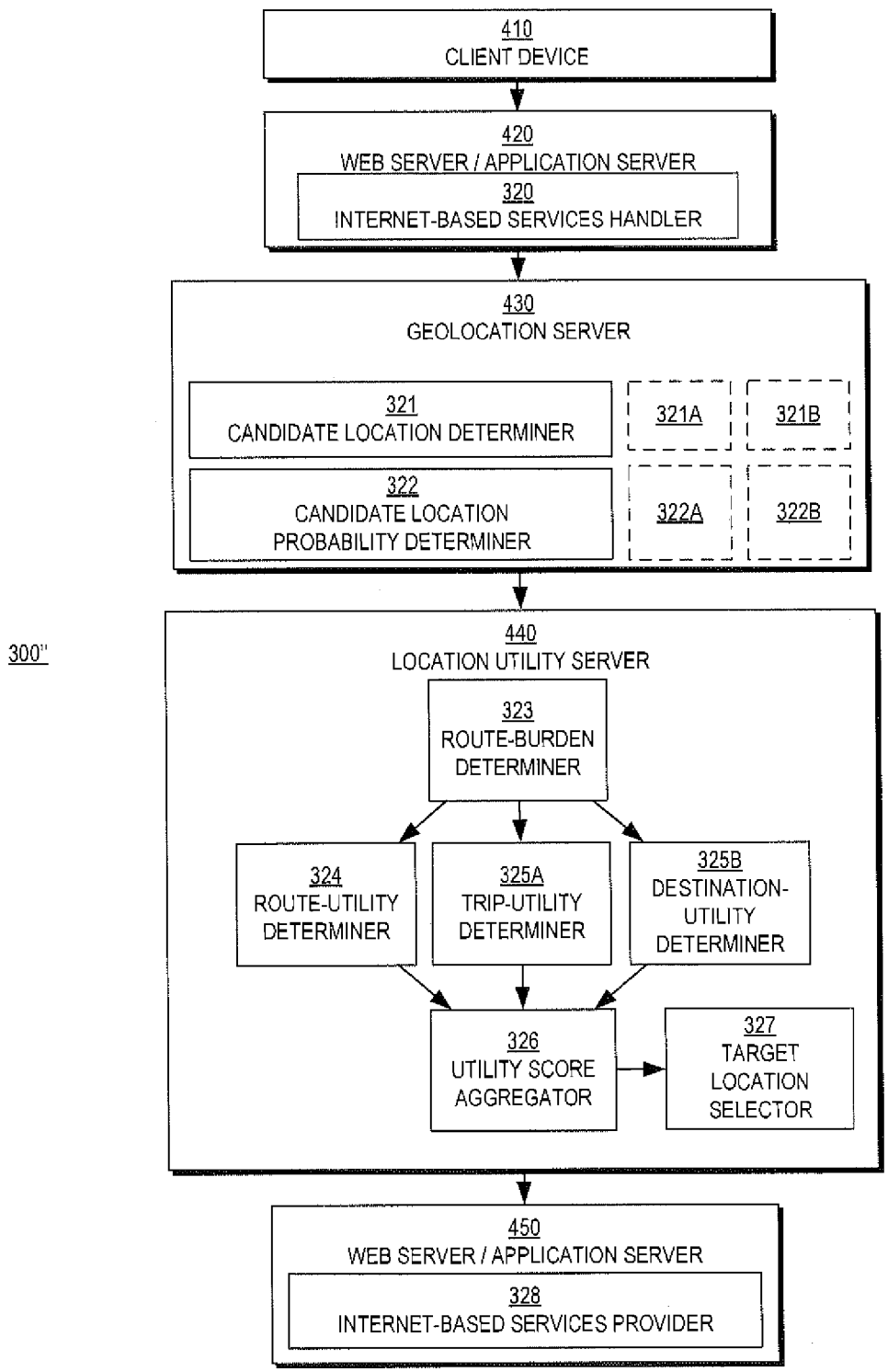
FIG. 3C includes a schematic diagram of various modules according to various embodiments.
Figure 3D:
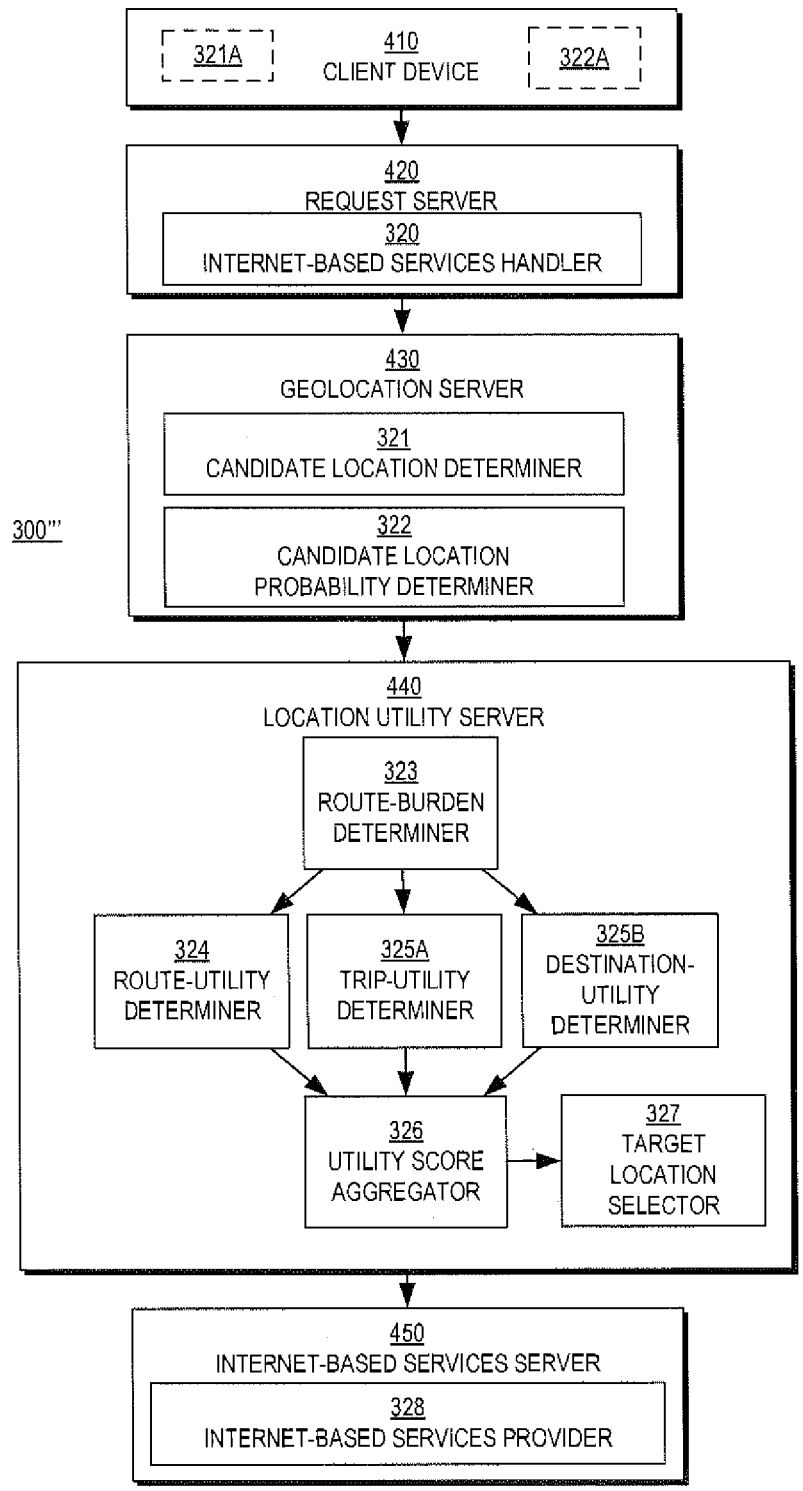
FIG. 3D includes a schematic diagram of various modules according to various embodiments.

In various embodiments, one or more modules can include, for example, an internet-based services request handler (320), a candidate geographic location determiner (321), a candidate geographic location probability determiner (322), a route-burden determiner (323), a route-utility determiner (324), a trip-utility determiner (325A), a destination-utility determiner (325B), a utility-score aggregator (326), a target geographic location selector (327), and an internet-based services provider (328). In various embodiments, one or more of these modules can be in communication with a client device (310) for example, through the communications network (301). In various embodiments, one or more of these modules can be in communication with one or more data repositories, such as the geolocation repository (391), the geographic information repository (392), the local information repository (393), and the services information repository (394) for example, through the communications network (301). The following paragraphs describe exemplary functions of and interactions between these one or more modules with reference to any of FIGS. 3A and 3B. Exemplary data flows are described further herein between and among one or more of these modules can be shown with reference to FIG. 3B. FIGS. 3C and 3D illustrate examples of embodiments of one or more of these modules implemented one or more computing devices, as is described further herein.

An internet-based services request handler (320) can be configured, for example, to receive requests for internet-based services ("requests") according to various standards, protocols, and techniques known to those having skill in the art, including, for example TCP/IP. A request can be received, for example, from a client device (310) transmitting the request over the communications network (301). A client device (310) can be, for example, a desktop computer, a laptop computer, a tablet computer, a smartphone, etc. Requests can also be received, for example, from other devices such as web servers (not shown) and application servers (not shown) also transmitting the request over the communications network (301). A request received from a client device can be associated with an internet address of the client device transmitting the request, for example (e.g., IP address). A request received from a server device can be associated with an internet address of a client device (e.g., IP address) configured to receive electronic content relating to the request.

A candidate geographic location determiner (321) can be configured, for example, to determine one or more candidate geographic locations. In certain embodiments, the candidate geographic location determiner (321) can be configured to determine one or more candidate geographic locations for a client device responsive to an internet address (e.g., IP address). A candidate geographic location determiner can be configured just as any of various IP-geolocation systems known in the art, for example, to associate an internet address with one or more internet addresses stored in an geolocation repository (391) and a plurality of candidate geographic locations stored in the geolocation repository (391).

In some embodiments, a candidate geographic location determiner (321) can be configured to determine one or more candidate geographic locations for a client device responsive to positioning information indicative of the positional location of the client device (e.g., GPS information, Wi-Fi information, telecommunications base station information, etc.). The candidate geographic location determiner (321) can be configured to associate the positional information with one or more geographic locations stored in a geographic information repository (392). In further embodiments, a candidate geographic location determiner (321) can be configured to determine one or more candidate geographic locations for a client device responsive to both an internet address (e.g., the IP address of a client device) and one or more positioning signals received at the client device (e.g., GPS signals, Wi-Fi signals, telecommunications signals, etc.).

A candidate geographic location probability determiner (322), for example, can be configured to determine a confidence level (e.g., a probability value) associated with each of the one or more candidate geographic locations. The candidate geographic location probability determiner (322) can be configured just as any of various known IP-geolocation systems known in the art, for example, to associate an internet address with one or more internet addresses stored in an geolocation repository (391), a plurality of candidate geographic locations stored in the geolocation repository (391), and a plurality of corresponding probability values for each of the plurality of candidate geographic locations stored in the geolocation repository (391).

In some embodiments, a candidate geographic location probability determiner (322) can be configured to determine one or more probability values associated with the candidate geographic locations responsive to the positioning information. The candidate geographic location probability determiner (322) can be configured to relate the positional information to one or more factors indicative of confidence levels associated with the positioning information. In further embodiments, a candidate geographic location probability determiner (322) can be configured to determine one or more probability values associated with the candidate geographic locations responsive to both an internet address (e.g., the IP address of a client device) and one or more of the positioning signals as described above.

A route-burden determiner (323), for example, can be configured to determine one or more route-burden parameters associated with a route between or among any two or more geographic locations, for example, a pair of the candidate geographic locations. A route can include an origin geographic location (e.g., a probabilistic user location) and a destination geographic location (e.g., a targeted geographic location) and relates to any way of travel, transportation, transit, or other movement (e.g., human movement) between the origin geographic location and the destination geographic location. In some circumstances, the origin geographic location and the destination geographic location can be the same geographic location, in which case the route may be null or insignificant (e.g., for travel within a geographic location). In some embodiments, routes may relate to existing route networks (e.g., roads, paths, trails, rails, waterways, or any other type of navigation, transportation, transit route, corridors, etc.). In other embodiments, however, routes may relate simply to a straight-line between two geographic locations as points on a map. In the description, reference made to one type of route in the description is not intended to exclude other types of routes or to suggest that only one type of route relates to certain embodiments, unless such is specifically stated.

Any reference to a "route" herein is not intended to require that an actual route be contemplated, planned, or taken or even that the route exists—the word "route" is used only in the context of understanding factors that contribute to the utility of certain geographic locations over others in light of a probabilistic user location. In some embodiments, such context may be better understood with reference to a hypothetical trip taken by user at the probabilistic user location to the targeted geographic location along the route (e.g., a user may wish to take a trip to a car dealership that is at or near a targeted geographic location). In other embodiments, such context may be better understood with reference to a hypothetical trip, taken by anyone, between the probabilistic user location and the targeted geographic location along the route (e.g., a user may wish to have pizza delivered to his home from a restaurant in or near a targeted geographic location).

The route-burden determiner (323) can be configured just as various electronic mapping systems, electronic navigation systems, electronic trip planning systems, and geographic information systems known in the art, for example, to associate any two or more geographic locations with one or more route-burden parameters based on data in the geographic information repository (392). According to various embodiments, the route-burden determiner (323) can obtain, determine, or provide a route-burden parameter being, for example, a driving distance or a driving time between two geographic locations. Likewise, according to various embodiments, therefore, the route-burden determiner (323) can also obtain, determine, or provide a route-burden parameter being, for example, a transit cost or a transit time between two geographic locations. It will be apparent to those having skill in the art that the route-burden determiner can also determine other route burden parameters.

A route-utility determiner (324), for example, can be configured to determine one or more route-utility factors associated with a route between or among two or more geographic locations, for example, a pair of the candidate geographic locations. A route-utility factor is indicative of how useful an internet-based service targeted to a first geographic location might be to a user having a positional location at or adjacent to a second geographic location, based on one or more burdens (e.g., route-burden parameters) for a route associated with the first geographic location and the second geographic location. For example, route-utility factors can provide a normalized score (e.g., between 0 and 1) indicative of how useful it might be for a user to receive goods or services available at a remote location in light of burdens for route between his present geographic location (e.g., a probabilistic user location) and the remote geographic location (e.g., a targeted geographic location).

The route-utility determiner (324) can be configured to apply one or more route-utility algorithms to determine a route-utility factor responsive to one or more route-burden parameters. In certain embodiments, for example, the route-utility determiner (324) is configured to determine a utility factor for a geographic location responsive to one or more route-burden parameters associated with a route between or among that geographic location and one or more geographic locations. In certain embodiments, the one or more route-burden parameters are associated with a route within the same geographic location. In certain embodiments, as can be shown in FIG. 3B, the route-utility determiner (324) can be communicatively coupled with the candidate geographic location determiner (321) and the route-burden determiner (323) to receive the plurality of candidate geographic locations and route-burden parameters associated with any of the plurality of candidate geographic locations.

In certain embodiments, for example, the route-utility determiner (324) is configured to determine a route-utility factor that is a value between 0 and 1 using to one or more route-utility algorithms. In further embodiments, for example, the route-utility algorithms can perform computer implemented methods (or portions of computer implemented methods) as described further herein, including, for example, computer-implemented method (500) as can be shown in FIG. 5. And in even further embodiments, for example, the route-utility algorithms can apply various route-utility formulas, including, for example, formula [1] as defined herein.

In certain embodiments, for example, the trip-utility determiner (325A), for example, can be configured to obtain, determine, or provide one or more trip-utility factors associated with a trip including two or more geographic locations, for example, a pair of the candidate geographic locations. A trip is defined as any travel, transportation, transit, or other movement (e.g., human movement) between or within one or more geographic locations irrespective of a route between the geographic locations (including irrespective of route-burden parameters). Of the geographic locations for a trip, one can be referred to as a destination geographic location and another can be referred to as an origin geographic location. The destination geographic location, for example, can be the targeted geographic location. The origin geographic location can be, for example, the probabilistic user location. In other embodiments, the destination geographic location can be either the targeted geographic location or the probabilistic user location; and the origin geographic location can be either of the targeted geographic location or the probabilistic user location.

Any reference to a "trip" herein is not intended to require that an actual trip be contemplated, planned, undertaken, or completed—the word "trip" is used only in the context of understanding factors that contribute to the utility of certain geographic locations over others in light of a probabilistic user location. A trip-utility factor is indicative of how useful an internet-based service targeted to a first geographic location may be to a user having a positional location at a second geographic location, based on one or more comparable parameters associated with the first geographic location and the second geographic location, irrespective of any route between the first geographic location and the second geographic location. For example, trip-utility factors can provide a normalized score (e.g., between 0 and 1) indicative of how useful a user a remote geographic location (including goods or services available at the remote geographic location) may be to a user in light of parameters of the remote geographic location (e.g., a targeted geographic location) as compared to his present geographic location (e.g., a probabilistic user location).

The trip-utility determiner (325A) can be configured to determine trip-utility factors responsive to one or more trip-utility parameters. In certain embodiments, for example, the trip-utility determiner (325A) can be configured to determine a trip-utility factor for a geographic location responsive to one or more trip-utility parameters associated with a trip including two or more geographic locations. In certain embodiments, as can be shown in FIG. 3B, the trip-utility determiner (325A) can be communicatively coupled with the candidate geographic location determiner (321) or the route-burden determiner (323) to receive the plurality of candidate geographic locations. In certain embodiments, for example, the trip-utility determiner (325A) can be configured to obtain a trip-utility factor for a plurality of geographic locations from a local information repository (393) by selecting a trip-utility factor relating to each of the plurality of geographic locations. In further embodiments, for example, the trip-utility determiner (325A) can be configured to determine a trip-utility factor for a plurality of geographic locations of that is a value between 0 and 1, responsive to one or more trip-utility parameters for each of the plurality of geographic locations. One or more trip-utility parameters can be stored, for example, in a local information repository (393). In even further embodiments, for example, determining a trip-utility factor for a geographic location responsive to one or more trip-utility parameters can include performing computer implemented methods (or portions of computer implemented methods) as described further herein, including, for example, computer-implemented method (500) as can be shown in FIG. 5.

In certain embodiments, for example, the destination-utility determiner (325B), for example, can be configured to determine one or more destination-utility factors associated with a geographic location, for example, a targeted geographic location. A destination-utility factor is indicative of how useful an internet-based service targeted to a particular geographic location may be to any user, irrespective of a probabilistic user location (including irrespective of a route or a trip to the particular geographic location). For example, destination-utility factors can provide a normalized score (e.g., between 0 and 1) indicative of how useful it might be for a user to receive goods or services available at a geographic location in light of parameters relating only to the particular geographic location. The destination-utility determiner (325B) can be configured to determine destination-utility factors responsive to one or more geographic location parameters. In certain embodiments, for example, the destination-utility determiner (325B) can be configured to determine a destination-utility factor for a geographic location responsive to one or more parameters associated with a destination geographic location. In certain embodiments, as can be shown in FIG. 3B, the destination-utility determiner (325B) can be communicatively coupled with the candidate geographic location determiner (321) or the route-burden determiner (323) to receive the plurality of candidate geographic locations.

In certain embodiments, for example, the destination-utility determiner (325B) can be configured to obtain a destination-utility factor for a geographic location from a local information repository (393). In further embodiments, for example, the destination-utility determiner (325B) can be configured to determine a destination-utility factor for a geographic location that is a value between 0 and 1, responsive to one or more destination-utility parameters. In even further embodiments, for example, determining a destination-utility factor for a geographic location responsive to one or more destination-utility parameters can include performing computer implemented methods (or portions of computer implemented methods) as described further herein, including, for example, computer-implemented method (500) as can be shown in FIG. 5.

A utility score aggregator (326), for example, can be configured to determine an aggregate probabilistic utility score (including a plurality of individual probabilistic utility scores) for a geographic location, for example, one of the candidate geographic locations. In certain embodiments, the utility score aggregator (326) can be configured to determine an aggregate probabilistic utility score for non-candidate geographic locations. An aggregate probabilistic utility score is indicative of how useful an internet-based service targeted to a certain geographic location (e.g., a targeted geographic location) might be to a user having a positional location being probabilistically distributed among a plurality of candidate geographic locations (i.e., probabilistic user locations), in light of a plurality of utility factors. In certain embodiments, the plurality of utility factors can include, for example, a plurality of route-utility factors, a plurality of trip-utility factors, and a plurality of destination-utility factors. For example, an aggregate probabilistic utility score for a targeted geographic location can provide a normalized score (e.g., between 0 and 1) indicative of how useful it might be for any user, probabilistically located among any of the candidate geographic locations, to receive goods or services available at the targeted geographic location, in light of various utility factors, including certain utility factors that can be perceived by or appreciated by the user.

The utility-score aggregator (326) can be configured to determine an aggregate probabilistic utility score responsive to a plurality of utility factors and a plurality of candidate confidence levels for a plurality of probabilistic user locations (e.g., candidate geographic locations). In certain embodiments, for example, the pre-determined utility factors can include, for example, route-utility factors, trip-utility factors, or destination-utility factors. In certain embodiments, for example, the utility-score aggregator (326) can be configured to determine an aggregate probabilistic utility score responsive to utility factors provided by one or more of the route-utility determiner (324), the trip-utility determiner (325A), or the destination-utility determiner (325B). In certain embodiments, the utility-score aggregator (326) can be communicatively coupled with the route-utility determiner (324), the trip-utility determiner (325A), or the destination-utility determiner (325B) to receive the plurality of pre-determined utility factors. In certain embodiments, as can be shown in FIG. 3B, the utility-score aggregator (326) can be communicatively coupled with the candidate geographic location probability determiner (322) to receive the plurality of relative probability values for the plurality of probabilistic candidate geographic locations.

In even further embodiments, for example, the utility-score aggregator (326) can be configured to determine an aggregate probabilistic utility score for a geographic location that is a value between 0 and 1, responsive to one or more utility-aggregation algorithms. Even further still, in certain embodiments, for example, the utility-aggregation algorithms can apply computer implemented methods (or portions of computer implemented methods) as described further herein, including, for example, computer-implemented method (500) as can be shown in FIG. 5. And even further still, in certain embodiments, for example, the utility-aggregation algorithms can include the application of various utility-aggregation formulas, including, for example, formulas [2], [3], [4], and [5] as are defined herein.

An internet-based services provider (328), for example, can be configured to provide internet-based services responsive to a request, for example, for search results, advertisements, e-commerce services, marketing and reporting services, etc. In some embodiments, the internet-based services provider (328) can be configured to associate both the request and a targeted geographic location with electronic information ("content"), for example, by selecting such content in the services information repository (394). For example, an internet search engine can be configured to associate a search query and a targeted geographic location with content relating to both the query and the targeted geographic location. In some embodiments, the internet-based services provider (328) can be configured to associate the request with electronic information ("content"), for example, by accessing data in the services information repository (394) and to process the content with based on the targeted geographic location. For example, an internet search engine can be configured to associate a search query with content relating to the query and, then, to sort the content based on distance from the targeted geographic location. In even further embodiments, the internet-based services provider (328) can provide internet-based services with respect to the content; for example, by selecting, retrieving, processing, updating, transmitting, or otherwise acting upon content with respect to the targeted geographic location. For example, content can be selected, retrieved, and transmitted to a client device (310), transmitted to a separate server device (not shown), updated, used in a separate process, stored in a different database, etc. as part of providing the internet-based service. Those having skill in the art will also appreciate that the internet-based services provider (328) can provide internet-based services with respect to the targeted geographic location; for example, content associated with the targeted geographic location can be selected, retrieved, and transmitted to a client device (310), transmitted to a server device along with the targeted geographic location (not shown), updated to include or reference the targeted geographic location, stored in a different database responsive to the targeted geographic location, etc.

Figure 3E:
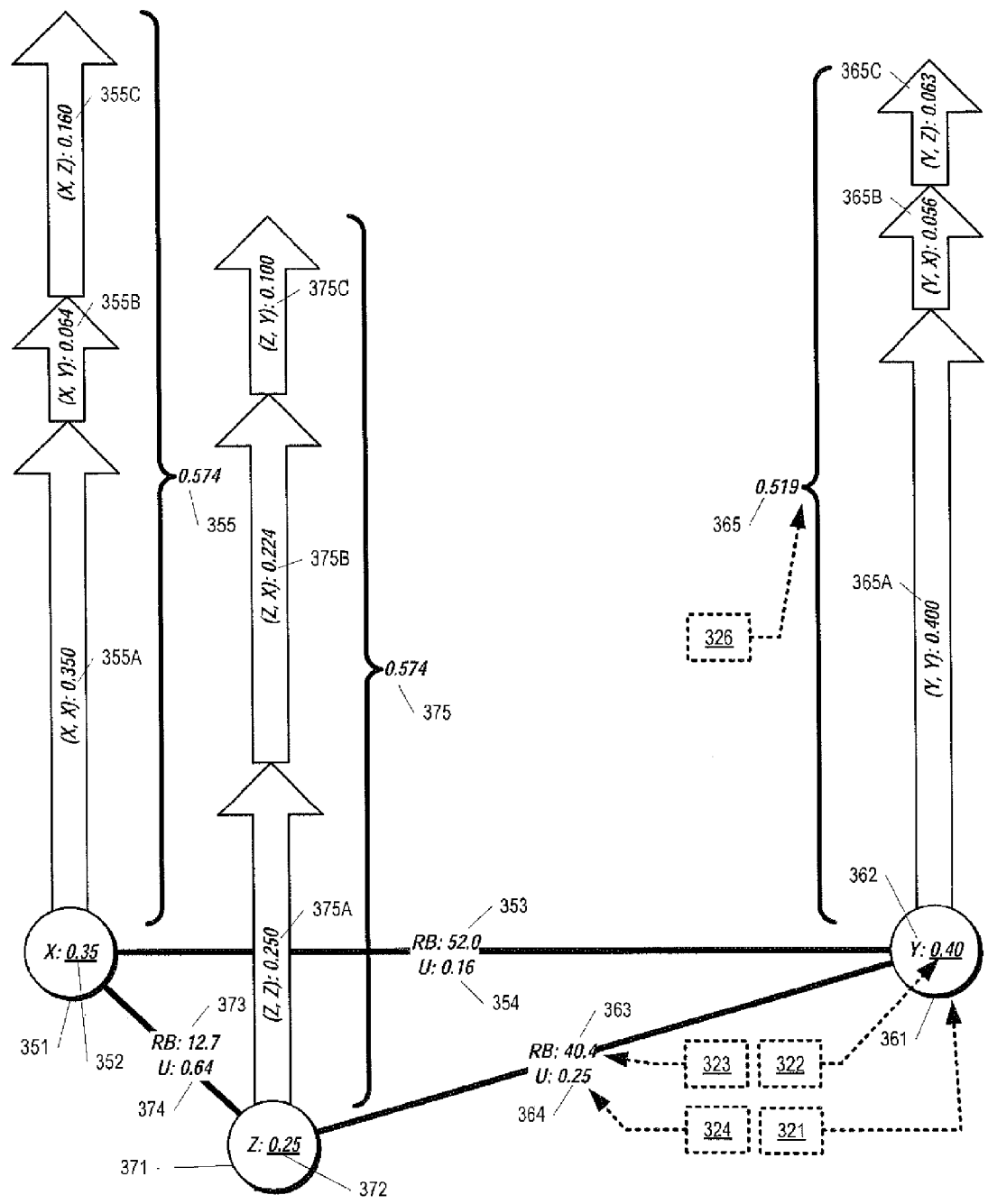
FIG. 3E includes a schematic diagram of various modules and various data processed by such modules according to various embodiments.

FIG. 3E provides a schematic illustration of the products of one or more systems, computer program products, or computer-implemented methods according to various embodiments of the invention. For exemplary purposes, FIG. 3E can be described with reference to embodiments of a system (300) as illustrated in FIG. 3A. As can be shown with reference to FIG. 3E, one or more candidate geographic locations X (351), Y (361), and X (371) are illustrated as spatially separated circles representing points on a map. The spatial separation between the candidate geographic locations is not intended to be to any particular scale but is intended to be indicative of a proportional geographical separation on the earth's surface. The identity of the one or more of the candidate geographic locations, e.g., candidate geographic location Y (361), can be determined, for example, by one or more candidate geographic location determiner (321), for example, responsive to an internet address associated with a client device or position information associated with a client device. Because the candidate geographic locations are probabilistic user locations, it is understood that not all of the candidate geographic locations will correspond to the actual positional location of the client device; and, certainly, it is possible that none of the candidate geographic locations correspond to the actual positional location of the client device.

As can be further shown with reference to FIG. 3E, one or more candidate confidence levels (352, 362, and 372) can be shown for the corresponding candidate geographic locations (351, 361, and 371). The one or more candidate confidence levels, e.g., (362) can be determined, for example, by one or more geographic location probability determiner (322), for example, responsive to an internet address associated with a client device or position information associated with a client device. Each of the one or more relative candidate confidence levels (352, 362, 372) can correspond to the probability that the client device has a positional location at or adjacent to a probabilistic user location (e.g., a candidate geographic location) over all other probabilistic user locations, e.g., the plurality of candidate geographic locations (351, 361, 371). With reference to the specific example provided by FIG. 3E, for example, the candidate confidence level for X is 35%, the candidate confidence level for Y is 40%, and the candidate confidence level for Z is 25%.

In FIG. 3E, one or more route-burden parameters (353, 363, 373) can be shown for (X,Y), (Y, Z), and (Z, X). The one or more route-burden parameters (353, 363, and 373) can be determined, for example, by one or more route-burden determiner (323), for example, responsive to a plurality of candidate geographic locations. In the example provided in FIG. 3E, the one or more route-burden parameters (353, 363, and 379) represent distance between the geographic locations. Although the route-burden parameters in this example are bidirectional, other embodiments may provide for multiple unidirectional trip burden parameters, wherein the route-burden would be different for (X, Y) and (Y, X). Although not shown in FIG. 3E, route-burden parameters for (X, X), (Y,Y), (Z, Z) can also be determined, for example, reflecting the situation where the probabilistic user location may be the same as the targeted geographic location. According to various embodiments, the route-burden parameters for such same-location pairs would be zero (0) (unless, according to various embodiments, travel within a geographic location— i.e., between geographic locations of more detailed resolution within the greater geographic location—is accounted for).

As can be further shown with reference to FIG. 3E, one or more route-utility factors (354, 364, 374) can be shown for (X, Y), (Y, Z), and (Z, X). The route-utility factor reflects the fact that the utility of an internet-based service targeted to a certain geographic location can depend, at least in part, on the burden of travelling a route between a user's positional location and the targeted geographic location. By way of example, the usefulness of presenting online advertisements relating to a pizza restaurant may vary to different users at different locations. A user that is located thirty (30) miles from the pizza restaurant may find the advertisement to be of marginal utility, for example, due to the excessive distance or time involved in making a trip to the pizza restaurant. A user that is located thirty (30) miles from the pizza restaurant may also find the advertisement to be of marginal utility, for example, due to the excessive time involved in a delivery person making a trip to the user from the pizza restaurant. In contrast, a user that is located on the same block as the pizza restaurant may find such an advertisement to be of great utility, for example, due to the relative lack of any burden in travelling to the pizza restaurant.

One or more route-utility factors, e.g., factor (364), can be determined, for example, by one or more route-utility determiner (324), for example, responsive to a plurality of candidate geographic locations and a plurality of route-burden parameters for pairs within the plurality of candidate geographic locations. The route-utility determiner (324) can apply route-utility algorithms or predetermined selection criteria to relate a route-utility factor to any of a variety of route-burdens. In the example provided by FIG. 3E, the route-utility factor is inversely related to the route-burden. By way of example, FIG. 3E shows one route-utility factor (354) that is indicative of the utility of an internet-based service targeted to one geographic location (351 or 361) to a user receiving the internet-based service at another geographic location (361 or 351), depending on the route burdens associated with (X,Y) or (Y,X). Although not shown in FIG. 3E, route-utility factors for (X, X), (Y,Y), (Z, Z) can also be determined, for example, reflecting the situation where the probabilistic user location may be the same as the targeted geographic location. According to various embodiments, the route-burden parameters for such same-location pairs would be one (1) (unless, according to various embodiments, travel within a geographic location—i.e., between geographic locations of more detailed resolution within the greater geographic location—is accounted for).

As can be further shown with reference to FIG. 3E, one or more aggregate probabilistic utility score (355, 365, and 375) can be shown for a respective candidate geographic location (351, 361, and 371). The one or more aggregate probabilistic utility scores, e.g., aggregate probabilistic utility score (365), can be determined, for example, by one or more utility-score aggregator (326), for example, responsive to a plurality of candidate geographic locations, a plurality of route-utility factors corresponding to pairs of geographic locations among the plurality of candidate geographic locations, and a plurality of candidate confidence levels for the candidate geographic locations. Each aggregate probabilistic utility score (355, 365, and 375) for a respective geographic location can be, for example, a sum of a plurality of individual probabilistic utility scores for the respective candidate geographic location. For example, an aggregate probabilistic utility score for Y includes the individual probabilistic utility scores for (Y, Z), (Y, X), and (Y, Y), and can be referred to as the aggregate probabilistic utility score for (Y, {Z,X,Y}). As can be shown with reference to FIG. 3E, an exemplary aggregate probabilistic utility score (355) for the respective candidate geographic location (351) is a sum of one or more individual probabilistic utility scores (355A, 355B, 355C) for the respective candidate geographic location (351). Each of the one or more individual probabilistic utility scores with any given candidate geographic location relates to a pair of geographic locations including the given candidate geographic location (inclusive of pairs including only one geographic location). In more particular detail, the probabilistic utility score (355A) relates to (X, X), the probabilistic utility score (355B) relates to (X, Y), and the probabilistic utility score (355C) relates to (Z, X). An individual probabilistic utility score can be determined responsive to the probability that a probabilistic user location is in, near, or adjacent to the origin geographic location. By way of example, the individual probabilistic utility score (355B) for (X, Y) can be determined responsive to a positive relationship with candidate confidence level (362) for Y and the route-utility factor (354) for (X, Y).

In the example provided in FIG. 3E, the greatest aggregate probabilistic utility score is 0.574 for both X and Z. The aggregate probabilistic utility score for Y is less, at 0.519. Accordingly, internet-based services targeted on either X or Z could be expected to provide the greatest utility to a user probabilistically located among candidate geographic locations {X,Y,Z}—even though the actual positional location of the user is not known, and even though the actual positional location of the user most likely to be at or adjacent to geographic location Y, according to the candidate confidence level.

This result is consistent with the relative clustering of X and Z and the relative remoteness of Y from X and Z. For example, if geographic location X represents Palo Alto, Calif., geographic location Z represents Redwood City, Calif., and geographic location Y represents San Francisco, Calif., a user located at or adjacent to either Palo Alto or Redwood City may derive more utility from a web search targeted on either city than he would from a web search targeted on San Francisco. Conversely, a user located at or adjacent to San Francisco would derive more utility from a web search targeted on San Francisco than he would from a web search targeted on either Palo Alto or Redwood City. In an extreme example, where geographic location Y represents Seattle, Wash., the utility derived by a user at or adjacent to Seattle would be negligible for web searches being targeted on either Palo Alto or Redwood City.

Figure 4:
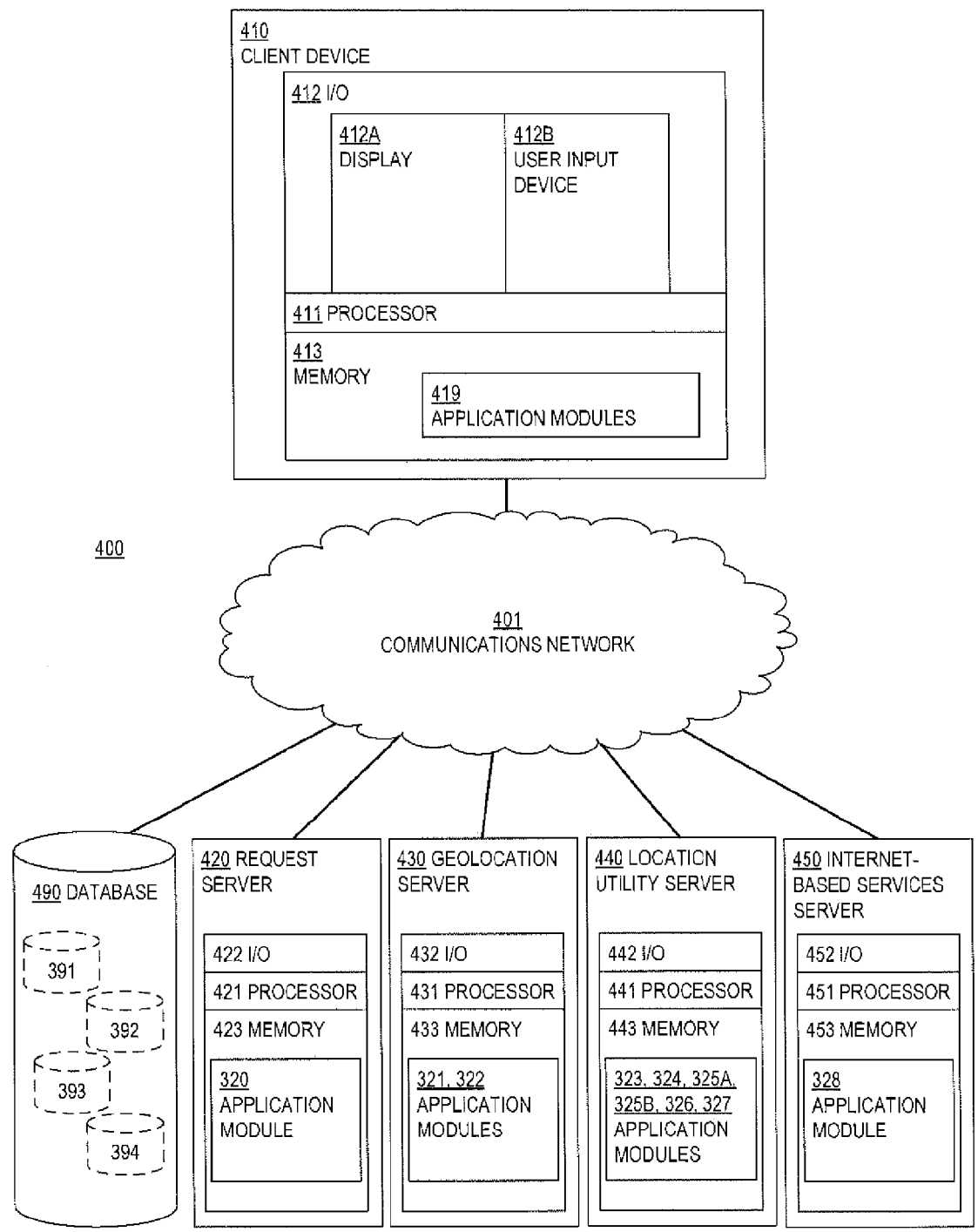
FIG. 4 includes a schematic diagram of various systems according to various embodiments.

In an exemplary embodiment, for example, the one or more modules (321, 322, 323, 324, 325A, 325B, 326, 327, 328) can be implemented on one or more web servers or application servers such as servers (420, 430, 440, 450) as can be shown with reference to FIGS. 3C and 3D. In more particular aspects, FIG. 4 depicts various embodiments of systems (400) including one or more client device in communication with one or more server device, for example, through the communication network (401). In some embodiments, client device may be configured as a client and server device as a server in a client-server relationship. Other embodiments, however, may not embody the client-server model, and can be implemented, for example, according to a peer-to-peer model. Also, for example, the client device can be a "server" in some aspects, and the server device can be a "client" in some aspects, which will be understood by those having skill in the art in light of the embodiments disclosed.

In one example of embodiments, system (400) can include various computing devices such as a client device (410), a request server (420), a geolocation server (430), a location utility server (440), and an internet-based services server (450), each of which can be communicatively coupled through the communications network (401). In addition, each of the above-mentioned computing devices can be communicatively coupled, e.g., through the communications network (401), to a one or more databases, as represented by database (490). According to certain embodiments, database (490) can include, for example, any of the above-mentioned data repositories (391,392,393,394).

A client device (410), for example, can provide a platform for one or more users to interact with the one or more servers with respect to the internet-based services, for example, to submit requests and, also for example, to receive content for internet-based services. According to certain embodiments, a request server (420), for example, provide a platform for receiving the request, including an IP address for a client device, and interacting with other servers that provide geolocation services, utility-determining services, and internet-based services with respect to the request and the IP address. According to certain embodiments, a geolocation server (430), for example, can provide a platform for receiving an instruction to provide geolocation services with respect to the IP address and returning a plurality of candidate geographic locations and a corresponding plurality of candidate confidence levels. According to certain embodiments, a location utility server (440), can provide a platform for receiving the candidate geographic locations and the candidate confidence levels; calculating aggregate probabilistic utility scores for geographic locations, such as the candidate geographic locations, based on the plurality of candidate geographic locations and the corresponding plurality of candidate confidence levels; and selecting a targeted geographic location responsive to an aggregate probabilistic utility score for the targeted geographic location. According to certain embodiments, an internet-based services server (450) can provide a platform for receiving a targeted geographic location and processing internet-based services responsive to a targeted geographic location and, in some embodiments, returning content relating to such internet-based services to the client device (410). Not all embodiments, however, perform geolocation services, provide internet-based services, or allow one or more end users to interact with the one or more servers, as the techniques described below have other applications, and other embodiments may offer other or different advantages, some of which are described below.

According to certain embodiments, an example of a client device can be a personal computer, a mobile device, a laptop computer, a tablet computer, and so on. According to certain embodiments, an example of a server device can be an application server or a web server. In some embodiments, however, a server device may not specifically be an application server or a web server but, instead, can be any type of computing device to execute one or more processes upon request by another computing device, for another computing device, or to be output to another computing device. The other computing device can be, for example, a client device or another server device.

In various embodiments, a client device may be configured as shown with respect to client device (410) in FIG. 4, which is provided to request, receive, or request and receive internet-based services. Client device (410) can include a processor (411), an input/output unit ("I/O") (412) in communication with the processor, and a memory (413) in communication with the processor (411). According to some embodiments, client device (410) can further include other components as are described further herein. Also, in various embodiments, another server device may be configured as shown with respect to the request server (420) in FIG. 4, which is provided to receive requests for internet-based services and to interact with other servers to process the request. Request server can include a processor (421), an input/output unit ("I/O") (422) in communication with the processor, and a memory (423) in communication with the processor (421). According to some embodiments, request server (420) can further include other components as are described further herein. Also, in various embodiments, another server device may be configured as shown with respect to the geolocation server (430) in FIG. 4, which is provided to perform geolocation services as known in the art, including, for example, to identify a plurality of candidate geolocations and a plurality of candidate confidence levels. Geolocation server can include a processor (431), an input/output unit ("I/O") (432) in communication with the processor, and a memory (433) in communication with the processor (431). According to some embodiments, geolocation server (430) can further include other components as are described further herein. Also, in various embodiments, another server device may be configured as shown with respect to location utility server (440) in FIG. 4, which is provided to determine score geographic locations with respect to the utility, to a user, of the geographic locations. Location utility server can include a processor (441), an input/output unit ("I/O") (442) in communication with the processor, and a memory (443) in communication with the processor (441). According to some embodiments, location utility server (440) can further include other components as are described further herein. Also, in various embodiments, another server device may be configured as shown with respect to internet-based services server (450) in FIG. 4, which is provided to process requests for internet-based services, including targeting internet-based services on one or more specific geographic locations. Internet-based services server can include a processor (451), an input/output unit ("I/O") (452) in communication with the processor, and a memory (453) in communication with the processor (451). According to some embodiments, internet-based services server (450) can further include other components as are described further herein.

Included in the memory (423, 433, 443, 453) of one of the servers (420, 430, 440, 450), for example, can be one or more application modules (320, 321, 322, 323, 324, 325A, 325B, 326, 327, 328) that, when executed by the processor (423, 433, 443, 453), provide various functions relating to internet-based services. In certain embodiments, for example, one server can be configured as an application server or middleware server, and another server can be configured as a web server, a back-end application server, or both, for example, for handling requests for internet-based services or for processing one or more internet-based services according to an application module stored in the memory (e.g., the web-based services module 628, or any web search application, ad serving application, social networking application, e-commerce application, etc. known to those having skill in the art). The foregoing description of servers (420, 630, 640, and 650) as individual computers is provided for exemplary purposes only, and embodiments of the present invention are not limited to embodiments using any fixed number of servers. For example, those having skill in the art will appreciate that embodiments of the present invention can include a plurality of servers, or a plurality of processors, or a plurality of input/output units, and a plurality of memories to perform the functions described of one or more servers herein.

As can be shown with further reference to FIG. 6, one or more client devices, such as client device (410), and one or more servers, such as servers (420, 630, 640, 650), can be communicatively coupled over a communications network (401), thereby allowing electronic communication and data transmissions between any of the coupled devices using various protocols that will be understood by those having skill in the art. Communications network (401) can include, for example, one or more interconnected communications networks, such as the Internet, as is described further herein, e.g., with respect to communications network (301).

FIG. 4 depicts that there can be stored on the client device (410), e.g., on the memory (413), one or more application modules (419). Each of the one or more application modules (419) can be operable on the processor (411) to allow the client device to execute the one or more application modules (419). In certain embodiments, the one or more application modules (419) can include, for example, an operating system known to those having skill in the art and various applications that will be known to those having skill in the art, such as a web-browser application, an email client application, an FTP client application, etc. A web-browser application can, for example, when executed by the processor (411), receive information from one or more remote servers through the Internet, including information relating to an internet interface, display an internet interface to an end user of the client device through one or more display (412A), receive user input through a user-input device (412B) with respect to the internet interface, and transmit requests to one or more remote servers through the Internet, e.g., responsive to information received from the one or more remote servers.

Even further, FIG. 4 also depicts that there can be stored on the request server (420), e.g., on the memory (423), one or more application modules. Each of the one or more application modules can be operable on the processor (421) to allow the request server (420) to execute the one or more application modules. In certain embodiments, the one or more application modules can include, for example, an internet-based services request handler (320). Even further, FIG. 4 also depicts that there can be stored on the geolocation server (430), e.g., on the memory (433), one or more application modules. Each of the one or more application modules can be operable on the processor (431) to allow the geolocation server (430) to execute the one or more application modules. In certain embodiments, the one or more application modules can include, for example, a candidate geographic location determiner (321) and a candidate geographic location probability determiner (322). Even further, FIG. 4 also depicts that there can be stored on the location utility server (440), e.g., on the memory (443), one or more application modules. Each of the one or more application modules can be operable on the processor (441) to allow the location utility server (440) to execute the one or more application modules. In certain embodiments, the one or more application modules can include, for example a route-burden determiner (323), a route-utility determiner (324), a trip-utility determiner (325A), a destination-utility determiner (325B), a utility-score aggregator (326), and a target geographic location selector (327). Even further still, FIG. 4 also depicts that there can be stored on the internet-based services server (450), e.g., on the memory (453), one or more application modules. Each of the one or more application modules can be operable on the processor (451) to allow the internet-based services server (450) to execute the one or more application modules. In certain embodiments, the one or more application modules can include, for example, an internet-based services provider (328).

As will be apparent to those having skill in the art, some of the above-mentioned may also be stored on other computing devices, including devices not described herein such as devices in "the cloud" and made remotely accessible to the device, e.g., through communication network (401). Likewise, any of the application modules can be positioned in communication with and among each other according to various APIs (application programming interfaces), standards, or protocols. Further, in some embodiments, one or more application modules stored on one computing device may be remotely accessible to another computing device as a client in a client-server architecture, for example, through the communication network (401).

The one or more client devices and the one or more server devices can be configured according to various embodiments of the present invention. For example, a client-device processor (411) can execute instructions to submit a request for internet-based services and to display content received responsive to such request to a user of a client device. Also, for example, one server (420) can be a web server, such as the web server (440) illustrated in FIG. 4C, configured to send and receive communications with a client device (410) over the world-wide web or an application server, such as the web server (440) illustrated in FIG. 4C, configured to handle requests for internet based services responsive to receiving requests from a client device (410). Accordingly, an internet-based services handler (420) can be stored at the memory (423) and executed at the processor (421). Also, for example, one server (430) can be an application server, such as the geolocation probability server (441) illustrated in FIG. 4C, configured to determine a plurality of candidate geographic locations and corresponding relative probabilities responsive to a request from a client device (410). Accordingly, a candidate geographic location determiner (421) and a candidate geographic location probability determiner (422) can be stored at the memory (433) and executed at the processor (431). Also, for example, another server (440) can be an application server, such as the geolocation utility server (442) illustrated in FIG. 4C configured to determine any of a plurality of route-utility burdens, route-utility factors, trip-utility factors, or destination-utility factors. Accordingly, a route-burden determiner (423), a route-utility determiner (424), a trip-utility determiner (425A), a destination-utility determiner (425B), a utility-score aggregator (426), and a target location selector (427) can be stored at the memory (443) and executed at the processor (441). Also, for example, one server (450) can be a web server, such as the web server (443) illustrated in FIG. 4C, configured to send and receive communications with a client device (410) over the world-wide web or an application server, such as the web server (443) illustrated in FIG. 4C, configured to process internet based services responsive to receiving requests from a client device (410). Accordingly, internet-based services provider (428) can be stored at the memory (453) and executed at the processor (451).

As will be understood with reference to the following paragraphs and the drawings referenced below, various embodiments of computer-implemented methods are provided herein, some of which can be performed by various embodiments of apparatuses and systems described herein, and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such computer-readable storage media with regard to embodiments of computer-implemented methods described. Likewise, any reference to the following computer-implemented methods with respect to systems and computer-readable storage media is provided for explanatory purposes, and is not intended to limit any of such computer-implemented methods described.

Figure 5:
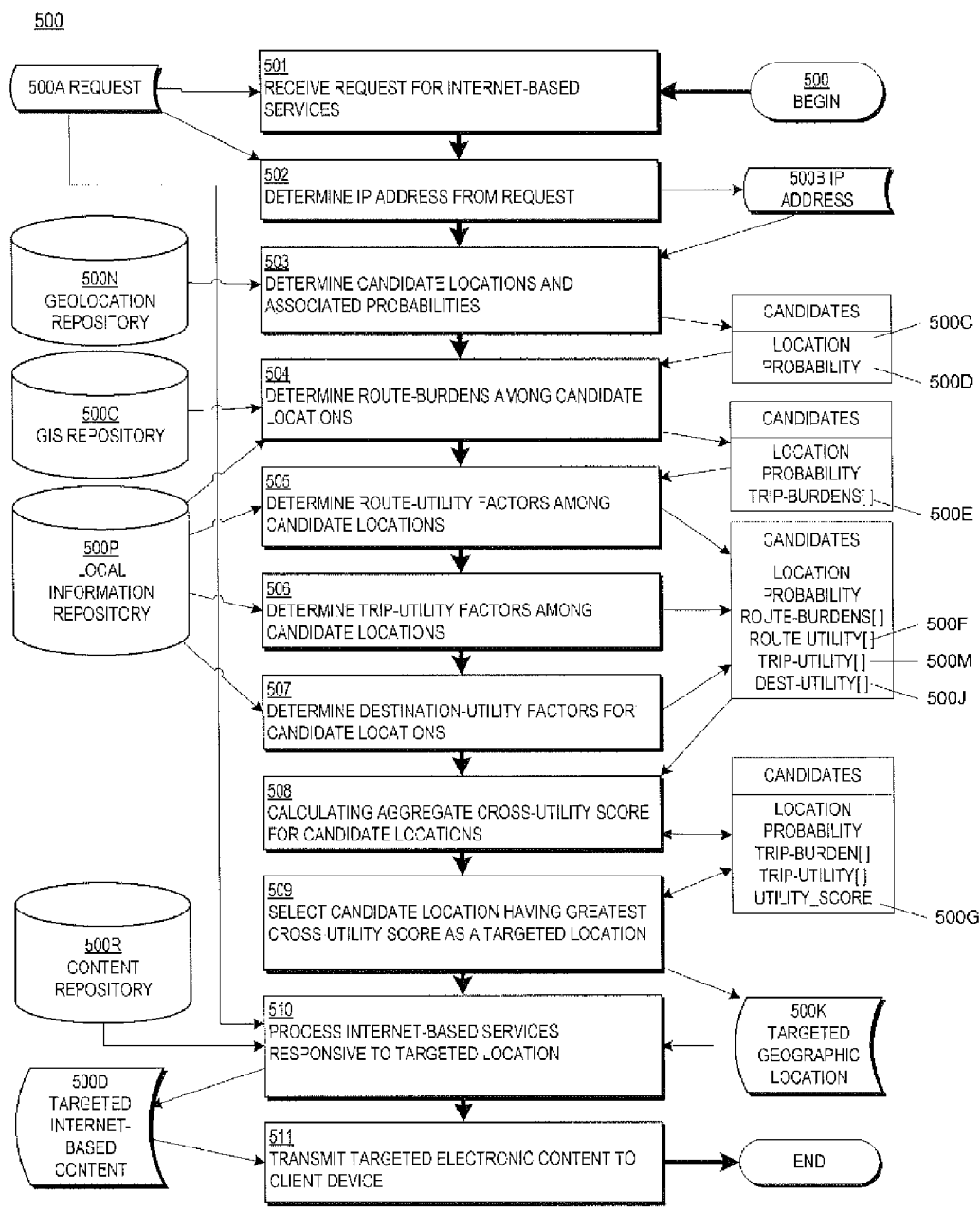
FIG. 5 includes a flow chart of various computer-implemented methods according to various embodiments.

As can perhaps be best shown in FIG. 5, embodiments of one or more computer implemented methods (500) to target internet-based services on a targeted geographic location are provided. In certain aspects, FIG. 5 depicts one or more computer-implemented methods to generate a dataset corresponding to the aggregate probabilistic utility for a plurality of geographic locations, from which a targeted geographic location can be selected based on aggregate probabilistic utility. In certain aspects, FIG. 5 depicts computer-implemented methods to determine an aggregate probabilistic utility score for each of a plurality of geographic locations.

Figure 11:
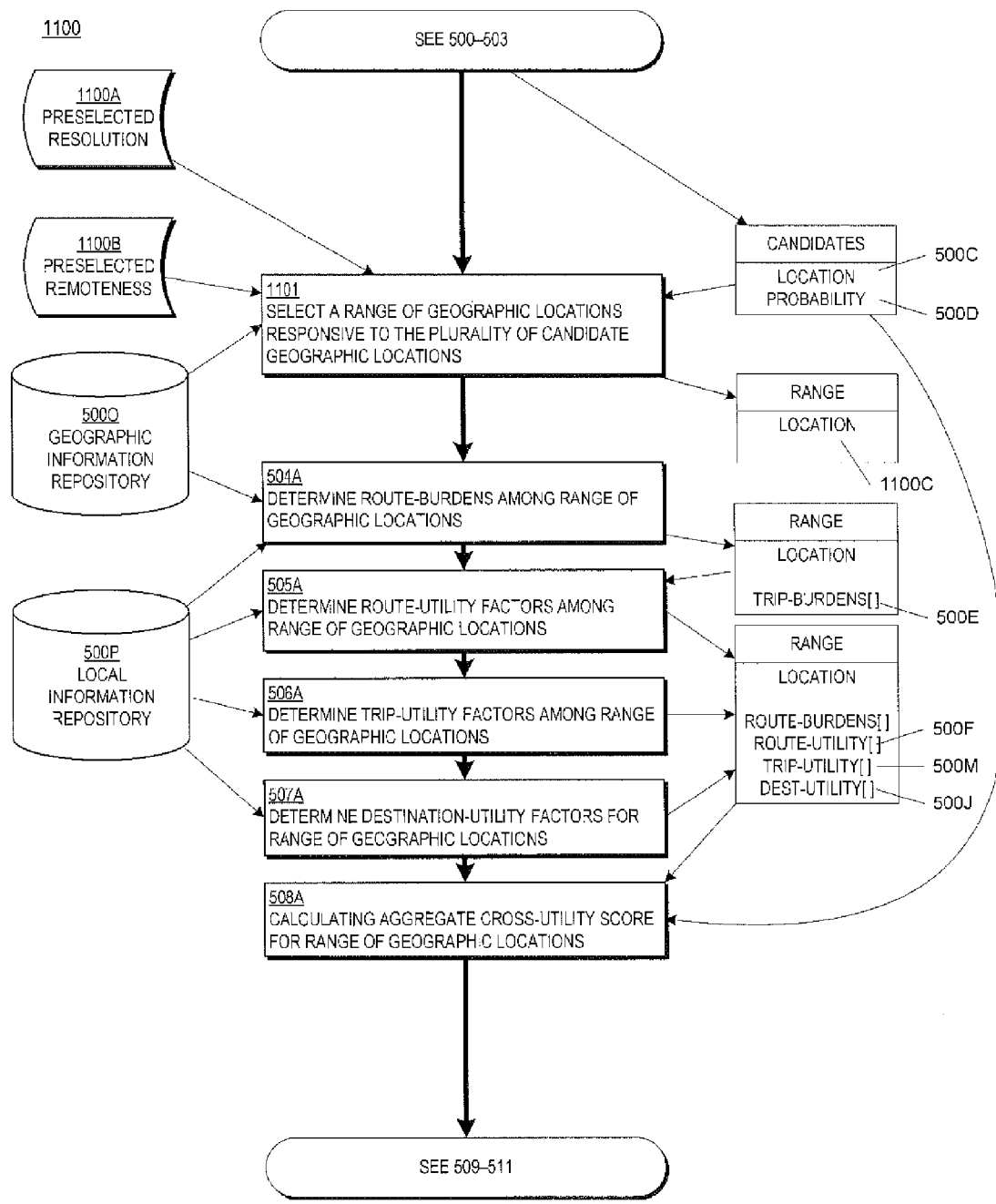
FIG. 11 includes a flow chart of various computer-implemented methods according to various embodiments.

As can be shown with reference to FIG. 5, embodiments of computer-implemented methods (500) can include receiving (501) a request for internet-based services. Also, as can be shown with reference to FIG. 8, embodiments of computer implemented methods (800) can also include receiving (801) a request for internet-based services including information indicative of a positional location ("client positional information") (800A) of a client device. Also, as can be shown with reference to FIG. 11 and FIG. 12, embodiments of computer implemented methods (1100, 1200) can include receiving (1101) a request for internet-based services including a text query (1100C), such as an internet search query or, perhaps, an advertisement keyword.

In some embodiments, for example, receiving (501, 801) a request for internet-based services can be performed by an internet-based services handler (220), for example, implemented on software running on a server, such as server (420). Also, in various embodiments, for example, server (420) can be a web server operable to receive the request (500A) from the client device (410) over the world-wide web.

In certain embodiments, receiving (501,801) the request for internet-based services can be performed responsive to a request (500A). In further embodiments, receiving (501,801) a request can be performed responsive to a computing device transmitting the request (not shown), e.g., such as a client device transmitting the request through a web browser. In other embodiments, for example, the request can be received from a server device.

In more particular aspects, Internet-based services can include, for example, internet search services, internet advertisement services, e-commerce services, marketing and reporting services, etc., for example, to an end user (e.g., at a client device). Also, in more particular aspects, the request (500A) can be any type of reference to, or a query for, any electronic resource or resources associated with providing internet-based services. Requests can include, for example, requests to process internet searches (search requests), requests to serve advertisements (ad requests), or requests to deliver, transmit, update, or store any other electronic data including text, image, video, or audio (other requests). References to electronic resources can include, for example, references to an electronic resource that performs one or more actions or processing steps, including, for example, processing a search request by accessing an internet search repository, processing an advertisement by accessing an advertisement repository, or processing other requests by accessing any other type of data repository. Requests can relate to any type of references to an electronic resource known to those having skill in the art, including, for example a Uniform Resource Identifier (URI), a Uniform Resource Locator (URL), or Uniform Resource Name (URN).

As can be shown with further reference to FIG. 5, embodiments of computer-implemented methods (500) can further include determining (502) an internet address (500B) (e.g., an IP address) responsive to the request (500A). In some embodiments, for example, determining (502) an internet address can be performed by an internet-based services handler (220), for example, implemented on software running on a server, such as server (420). In certain embodiments, determining (502) an internet address can be performed responsive to the request (500A). In further embodiments, determining (502) an internet address can be performed responsive to receiving (501) a request for internet-based services.

In more particular aspects, each request can include or can be associated with an internet address for a client device. In certain embodiments, the client device can be the client device transmitting the request to the server performing the computer-implemented methods (500). In other embodiments, however, the client device can be any client device configured to receive electronic content relating to the request. In such an embodiment, for example, the request can be transmitted by the same server performing the computer-implemented methods (500) (e.g., in executing a different process) or by any other server performing any other computer-implemented methods (e.g., a back-end server processing an electronic order). The IP addresses can be determined according to various techniques that will be appreciated by those having skill in the art, for example, according to the Internet Protocol Suite (TCP/IP) or according to various techniques for associating an IP address with a request (e.g., at the application layer) to determine an IP address of a device other than the requesting device.

As can be shown with further reference to FIG. 5, embodiments of computer-implemented methods (500) can further include, for example, a step of determining (503) a plurality of candidate geographic locations (500C) and a corresponding plurality of corresponding probability values (500D) responsive to the internet address (500B). In some embodiments, for example, determining (503) a plurality of candidate geographic locations can be performed by the candidate geographic location determiner (321), for example, implemented on software running on a server, such as geolocation server (430), configured as an application server and being operable to receive an IP address, for example, over the communications network (401). In certain embodiments, determining (503) a plurality of candidate geographic locations can be performed responsive to the internet address (500B). In further embodiments, determining (503) a plurality of candidate geographic locations can be performed responsive to determining (502) an internet address and receiving the internet address.

In more particular aspects, a the plurality of candidate geographic locations (500C) can be those geographic locations that have some predicted correlation to the internet address (500B) meaning that the positional location of a client device having the internet address (500B) might be at or adjacent to such geographic locations. Because geographic locations can be expressed according to various degrees of precision (i.e., resolution), and because such correlations are often imprecise, it will be understood by those having skill in the art that precise positional location of a client device having the internet address (500B) may not be included in any of the plurality of candidate geographic locations and that certain candidate geographic locations may be more closely related to the precise positional location of the client device than are other candidate geographic locations.

Data indicative of correlations between internet addresses and one or more geographic locations can be stored at a data repository, such as an internet address repository (500N), for example. Data indicative of such correlations can be provided in, for example, internet service provider (ISP) records. Additionally, various data mining or data logging techniques can provide data associating internet addresses, internet address blocks, or internet address masks with geographic locations (including, for example, GPS positioning software, telecommunications positioning software, etc. Those having skill in the art will appreciate various data sources correlating internet addresses with geographic locations at varying degrees of resolution, including, for example, regional internet registries, user-submitted geographic location data, ISP data records, Class C range, network hops, or any of a variety of publicly available geolocation databases. Those having skill in the art will also appreciate various techniques for relating a candidate confidence level with candidate geographic location for an internet address (500B). For example, various types of analytic methods (e.g., statistical analysis) are known for expressing or determining the accuracy of any of the candidate geographic locations, including, for example, historical statistics. For example, data indicative of candidate confidence levels have been associated with geolocation data provided in any of a variety of publicly accessible geolocation databases—including, for example, candidate confidence levels that are relative probability values.

Figure 8:
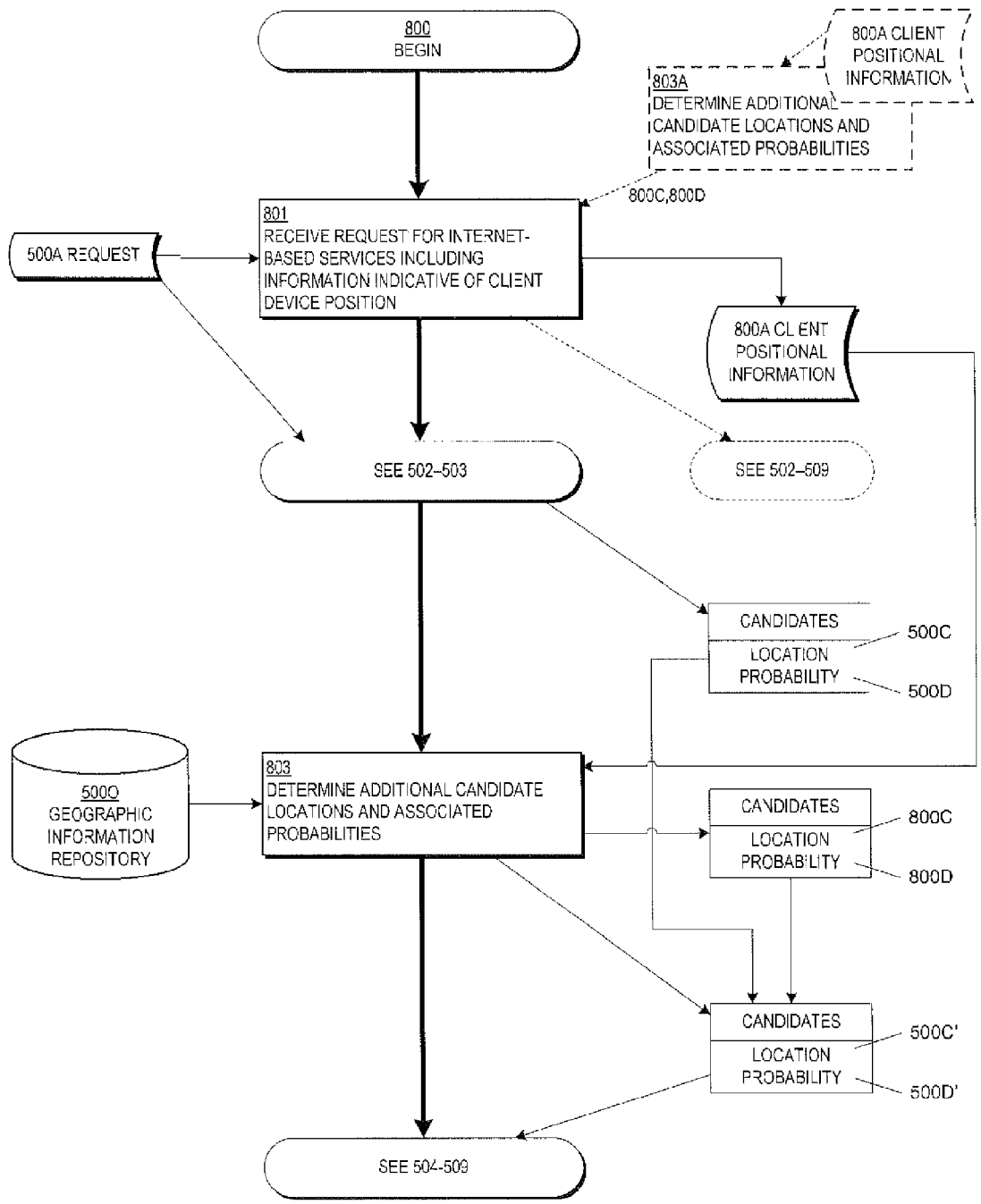
FIG. 8 includes a flow chart of various computer-implemented methods according to various embodiments.

As can be shown with reference to FIG. 8, embodiments of computer-implemented methods (800) can further include, for example, determining (803) one or more additional candidate geographic locations (800C) and a corresponding one or more candidate confidence levels (800D). In some embodiments, for example, determining (803) one or more additional candidate geographic locations and a corresponding one or more candidate confidence levels can be performed by a position determiner (321A) and a position probability determiner (322A), for example, implemented on software running on a server, such as geolocation server (430), as is shown in FIG. 3C. In some embodiments, the position determiner (321A) and the position confidence determiner (322A), for example, can be implemented on software running on the client device (410), as is shown in FIG. 3D. In embodiments where the determining (803A) step is performed at the mobile device (410), the positional information included in the request (800A) can be, for example, the additional candidate geographic locations (800C) and a corresponding one or more candidate confidence levels (800D).

In certain embodiments, determining (803, 803A) one or more additional candidate geographic locations (800C) and a corresponding one or more probability values (800D) can be performed responsive to positional information (800A) for the client device. Also, in certain embodiments, determining (803) one or more additional candidate geographic locations (800C) and a corresponding one or more probability values (800D) can be performed responsive to receiving (801) a request for internet-based services including the client positional information (800A).

Data associating information indicative of a positional location ("positional information") and one or more geographic locations can be stored at a data repository, such as a geographic information repository (i.e., a geographic information system) (500O), for example. Various types of geographic information repositories are generally known in the art, for example, to relate positional information to various types of geographic locations (e.g., of any resolution), route networks (e.g., roads, public transit, sidewalks, bike paths, etc.), buildings, transit terminals, points of interest, political boundaries, etc. The geographic information repository can be locally or remotely accessible to either the client device (410) or the GIS server (430), for example. Positional information (800A) can be used in determining a probability value associated with a position. For example, positional information (800A) can include accuracy parameters (e.g., signal strength or attenuation, accuracy range, etc.), and a probability value can be determined responsive to both the geographic location and the accuracy parameters. For example, positional information having an accuracy range of 1 square mile can result in a different probability value depending on the resolution of the geographic location. For example, if the geographic location has a fine resolution and is external to the accuracy range, the corresponding probability value will likely be lower. Also, for example, if the geographic location has a coarse resolution and is overlapping with the accuracy range, the corresponding probability value will likely be higher.

Figure 9:
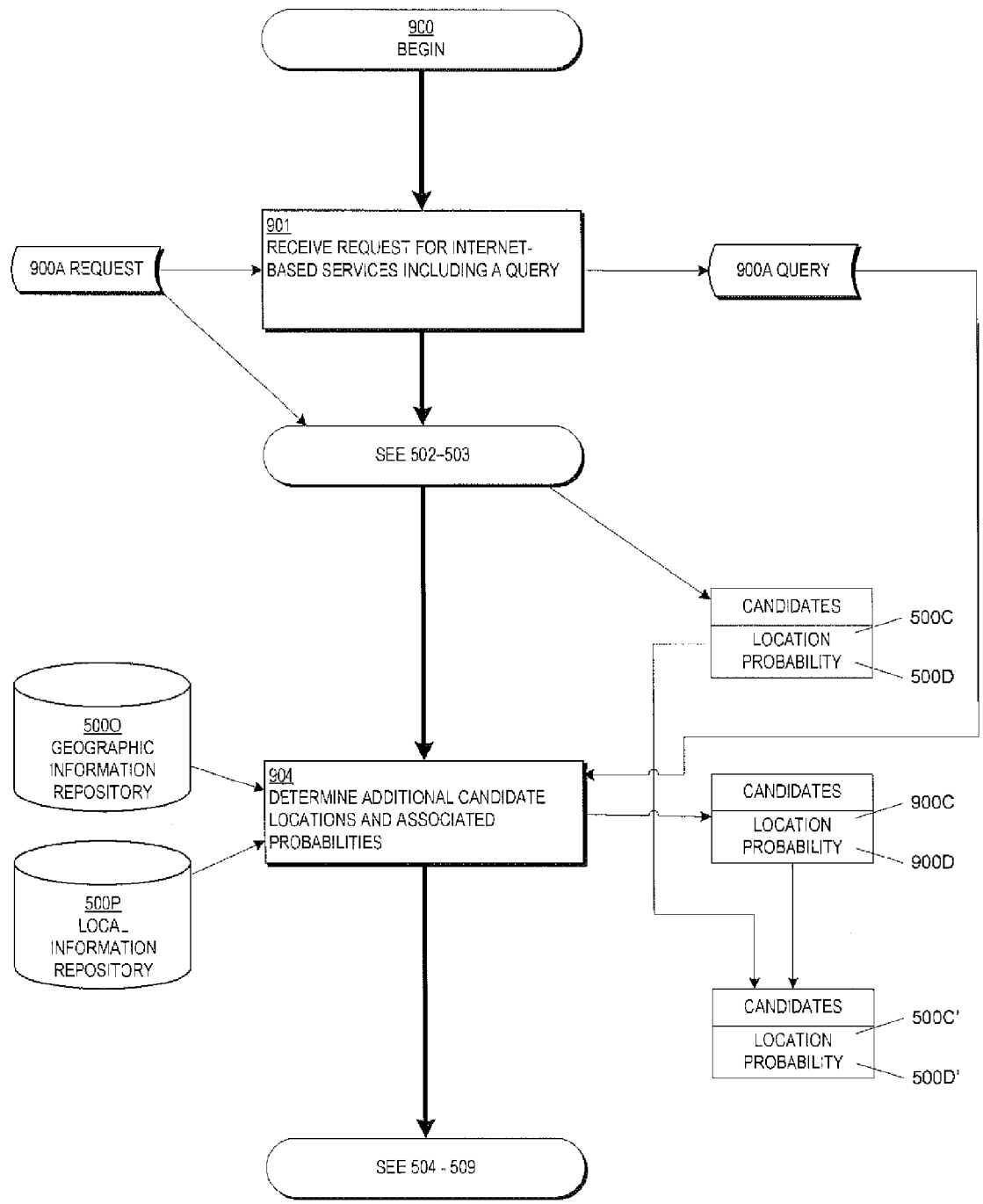
FIG. 9 includes a flow chart of various computer-implemented methods according to various embodiments.

As can be shown with reference to FIG. 9, embodiments of computer-implemented methods (900) can further include, for example, determining (904) one or more additional candidate geographic locations (900C) and a corresponding one or more candidate confidence levels (900D). In some embodiments, for example, determining (904) one or more additional candidate geographic locations and a corresponding one or more candidate confidence levels can be performed by a query locator (321B) and a query location probability determiner (322B), for example, implemented on software running on a server, such as geolocation server (430), as is shown in FIG. 3C. In certain embodiments, determining (904) one or more additional candidate geographic locations (900C) and a corresponding one or more probability values (900D) can be performed responsive to a query (900A), such as a search query or a keyword, for example. Also, in certain embodiments, determining (904) one or more additional candidate geographic locations (900C) and a corresponding one or more probability values (900D) can be performed responsive to receiving (901) a request for internet-based services including the query (900A).

In more particular aspects, data associating query terms (e.g., words or phrases) with one or more geographic locations can be stored at a data repository, such as a local information repository (500P) or a GIS repository (500O), for example. Various types of local information repositories (500P) are generally known in the art, for example, to relate text-records (e.g., descriptions, reviews, documents, webpages, keywords) to one or more geographic locations (e.g., of any resolution). Determining a candidate confidence level (900D) responsive to a query (900A) can include, for example, measuring, ranking, or scoring the relevancy of query terms to one or more text records for the candidate geographic location.

In circumstances where there one or more additional candidate geographic locations (800C, 900C) and additional candidate confidence levels (800D, 900D) are determined, i.e., in addition to the candidate geographic locations (500C) and the candidate confidence levels (500D), the combination of all candidate geographic locations and candidate confidence levels can be referred to as the combined candidate geographic locations (500C') and combined candidate confidence levels (500D'). For example, the combiner candidate geographic locations (500C') can be the union of the candidate geographic locations (500C) and the additional candidate geographic locations (500D). Also, for example, the candidate confidence levels (500D) can be factored together with the additional candidate confidence levels (800D), for example, such that the combined candidate confidence levels (500D') can be relative probability values.

Embodiments of computer-implemented methods (500) can further include, for example, determining (504) a plurality of route burdens (500E) associated with the plurality of candidate geographic locations (500C). In some embodiments, for example, determining (504) a plurality of route burdens can be performed by a route-burden determiner (423), for example, implemented on software running on a server, such as the location utility server (440). In certain embodiments, determining (504) a plurality of route burdens can be performed responsive to data for the plurality of candidate geographic locations (500C). In further embodiments, determining (504) a plurality of route burdens can be performed responsive to determining (503) a plurality of candidate geographic locations (500C) and a corresponding plurality of corresponding probability values (500D) responsive to the internet address (500B).

In more particular aspects, each of the plurality of route burdens (500E) can relate two any two or more geographic locations. For example, a route burden can relate to a pair of the candidate geographic locations (500C). A route burden can also relate to one of the candidate geographic locations (500C) and any other geographic location that is not one of the candidate geographic locations (a non-candidate geographic location). In even more particular aspects, one of the pair of geographic locations can be referred to as an "origin" and the other as a "destination." The terms "origin" and "destination" are not intended to require that an actual trip be contemplated, planned, undertaken, or completed, but are provided only in the context of understanding factors that contribute to the utility of certain geographic locations over others in light of hypothetical travel along a route. In certain circumstances, the origin geographic destination can be the same as the destination geographic location, in which case the associated route burden might be null or insignificant.

In even further detail, a route burden relates to a route between geographic locations, such as the origin geographic location and the destination geographic location. In some embodiments, the route can also relates to any geographic location along the route and the route can be referred to as being among such geographic locations. There may be many routes between geographic locations, including, for example, a hypothetical direct route or an "as the crow flies" route. In certain embodiment, routes can be ranked according to a comparative metric (e.g., most direct, shortest, fastest, cheapest, least traffic, most preferred, etc.) so that burdens associated with the routes can be compared in-kind among comparative routes. In certain embodiments, a route can be either a one-way route or a round-trip route. In some embodiments, each of the plurality of route burdens (500E) can be associated with any of the geographic locations included in the route. For example, a route-burden parameter can be associated with the origin geographic location, the destination geographic location, or any geographic location along the route.

In some embodiments, determining (504) a plurality of route burdens (500E) associated with the plurality of candidate geographic locations (500C) can be performed using geographic information systems known in the art (e.g., including a route-burden determiner (323), for example, to determine route-burdens such as driving distance, driving time, driving cost, etc. based on geographic information stored in a geographic information repository (500O). Also, geographic information systems are also known in the art, for example, to determine route-burdens such as walking distance, walking time, etc., for example, based on geographic information stored in a geographic information repository (500O). Also, geographic information systems are also known in the art, for example, to determine route-burdens such as transit distance, transit time, transit cost, etc. based on geographic information stored in a geographic information repository (500O). Those having skill in the art will further appreciate other geographic information systems known to determine other route burdens associated with a route.

Figure 6A:
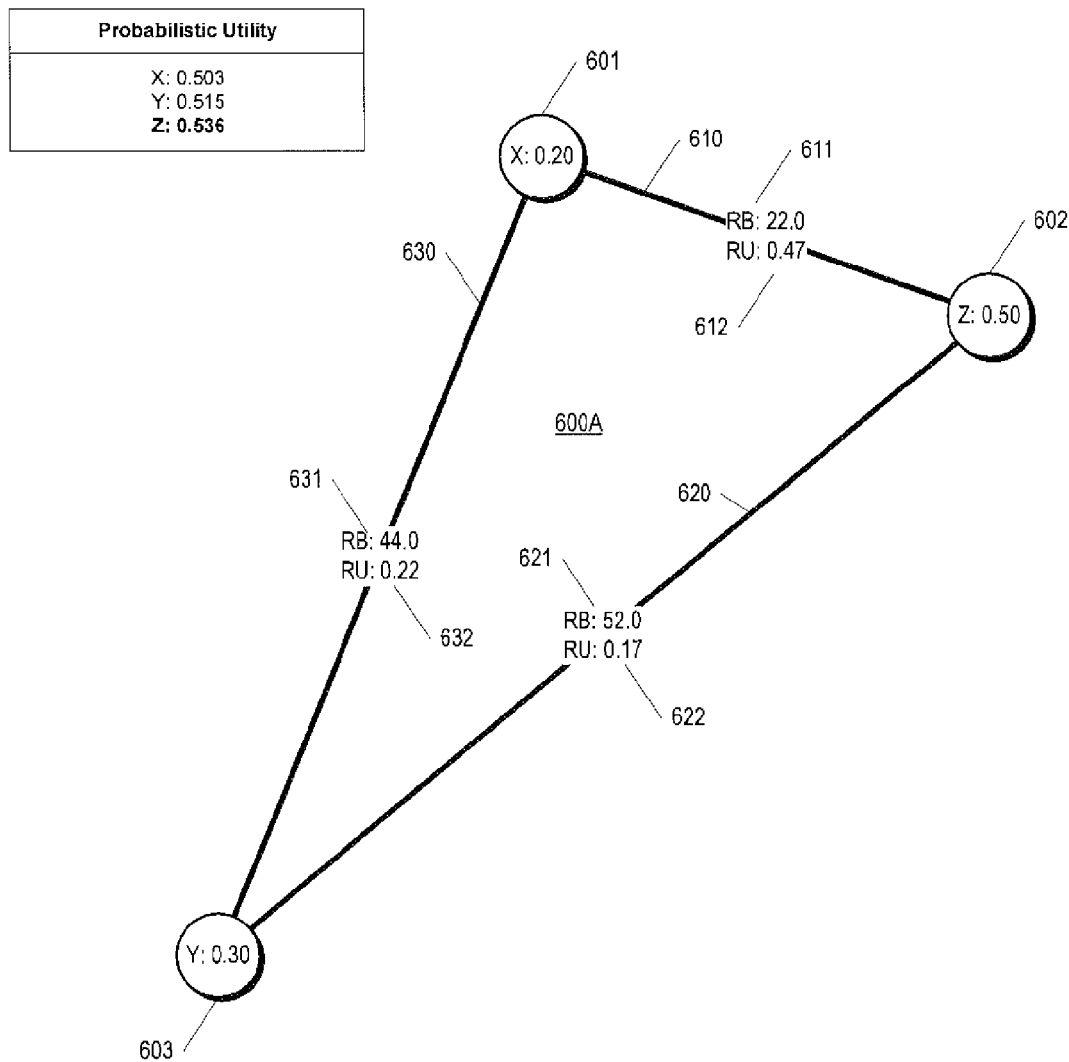
FIG. 6A includes a schematic diagram of various data processed according to various embodiments.

By way of example, a plurality of route burdens can be provided according to a graph network (600) as can be shown with reference to FIG. 6A. Each of the plurality of route burdens, such as route burden (611) can be shown along the edges, such as edge (610) of the graph network (600). Each of the plurality of edges, such as edge (610), can be adjacent to two nodes, such as nodes (601, 602). Each of the plurality of route burdens (500E), accordingly, can be associated with each of the adjacent nodes. In this example, the route burden (611) is bidirectional. In some embodiments, however, there may be more than one route burden along any of the edges, corresponding to differing directions of travel between any of the nodes.

As can be shown with further reference to FIG. 5, embodiments of computer-implemented methods (500) can include determining (505) a plurality of route-utility factors (500F) associated with the plurality of candidate geographic locations (500C). In some embodiments, for example, determining (505) a plurality of route-utility factors can be performed by a route-utility determiner (424), for example, implemented on software running on a server, such as the location utility server (440). In certain embodiments, determining (505) a plurality of route-utility factors can be performed responsive to the plurality of route burdens (500E) associated with the plurality of candidate geographic locations (500C). In further embodiments, determining (505) a plurality of route-utility factors can be performed responsive to determining (504) a plurality of route burdens (500E) associated with the plurality of candidate geographic locations (500C).

Figure 10:
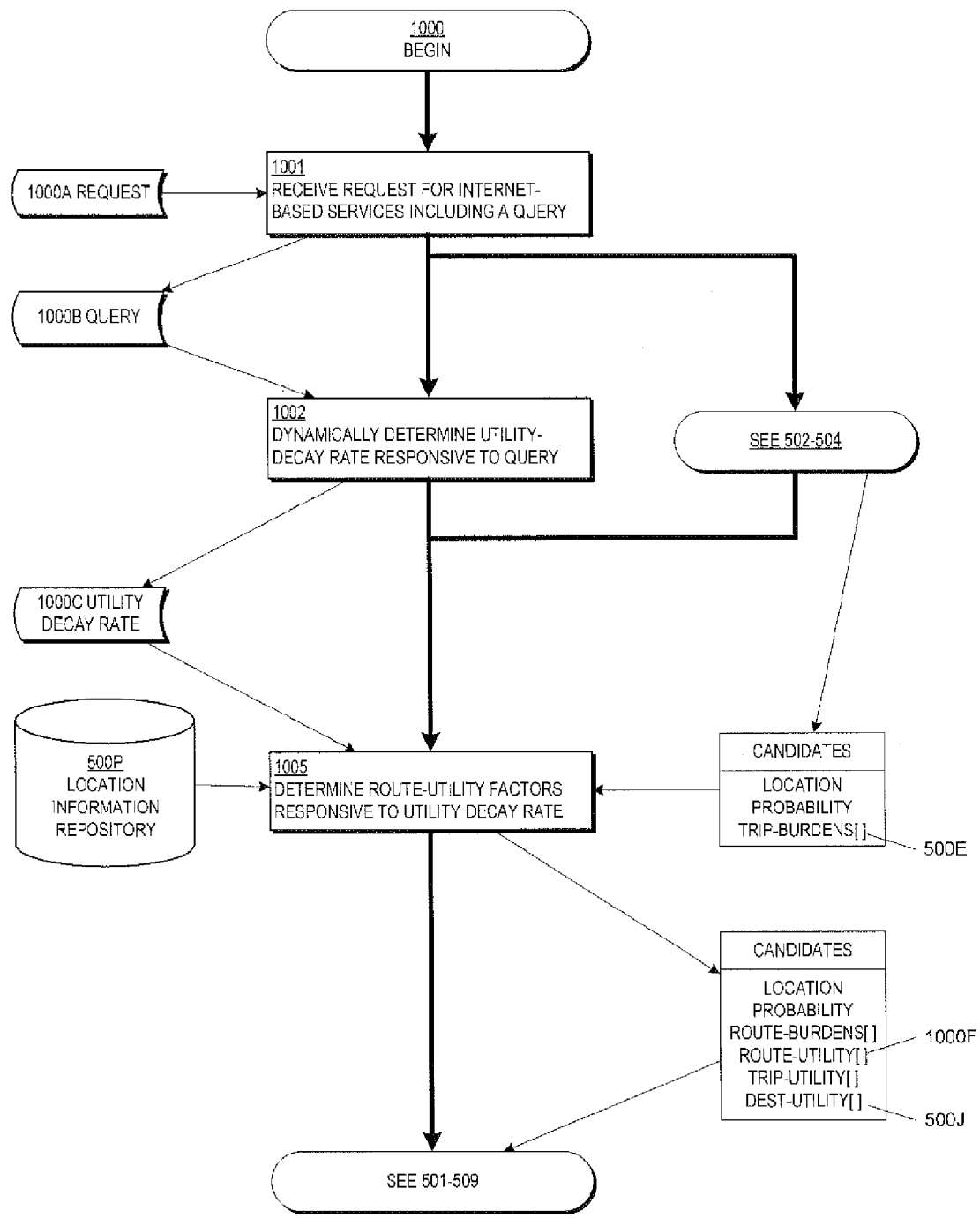
FIG. 10 includes a flow chart of various computer-implemented methods according to various embodiments.

Also, can be shown with reference to FIG. 10, embodiments of computer-implemented methods (1000) can include determining (1005) a plurality of route-utility factors (1000F) associated with the plurality of candidate geographic locations (500C) responsive to a dynamically-selected utility decay rate (1000A). In some embodiments, for example, determining (1005) a plurality of route-utility factors can be performed by a route-utility determiner (424), for example, implemented on software running on a server, such as the location utility server (440). In certain embodiments, determining (1005) a plurality of route-utility factors can be performed responsive to the plurality of route burdens (500E) associated with the plurality of candidate geographic locations (500C). In certain embodiments, determining (1005) a plurality of route-utility factors can be performed responsive to a utility-decay rate. In further embodiments, determining (1005) a plurality of route-utility factors can be performed responsive to determining (504) a plurality of route burdens (500E) associated with the plurality of candidate geographic locations (500C). In further embodiments, determining (1005) a plurality of route-utility factors can be performed responsive to dynamically determining (1002) a utility-decay rate responsive to a query (900C) associated with the plurality of candidate geographic locations (500C).

In more particular aspects, each of the plurality of route-utility factors (500F) can relate to two or more geographic locations, such as a first geographic location (e.g., an origin geographic location) and a second geographic location (e.g., a destination geographic location). According to various embodiments, route-utility factors can be determined, for example, using any of a variety of algorithms or rules to relate the route-utility factor to any of a variety of route-burden parameters. Generally, route-utility factors and route-burden parameters are inversely related due to the tendency of humans to disfavor burdens, including burdens associated with distance, time, and cost, for example, of travelling along a route. In various embodiments, route-utility factors and route-burden parameters can be inversely related according to various types of relationships, including, for example, a linear relationship or an exponential relationship.

As can be shown with reference to the graph network (600A) illustrated in FIG. 6A, for example, geographic location "X" (601) can be considered a destination geographic location for the purpose of calculating a route-utility factor associated with geographic location "X" (601). Likewise, each of geographic locations "X", "Y", and "Z" can be considered an origin geographic location for the purpose of calculating a route utility factor associated with geographic location "X" and the respective origin geographic location. For example, to calculate a route-utility factor associated with both geographic location "X" (601) and geographic location "Y" (602) a utility function can be applied to the route-burden parameter (611) for a route (610) between geographic locations "X" (601) and "Y" (602).

Figure 7A:
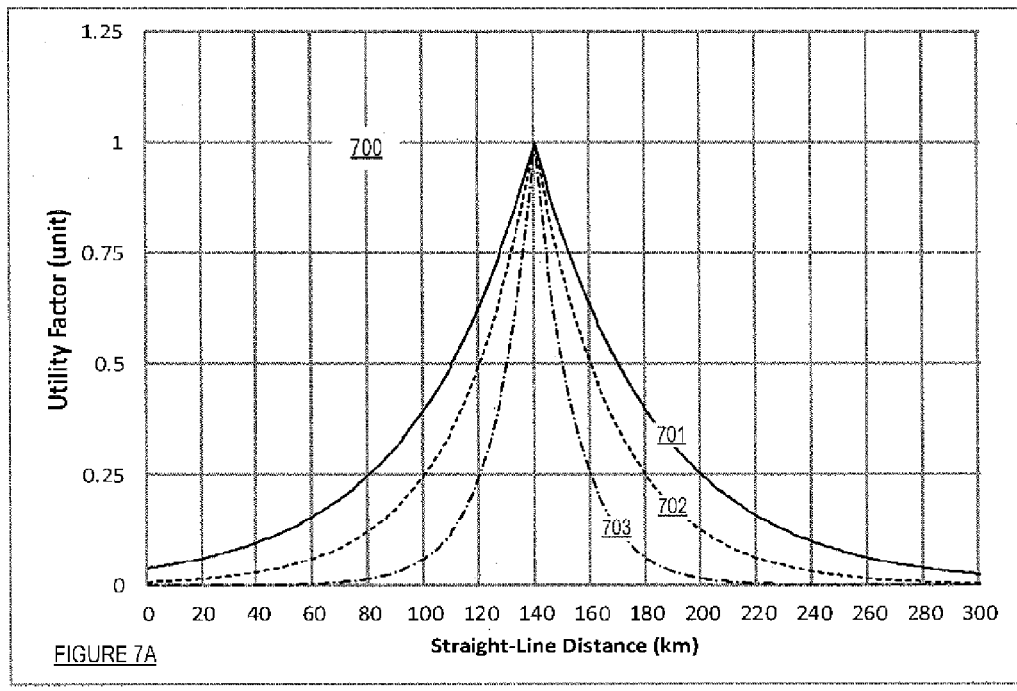
FIG. 7A includes a graph of utility for a range of geographic locations, according to various embodiments, for different utility-decay values as represented by different curves, the graph having utility on the y-axis and a route-burden parameter (distance) on the x-axis.
Figure 7B:
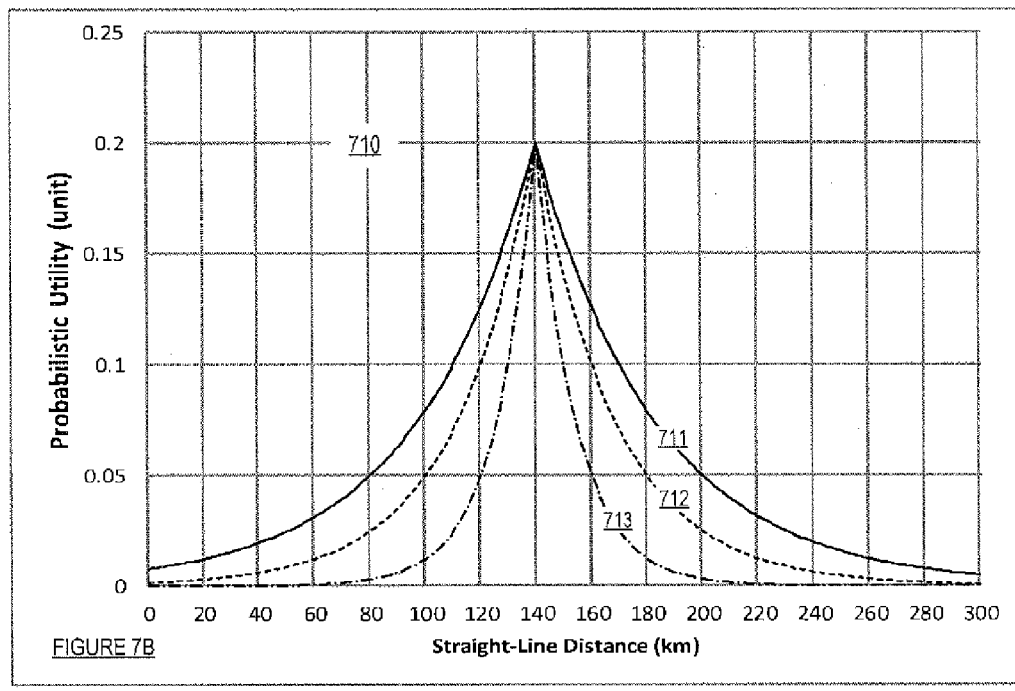
FIG. 7B includes a graph of probabilistic utility for a range of geographic locations, according to various embodiments, for different utility-decay values as represented by different curves, the graph having probabilistic utility on the y-axis and a route-burden parameter (distance) on the x-axis.

In the exemplary graph (700) provided by FIG. 7A, a route-utility factor (on the Y-axis) is inversely related to a route-burden parameter, i.e. distance, on the X-axis according to a utility function, such as the function represented by the utility curve (701). Further, the utility curve (701) represents an exponential relationship between route-utility factors and route-burden parameters. Even further, the utility curve (701) represents an exponential decay relationship between route-utility factors and route-burden parameters.

As can be shown by comparing utility curves (701, 702, 703), each of which are centered on a geographic location at 140 km, various exponential-decay relationships between route-utility factors and route-burden parameters can be provided according to different half-life variables. Utility curve (701) is based on a half-life variable of 10 km; utility curve (702) is based on a half-life variable of 20 km; and utility curve (703) is based on a half-life variable being 30 km.

According to utility curve (701), the route-utility factor at geographic location 140 km is 1.0 (representing a route-burden parameter of 0 km) and the route-utility factor for geographic locations 130 km and 150 km is 0.5 (representing a route-burden parameter of 10 km). According to utility curve (902), the route-utility factor at geographic location 140 km is 1.0 (representing a route-burden parameter of 0 km) and the route-utility factor for geographic locations 120 km and 160 km is 0.5 (representing a route-burden parameter of 20 km). According to utility curve (703), the route-utility factor at geographic location 140 km is 1.0 (representing a route-burden parameter of 0 km) and the route-utility factor for geographic locations 110 km and 170 km is 0.5 (representing a route-burden parameter of 30 km).

In certain embodiments including a utility function that is an exponential decay function, an exemplary formula for calculating the utility factor can be as follows, wherein d is the destination geographic location; o is the original geolocation; C is the plurality of candidate geographic locations; R is the route-utility factor for the pair of geographic locations (d,o); B is the route-burden parameter for the pair of geographic locations (d,o), e is the mathematical constant Euler's number being 2.718281828 . . . , and λ is a half-life value (e.g., "20" for a half-life of 20 km):

$$R_{(d,o)} = e^{\left(B_{(d,o)} * \frac{\ln(0.5)}{\lambda}\right)}. \qquad [1]$$

Equation [1] can also be written in simpler form as Equation [1.1]:

$$R_{(d,o)} = 2^{-\left(\frac{B_{(d,o)}}{\lambda}\right)}. \qquad [1.1]$$

An exponential decay function advantageously provides a realistic modeling of utility based according to perceived human behavioral tendencies and perceived human preferences. By way of example, a person might be likely to derive the most utility from resources immediately adjacent to the positional location of the person. By extension, a person might be likely to derive less utility from resources that are remote from the positional location of the person. Embodiments of the present invention therefore recognize that the reduction in utility according to remoteness, for example, can be best approximated with respect to burdens that increase proportional to remoteness (e.g., route-utility burdens). By applying an exponential decay function, certain embodiments of the present invention can relate utility and remoteness according to a half-life variable relating to remoteness, which is beneficially realistic and conceptually simple. In various embodiments, for example, utility can be reduced in half for approximately every 10-30 km increase in distance between two geographic locations. Also, in various embodiments, for example, utility might be reduced in half for approximately every 15-45 minute increase in travel time between two geographic locations. Various embodiments may also provide for utility to be reduced in half according to another metric of remoteness (or in a range of remoteness) measured according to other types of route-burdens between or among geographic locations.

In various embodiments, a realistic half-life value may, in fact, be dependent on the circumstances of the request, for example, based on different users, different types of requests, and other different parameters of the request (including, for example, the results of the request). For example, a realistic half-life value can differ according to user preferences, request type, query content, time of request, request results, etc. As can be shown with reference to FIG. 10, for example, embodiments of computer-implemented methods (1000) can include, for example, dynamically determining (1002) a utility-decay rate value (1000C) (e.g., a half-life variable) responsive to a text query (1000B). Data associating query text (e.g., keywords or phrases) and one or more half-life values can be stored at a data repository, such as the services content repository (500R), for example. Dynamically determining (1002) the utility-decay rate can include accessing a data repository (500R) to relate all or part of the query (1000B), for example, to a decay rate (1000C) being stored in the data repository (500R).

A plurality of route-utility factors (500F) can be illustrated, for example, in the graph network (600) as can be shown with reference to FIG. 6A. Each of the plurality of route-utility factors (500F) can be associated with any of the geographic locations included in the route. For example, a route-utility factor can be associated with the origin geographic location as well as the destination geographic location or any geographic location along the route. Each of the plurality of route-utility factors (500F), such as route-utility factor (612) can be shown along the edges, such as edge (610) of the graph network (600). As is described above, each of the plurality of edges, such as edge (610), can be adjacent to two nodes, such as nodes (601, 602). Each of the plurality of route-utility factors (500F), accordingly, can be associated with each of the adjacent nodes. For example, route-utility factors (612, 622) can be associated with the adjacent node (602). In this example, the route-utility factor (612) is bidirectional. In some embodiments, however, there may be more than one route-utility factor along any of the edges, corresponding to differing directions of travel between any of the nodes.

As can be shown with further reference to FIG. 5, embodiments of computer-implemented methods (500) can include determining (506) a plurality of trip-utility factors (500M) associated with the plurality of candidate geographic locations (500C). In some embodiments, for example determining (506) a plurality of trip-utility factors can be performed by the trip-utility determiner (325A), for example, implemented on software running on a server, such as the location utility server (440). In certain embodiments, determining (506) a plurality of trip-utility factors can be performed responsive to data at the local information repository (500P) relating to the candidate geographic locations (500C). In further embodiments, include determining (506) a plurality of trip-utility factors can be performed responsive to determining (503) the plurality of candidate geographic locations (500C).

In more particular aspects, each of the plurality of trip-utility factors (500M) can relate to two or more geographic locations, such as a first geographic location (e.g., an origin geographic location) and a second geographic location (e.g., a destination geographic location). Trip-utility factors can be determined or obtained, for example, using any of a variety of data structures to relate any two or more geographic locations to a variety of trip-utility factors. In one embodiment, for example, a geographic location can be directly related to trip-utility factors in a data repository such as a database, for example, such as the local information repository (500P). Trip-utility factors can also be determined, for example, using any of a variety of algorithms to determine a trip-utility factor responsive to any of a variety of trip-utility parameters. Trip-utility parameters can be determined or obtained, for example, using any of a variety of data structures to relate any two or more geographic locations to a variety of trip-utility parameters. In one embodiment, for example, a pair of geographic locations can be directly related to trip-utility parameters in a data repository, for example, such as the geographic local information repository (500P).

In certain embodiments, for example, the trip-utility determiner (425B) can be configured to determine a trip-utility factor for a pair of geographic locations that is a value between 0 and 1, responsive to one or more trip-utility parameters. The trip-utility factors can be determined, for example, responsive to various algorithms or methods to rank or to score one or more trip-utility parameters on a scale of 0 to 1 (0% to 100%) thereby defining a trip-utility factor. For example, a trip-utility factor can be determined as a relative rank for a trip-utility parameter among the pool of all other like trip-utility parameters. Also, for example, a trip-utility factor can be determined by applying user preferences or historical or statistical preferences for a plurality of users (or the general public) to the trip-utility parameters according to methods and techniques known to those having skill in the art to thereby determine a trip-utility factor for the parameter responsive to the preferences. For, example, a relatively high trip-utility factor (e.g., 0.90-1.00) can be determined for a destination geographic location associated with a country that is easier to enter (i.e., lower travel restrictions) than that of the origin geolocation, restaurants that are better rated than those of the origin geographic location, nightspots that are better frequented than those of the origin geographic location, or demographics indicating a lower crime rate than that of the origin geographic location, etc.

Figure 6B:
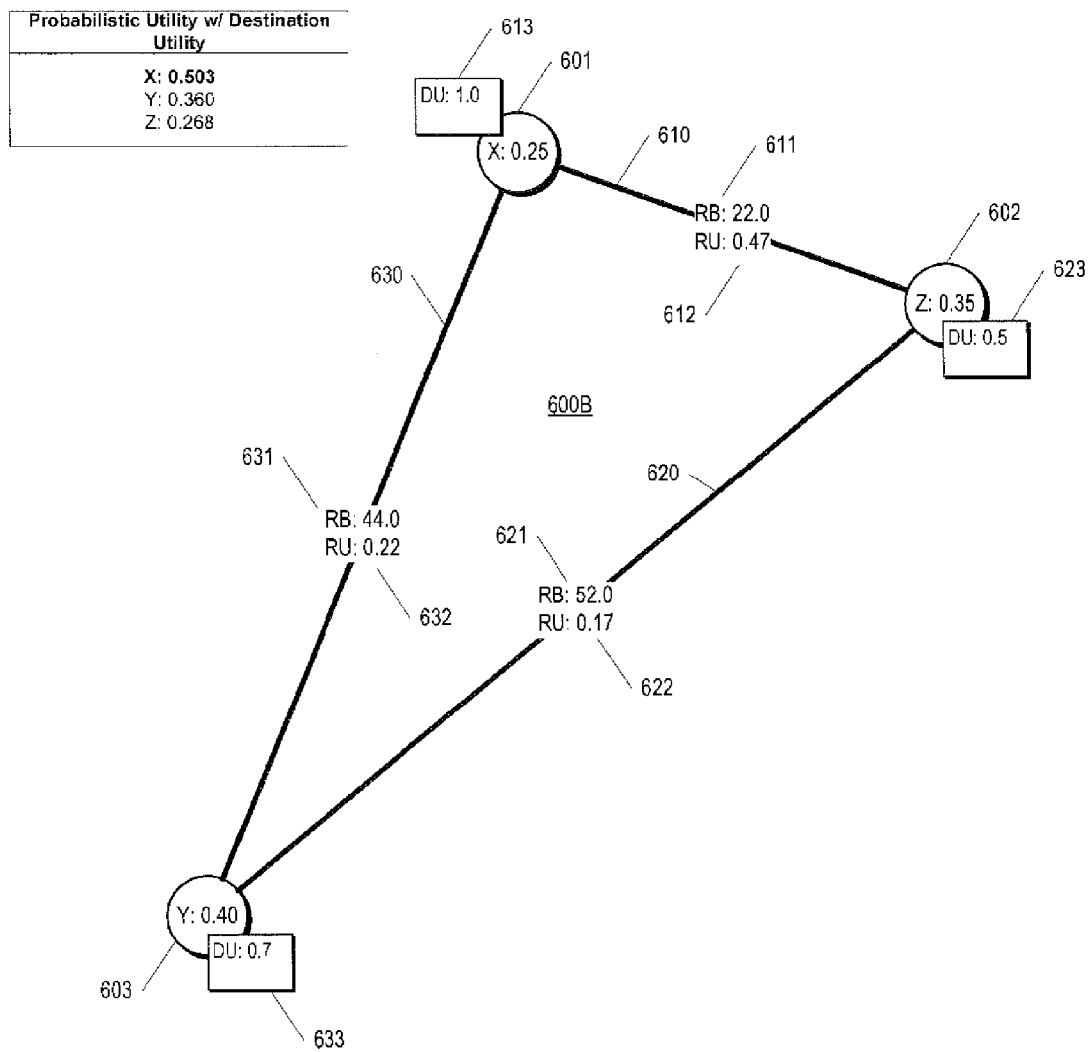
FIG. 6B includes a schematic diagram of various data processed according to various embodiments.
Figure 6C:
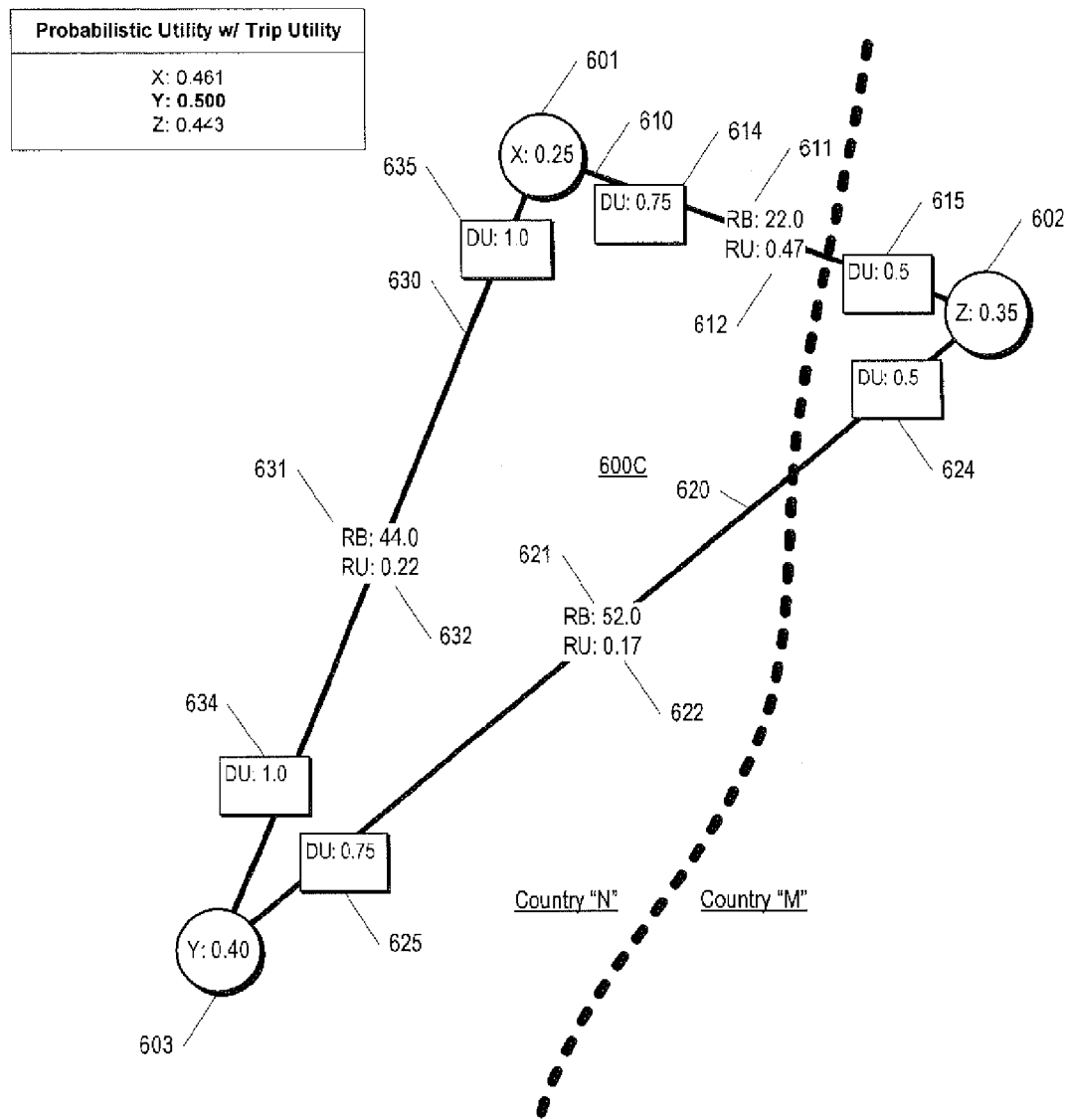
FIG. 6C includes a schematic diagram of various data processed according to various embodiments.
Figure 6D:
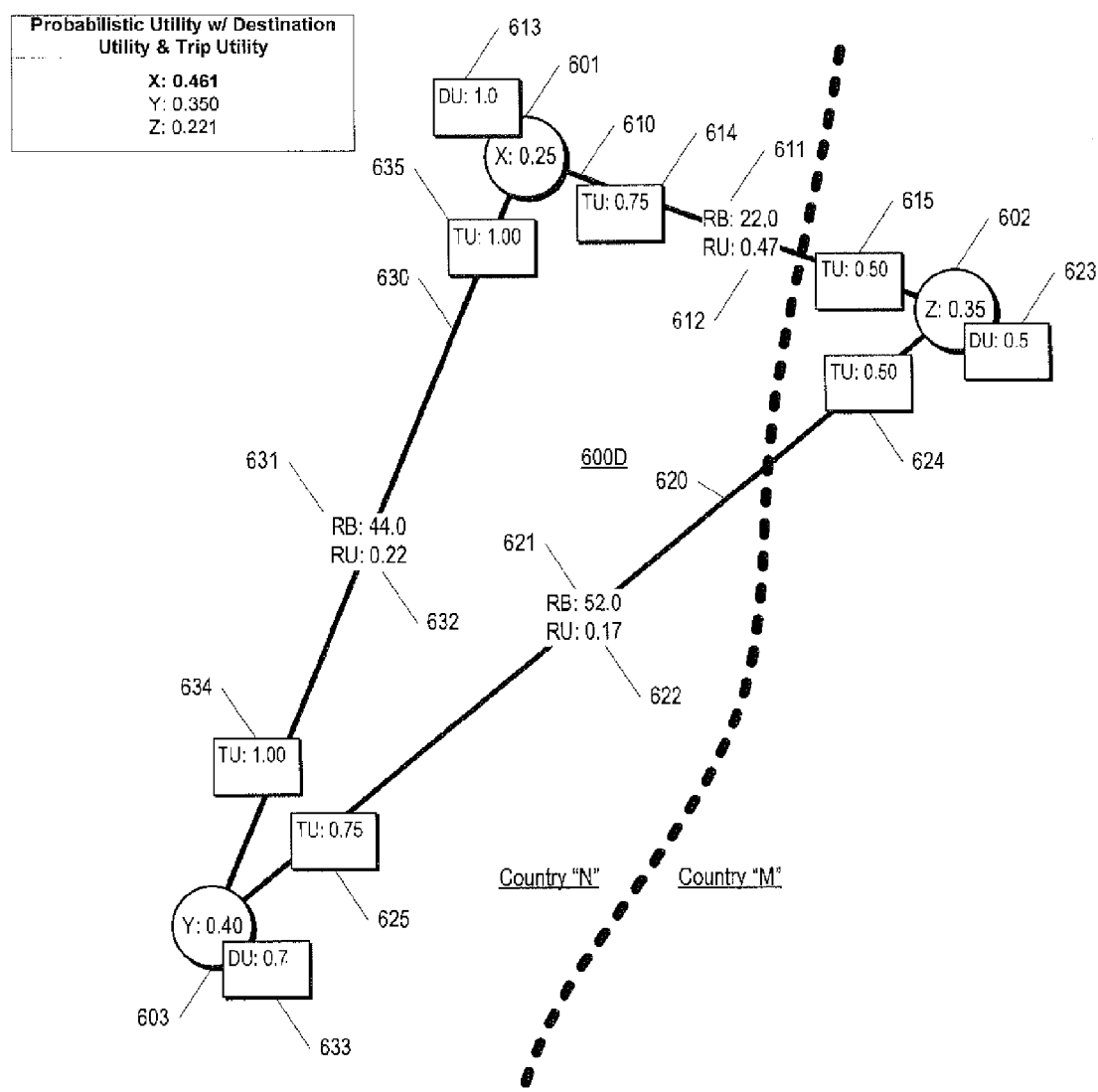
FIG. 6D includes a schematic diagram of various data processed according to various embodiments.

By way of example, a plurality of trip-utility factors (500M) can be provided according to the graph network (600C, 600D) as can be shown with reference to FIGS. 6C and 6D. Each of the plurality of trip-utility factors (500M) can be associated with any of the geographic locations factoring into the determination of the trip-utility factor. Each of the plurality of trip-utility factors (500M), such as trip-utility factors (614, 635) can be shown for each of the nodes, such as node (601) of the graph network (600C). Each of the plurality of trip-utility factors (500M), accordingly, can be associated with each of the nodes. For example, one trip-utility factor (614) can be associated with one node (601) and another trip-utility factor (615) can be associated with another node (602). In this example, multiple trip-utility factors (614,635) are applicable for a corresponding node (601) for different edges (610, 630) adjacent to the node (601). In further detail, a first trip-utility factor (614) can apply for a trip from geographic location "Z" (602) to geographic location "X" (601). The first trip-utility factor (614) can be indicative of a difference in a comparable parameter, i.e., country (Country "N" vs. Country "M") between the two geographic locations (601, 602). Likewise, a second trip-utility factor (635) can apply for a trip from geographic location "Y" (603) to geographic location "X". The second trip-utility factor (635) can be indicative of a lack of any difference in a comparable parameter, i.e., country between the two geographic locations (601, 603). Notably, in certain embodiments, the trip-utility factor for any pair of geographic locations can be different depending on a trip direction. For example, a third trip-utility factor (615) can apply for a trip from geographic location "X" (601) to geographic location "Z" (602). Such differences in trip-utility factors for the same pair of geographic locations can be indicative, for example, of a trip-parameter value reflecting greater utility than another. For example, it may be relatively easy to enter Country "N" from Country "M" but relatively difficult to enter Country "M" from Country "N". Accordingly, the trip-utility value would be greater for the geographic location in Country "N".

As can be shown with further reference to FIG. 5, embodiments of computer-implemented methods (500) can include determining (507) a plurality of destination-utility factors (500J) associated with the plurality of candidate geographic locations (500C). In some embodiments, for example determining (507) a plurality of destination-utility factors can be performed by the destination-utility determiner (325B), for example, implemented on software running on a server, such as the location utility server (440). In certain embodiments, determining (507) a plurality of destination-utility factors can be performed responsive to data at the local information repository (500P) relating to the candidate geographic locations (500C). In further embodiments, include determining (507) a plurality of destination-utility factors can be performed responsive to determining (503) the plurality of candidate geographic locations (500C).

In more particular aspects, each of the plurality of destination-utility factors (500J) relate to a geographic location (for example, a destination geographic location). Destination-utility factors can be determined or obtained, for example, using any of a variety of data structures to relate any geographic location to a variety of destination-utility factors. In one embodiment, for example, a geographic location can be directly related to destination-utility factors in a data repository such as a database, for example, such as the local information repository (500P). Destination-utility factors can also be determined, for example, using any of a variety of algorithms to determine a destination-utility factor responsive to any of a variety of destination-utility parameters. Destination-utility parameters can be determined or obtained, for example, using any of a variety of data structures to relate any geographic location to a variety of destination-utility parameters. In one embodiment, for example, a geographic location can be directly related to destination-utility parameters in a data repository, for example, such as the local information repository (500P).

In certain embodiments, for example, the destination-utility determiner (425B) can be configured to determine a destination-utility factor for a geographic location that is a value between 0 and 1 responsive to one or more destination-utility parameters. The destination-utility factors can be determined, for example, responsive to various algorithms or methods to rank or to score one or more destination-utility parameters on a scale of 0 to 1 (0% to 100%) thereby defining a destination-utility factor. For example, a destination-utility factor can be determined as a relative rank for a destination-utility parameter among the pool of all other like destination-utility parameters. Also, for example, a destination-utility factor can be determined by applying user preferences or historical or statistical preferences for a plurality of users (or the general public) to the destination-utility parameters according to methods and techniques known to those having skill in the art to thereby determine a destination-utility factor for the parameter responsive to the preferences. For, example, a relatively high destination-utility factor (e.g., 0.90-1.00) can be determined for a geographic location associated with restaurants that are well rated, nightspots that are well frequented, or demographics indicating a low crime rate, etc.

By way of example, a plurality of destination-utility factors (500F) can be provided according to the graph network (600) as can be shown with reference to FIGS. 6B and 6D. Each of the plurality of destination-utility factors (500F) can be associated with any of the geographic locations factoring into the determination of the destination-utility factor. Each of the plurality of destination-utility factors (500J), such as destination-utility factor (613) can be shown for each of the nodes, such as node (601) of the graph network (600B). Each of the plurality of destination-utility factors (500J), accordingly, can be associated with each of the nodes. For example, one destination-utility factor (613) can be associated with one node (601) and another destination-utility factor (623) can be associated with another node (602). In this example, the destination-utility factor (613) is applicable for the corresponding node (601) for all edges (610, 630) adjacent to the node (601) (i.e., irrespective of a route or of an origin location). For example, geolocation "X" (601) might have many amenities or conveniences that can be appreciated by anyone, i.e., regardless of originating from geolocation "Z" or geolocation "Y". Also, for example, geolocation "X" (601) might have restaurants that are well rated, nightspots that are well frequented, or a low crime rate, each of which can be appreciated by anyone, i.e., regardless of whether originating from geolocation "Z" or geolocation "Y".

As can be shown with further reference to FIG. 5, embodiments of computer-implemented methods (500) can include calculating (508) a plurality of aggregate probabilistic utility score (500G) associated with the plurality of candidate geographic locations (500C). In some embodiments, for example calculating (508) a plurality of aggregate probabilistic utility score can be performed by the utility score aggregator (326), for example, implemented on software running on a server, such as the location utility server (440). In certain embodiments, calculating (508) a plurality of aggregate probabilistic utility score can be performed responsive to a plurality of route-utility factors (500F), a plurality of trip-utility factors (500M), and/or a plurality of destination-utility factors (500J). In further embodiments, calculating (508) a plurality of aggregate probabilistic utility score can be performed responsive to determining (505) a plurality of route-utility factors (500F), determining (506) a plurality of trip-utility factors (500M), and/or determining (507) a plurality of destination-utility factors (500J)

Each of the plurality of aggregate probabilistic utility scores (500G) relates to a particular geographic location (for example, a candidate geographic location), which can be referred to as a "destination" geographic location, according to the concept that internet-based services being targeted on such a geolocation can relate to travel, such as by a user of the internet-based services, to that geographic location (e.g., for internet search services relating to the search query "restaurants" and being targeted on the geolocation "San Francisco, Calif. 94123," travel to or within the geolocation "San Francisco, Calif. 94123" might be contemplated in order to derive utility from the search results). Accordingly, with respect to such a destination geographic location, any of the plurality of candidate geographic locations (i.e., probabilistic user locations) can be referred to as an origin geographic location, according to the operative assumption that the probabilistic user location is probabilistically at or adjacent to at least one of the candidate geographic locations.

Each aggregate probabilistic utility score, therefore, can be related to a single destination geographic location and multiple origin geographic locations (i.e., the aggregate probabilistic utility score is a cross-utility score). An aggregate probabilistic utility score can be calculated by summing a plurality of individual probabilistic utility scores, each of which relates to a pair of geolocations including the same destination geographic location and a different origin geographic location. Because internet-based services can be targeted on the same location as, or adjacent to, the positional location of a user, the destination geographic location and the origin geographic location can be the same geolocation in certain calculations. And because the actual positional location of the user (or client device) is not known with certainty, each of the individual probabilistic utility scores can also relate to a relative probability value (e.g., candidate confidence level) for the respective origin geographic location.

By way of example, in the graph network (600B) as can be shown with reference to FIG. 6B geographic location "X" (601) can be considered a destination geographic location for the purpose of calculating a utility score for geographic location "X" (601). Accordingly, to calculate the aggregate probabilistic utility score for geographic location "X" (601), all individual probabilistic utility scores for geographic location "X" (601) are summed. The individual probabilistic utility scores for geographic location "X", as the destination geolocation, relate to the pairs of geographic locations (X, X), (X, Z), and (X, Y).

In certain embodiments, the individual probabilistic utility scores can relate to the route-utility factors corresponding to both the destination geographic location and the origin geographic location. In further embodiments, the individual probabilistic utility scores can relate to the trip-utility factors corresponding to both the destination geographic location and the origin geographic location. And in even further embodiments, the individual probabilistic utility scores can relate to the destination-utility factors corresponding to the destination geographic location. Each of the foregoing relations can be calculated by factoring one or more of the foregoing factors with the candidate confidence level for the respective origin geographic location so that the individual probabilistic utility score for any destination geographic location reflects a particular origin geographic location. According to various embodiments, the aggregate probabilistic utility score for any particular geolocation can be based on the degree to which burdens of travelling from any of the multiple probabilistic user locations affect the utility of goods or services at that particular geolocation. Likewise, according to various embodiments, the aggregate probabilistic utility score for any particular geolocation can be based on the degree to which the comparative favorableness of that particular geolocation versus multiple probabilistic user locations affects the utility of goods or services at that particular geolocation. And likewise, according to various embodiments, the aggregate probabilistic utility score for any particular geolocation that can be based on the degree to which the favorableness of that particular geolocation affects the probabilistic utility of goods or services at that particular geolocation.

In certain embodiments having an aggregate probabilistic utility score calculated responsive to route-utility factors, an exemplary formula for calculating the aggregate probabilistic utility score can be as follows, wherein d is the destination geographic location; o is the original geolocation; C is the plurality of candidate geographic locations; A is the aggregate probabilistic utility score for d with respect to all o of C; R is the route-utility factor for (d,o); and P is the probability that a user positional location is at or near o:

$$A_d = \sum_o^C R_{(d,o)} * P_o \quad [2]$$

In further embodiments having an aggregate probabilistic utility score calculated responsive to route-utility factors and destination-utility factors, an exemplary formula for calculating the aggregate probabilistic utility score can be as follows, wherein d is the destination geographic location; o is the original geolocation; C is the plurality of candidate geographic locations; A is the aggregate probabilistic utility score for d with respect to all o of C; R is the route-utility factor for (d,o); D is the destination-utility factor for d, and P is the probability that a user positional location is at or near o:

$$A_D = \sum_o^C R_{(d,o)} * D_d * P_o \quad [3]$$

By way of further example, the application of equation [3] with respect to geographic locations illustrated in FIG. 6B, provides an aggregate probabilistic utility score of 0.503 for geographic location "X" (601), as can be calculated according to equation [3] as $(1.00*1.0*0.25)_{(X,X)}+(0.47*1.0*0.35)_{(X,Z)}+(0.22*1.0*0.40)_{(X,Y)}$.

In further embodiments having an aggregate probabilistic utility score calculated responsive to route-utility factors and trip-utility factors, an exemplary formula for calculating the aggregate probabilistic utility score can be as follows, wherein d is the destination geographic location; o is the original geolocation; C is the plurality of candidate geographic locations; A is the aggregate probabilistic utility score for d with respect to all o of C; R is the route-utility factor for (d, o); T is the trip-utility factor for (d,o), and P is the probability that a user positional location is at or near o:

$$A_D \sum_o^C R_{(d,o)} * T_{(d,o)} * P_o \qquad [4]$$

By way of further example, the application of equation [4] with respect to geographic locations illustrated in FIG. 6C, provides an aggregate probabilistic utility score of 0.500 for geographic location "Y" (603), as can be calculated according equation [4] as $(1.00*1.00*0.40)_{(Y,Y)}+(0.17*0.75*0.35)_{(Y,Z)}+(0.22*1.00*0.25)_{(YX)}$.

And in even further embodiments having an aggregate probabilistic utility score calculated responsive to route-utility factors, trip-utility factors, and destination-utility factors, an exemplary formula for calculating the aggregate probabilistic utility score can be as follows, wherein d is the destination geographic location; o is the original geolocation; C is the plurality of candidate geographic locations; A is the aggregate probabilistic utility score for d with respect to all o of C; R is the route-utility factor for (d,o); T is the trip-utility factor for the (d,o), D is the destination-utility factor for the destination geographic location d; and P is the probability that a user positional location is at or near o:

$$A_D = \sum_o^C R_{(d,o)} * T_{(d,o)} * D_d * P_o \qquad [5]$$

By way of further example, the application of equation [5] with respect to geographic locations illustrated in FIG. 6D, provides an aggregate probabilistic utility score of 0.461 for geographic location "X" (603), as can be calculated according equation [4] as $(1.00*1.00*1.0*0.25)_{(X,X)}+(0.47*0.75*1.0*0.35)_{(X,Z)}+(0.22*1.00*1.0*0.40)_{(X,Y)}$.

As can be shown with reference to FIG. 1A, the plurality of aggregate probabilistic utility scores can be provided not only for the plurality of candidate geographic locations, but also for other geographic locations. Such other geographic locations can include, for example, geographic locations in between or surrounding any of the candidate geographic locations. Accordingly, each of the steps (503, 504, 505, 506, 507, 508) can be performed for other destination geolocations that are not candidate geographic locations (non-candidate geographic locations) as can be shown with reference to FIG. 11. A range of geographic locations (1100C) can be selected (1101) from the geographic information repository (500O) responsive to any of the candidate geographic locations, for example. The range of geographic locations (1100C) can include, for example, any of the candidate geographic locations and any other geographic location. For example, the range of geographic locations (1100C) can include any geographic locations located in between any of the candidate geographic locations or surrounding any of the candidate geographic locations. The step of determining (1101) the range of geographic locations include, for example, determining a plurality of geolocations responsive to a preselected resolution (1100A) and a pre-selected remoteness parameter (1100B). The preselected resolution parameter (1100A) can be any degree of resolution, such as a city or a zip code. The preselected remoteness parameter (1100B) can be any measurement of remoteness, including, for example, a distance measurement, a time-of-travel measurement, or a cost-of-travel measurement. Selecting a plurality of geographic locations responsive to the preselected resolution parameter (1100A) and the preselected remoteness parameter (1100B) can include, for example, selecting all geographic locations of having a resolution matching the preselected resolution parameter (1100A) and having a remoteness (e.g., in distance, time, or cost) from any of the candidate geographic locations (500C) being within the preselected remoteness parameter (1100B). Accordingly, each of the steps (504A, 505A, 506A, 507A, 508A) shown in FIG. 11 can be performed as described with respect to steps (503, 504, 505, 506, 507, 508) except that the selected range of geographic locations (1100C) is used for selecting destination geographic locations or targeted geographic locations.

Figure 12:
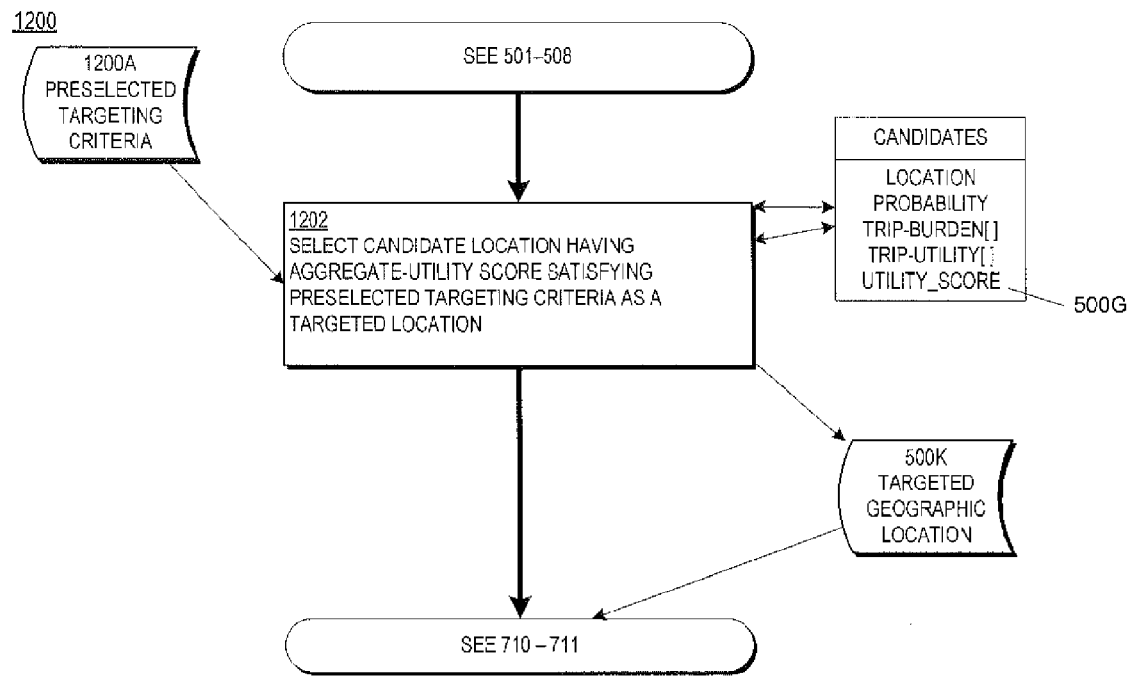
FIG. 12 includes a flow chart of various computer-implemented methods according to various embodiments.

As can be shown with further reference to FIG. 5 and FIG. 12, embodiments of computer-implemented methods (500, 1200) can also include, for example, selecting (1202) a geographic location having an aggregate probabilistic utility score satisfying preselected criteria (1200A). In certain embodiments, the preselected criteria can be, for example, a maximum value, such as in selecting (509) the geographic location having the greatest aggregate probabilistic utility score. The geographic location selected can be referred to as the selected geographic location or the targeted geographic location (500K). In some embodiments, for example selecting (509, 1202) a geographic location can be performed by the target location selector (427), for example, implemented on software running on a server, such as the location utility server (440). In certain embodiments, selecting (509, 1202) a geographic location can be performed responsive to a plurality of aggregate probabilistic utility score. In further embodiments, selecting (509, 1202) a geographic location can be performed responsive to calculating (508) the plurality of aggregate probabilistic utility score (500G).

Any of the preselected criteria for selecting a targeted geographic location can relate to a degree of usefulness desired of the targeted geographic location. As in one embodiment shown in FIG. 5, for example, the preselected criteria can be a maximum. Accordingly, the geographic location having the greatest aggregate probabilistic utility score can be the targeted geographic location. In other embodiments such as those shown in FIG. 12, however, other preselected criteria (1200A) can be provided. Examples of preselected criteria (1200A) can be to an $N^{th}$ value or an $N^{th}$ percentile value. In other embodiments, furthermore, the preselected criteria (1200A) can include various mathematical or statistical formulations relating to the aggregate probabilistic utility scores (500G). Accordingly, the step of selecting (1202) a geographic location having an aggregate probabilistic utility score satisfying preselected criteria can include, for example, applying the preselected targeting criteria (1200A) to the plurality of aggregate probabilistic utility scores (500G).

Embodiments of computer-implemented methods (500) can further include, for example, processing (510) internet-based services responsive to the selected geolocation (500K) (a "targeted geographic location"). Internet-based services can include, for example, internet search services, internet advertising services, internet e-commerce services, internet-use logging and reporting services, etc. Internet-based services can be processed responsive to the targeted geographic location and data from one or more internet-based services information repository (500R). The result or product of processing the internet-based services can be referred to as targeted electronic content (500D). Techniques for targeting internet search services on a targeted location are known in the art. For example, a search query and a targeted location can be provided to an internet search server, and the internet search server can search an internet index for documents relating to both the search query and the targeted location. Those having skill in the art will appreciate various other techniques for targeting internet search services on particular geographic locations, including through the use of various application programming interfaces (APIs) configured to receive a parameter indicative of a targeted geographic location. Techniques for targeting internet advertisement services on a targeted geographic location are also known in the art. For example, an advertisement request can include a keyword and a targeted geographic location can be provided to an advertisement server, and the advertisement server can search an index of available advertisements for advertisements relating to both the keyword and the targeted geographic location. Those having skill in the art will appreciate various other techniques for targeting internet advertisement services on particular geographic locations, including through the use of various APIs configured to receive a parameter indicative of a targeted geographic location. Those having skill in the art will also appreciate other techniques for targeting other internet-based services on targeted geographic locations. For example, requests for internet-based services can include a request payload and a targeted geographic location, or, perhaps, the payload query can include a targeted geographic location. Responsively, a server configured to process or handle the processing of the internet-based services can perform some action responsive to both the request query and the targeted geographic location. For example, a separate computer process can be executed responsive to the request query, the targeted geographic location, or both. Responsive to such a process, data can be generated for transmission to the client device (e.g., a location-specific inventory listing) Also responsive to such a process, data can be generated relating to the client device but not to be transmitted to the client device (e.g., updating a customer database with the targeted geographic location).

Embodiments of computer-implemented methods (500) can further include, for example, a step of (511) transmitting the targeted electronic content (500D) to a destination device (500S). The destination device can be, for example, the same device initially transmitting the request, such as the client device (410). In certain embodiments, the destination device can also be a different device, such as a device (e.g., a server device) configured to store or manage data relating to the targeted geographic location. For example, the destination device can be a logging server configured to log the targeted geographic location, such as for monitoring or reporting purposes.

Figure 13:
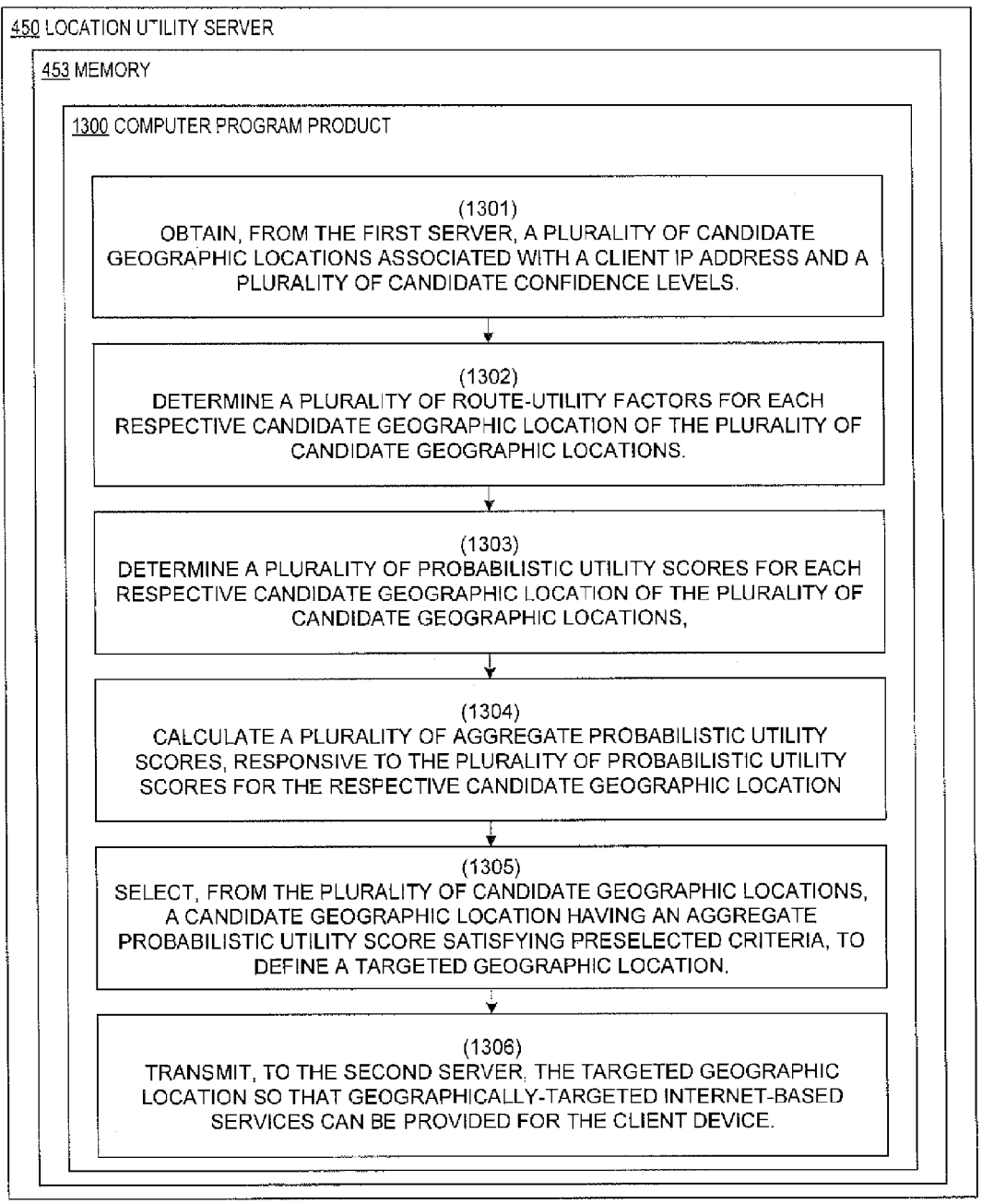
FIG. 13 includes a schematic diagram of a computer-program product and computer-executable instructions according to various embodiments.

Various embodiments may further include non-transitory computer-readable storage medium having stored thereon a set of executable instructions that, when executed by the one or more processors, causes the system to perform various operations. FIG. 13 illustrates an example of a set of instructions in a computer program product (1300) stored on a non-transitory computer-readable storage medium (e.g., the memory 453) and operable on a processor (not shown) of a computer device (e.g., the location utility server 450). Implementation of the following instructions of a computer program product (1300) on the location utility server (450) are provided for exemplary purposes only, and such instructions and the computer program product (1300) is not intended to be limited to the location utility server (450). Such a computer program product (1300), or other computer program products, may be implemented on different computer devices, such as one or more of the servers illustrated in FIG. 4, for example.

In some embodiments, for example, a computer program product (1300), for example, may include an instruction that, when executed, causes the system to (1301) obtain, from the first server, a plurality of candidate geographic locations associated with a client IP address and a plurality of candidate confidence levels. In particular aspects, each of the plurality of candidate confidence levels can be a relative probability that a corresponding candidate geographic location, out of all of the plurality of candidate geographic locations, includes a positional location of a client device associated with a request for internet-based services.

Also, in some embodiments, for example, a computer program product (1300), for example, may include an instruction that, when executed, causes the system to (1302) determine a plurality of route-utility factors for each respective candidate geographic location of the plurality of candidate geographic locations. In particular aspects, each of the plurality of route-utility factors can correspond to one of the candidate geographic locations, thereby defining a probabilistic client geographic location. Also, in particular aspects, each of the route-utility factors can be determined responsive to an inverse relationship with one or more parameters indicative of a burden associated with travel along a route between the respective candidate geographic location and the probabilistic client geographic location.

Further, in some embodiments, for example, computer program product (1300), for example, may include an instruction that, when executed, causes the system to (1303) determine a plurality of probabilistic utility scores for each respective candidate geographic location of the plurality of candidate geographic locations. In particular aspects, each of the plurality of probabilistic utility scores may correspond to a respective route-utility factor for the respective candidate geographic location. Also, in particular aspects, each of the plurality of probabilistic utility scores can be determined responsive to the respective route-utility factor and a candidate confidence level for the probabilistic client geographic location that corresponds to the respective route-utility factor. Further, in particular aspects, each of the plurality of probabilistic utility scores may be indicative of usefulness, to a user probabilistically located at or adjacent to the probabilistic client geographic location, of internet-based services being targeted on the respective candidate geographic location.

Even further, some embodiments, for example, computer program product (1300), for example, may include an instruction that, when executed, causes the system to (1304) calculate a plurality of aggregate probabilistic utility scores, responsive to the plurality of probabilistic utility scores for the respective candidate geographic location. In particular aspects, each of the plurality of aggregate probabilistic utility scores may correspond to a respective candidate geographic location. Also, in particular aspects, each of the plurality of aggregate probabilistic utility scores may be calculated responsive to the plurality of probabilistic utility scores for the respective candidate geographic location. Further, in particular aspects, each of the plurality of aggregate probabilistic utility scores may be indicative of usefulness, to a user probabilistically located at or adjacent to any of the plurality of candidate geographic locations, of internet-based services being targeted on the respective candidate geographic location.

Further still, some embodiments, for example, computer program product (1300), for example, may include an instruction that, when executed, causes the system to (1305) select, from the plurality of candidate geographic locations, a candidate geographic location having an aggregate probabilistic utility score satisfying preselected criteria, to define a targeted geographic location. Even further still Some embodiments, for example, may include an instruction that, when executed, causes the system to (1306) transmit, to the second server, the targeted geographic location so that geographically-targeted internet-based services can be provided for the client device.

This application relates to, claims priority to, and claims the benefit of U.S. Provisional Patent Application Ser. No. 61/579,510 titled "Systems, Computer-Implemented Methods, and Computer-Readable Media to Target Internet-Based Services on a Geographic Location" and is incorporated herein by reference in its entirety.

Any device described herein, such as the client device (410) or a server device (420, 430, 440, and 450) may be computing devices according to various embodiments, as either a client, as a server, or plurality of servers. Computing devices are intended to represent various forms of digital computers, such as laptops, desktops, workstations, personal digital assistants, servers, blade servers, mainframes, and other appropriate computers. For example, the client device (410) can be a mobile computing device, such as personal digital assistants, cellular telephones, smartphones, and other similar computing devices. For any of the computing devices described herein, any of the processors, memories, I/O units, interfaces, displays, peripherals, adapters, components etc. ("components") described herein can be interconnected using various busses, and may be mounted on a common motherboard or in other manners as appropriate. The components described and/or shown herein, their connections and relationships, and their functions, are intended to be exemplary only.

Any of the processors described herein can process instructions for execution within the respective computing device, including instructions stored in the memory or on the storage device to display graphical information for a graphical user interface ("GUI") on an output device, including an input/output device, such as display (not shown) coupled to the input/output device. Any of the processors can also include separate analog and digital processors. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Any of the processors can provide, for example, for coordination of the other components of a computing device, such as control of user interfaces, applications run by the computing device, and wireless communication by a computing device. Any of the processors can communicate with a user through user-input device and display device. The display can be, for example, a TFT LCD or an OLED, or other appropriate display technology known to those having skill in the art. The display can comprise appropriate circuitry for driving the display to present graphical and other visual information to a user. The user-input device can receive commands from a user and convert them for submission to the processor and can be any type of device configured or adapted for such purpose, including, for example a keyboard, keypad, touch-screen sensor, microphone, camera, pointer, trackball, trackpad, and other devices known to those having skill in the art. In addition, an external interface may be provided in communication with processor, so as to enable near-area communication of a device with other devices. An external interface can provide, for example, for wired communication (e.g., via a docking procedure) or for wireless communication (e.g., via Bluetooth or other such technologies).

Any of the memories described herein can store information within the respective computing device. In one implementation, a memory may be a computer-readable medium. In one implementation, a memory may be a volatile memory unit or units. In another implementation, a memory may be a non-volatile memory unit or units. A storage device may be capable of providing mass storage for a computing device. In one implementation, the storage device can be a computer-readable medium. In various different implementations, the storage device can be a floppy disk device, a hard disk device, an optical disk device, or a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more processes, such as the computer-implemented methods described above. The information carrier can be a computer- or machine-readable medium, such as a memory, a storage device, a memory on processor, or a propagated signal.

Any of the I/O units described herein can include, for example, a high-speed controller, a low-speed controller, or both a high-speed controller and a low-speed controller. A high-speed controller can manage bandwidth-intensive operations for the computing device, and the low speed controller can manages lower-bandwidth-intensive operations. Such an allocation of duties is exemplary only. In one implementation, an I/O unit can be coupled to a memory, a display (e.g., through a graphics processor or accelerator), and to one or more expansion ports, such as high-speed expansion port or a low-speed expansion port, each of which may accept various expansion cards (not shown). Any of the I/O units can include various communication ports (e.g., Universal Serial Bus ("USB"), Bluetooth, Ethernet, wireless Ethernet), may be coupled to one or more input devices or output devices, (either of which can also be an input/output device), such as a keyboard, a pointing device, a scanner, or a networking device such as a switch or router, e.g., through a network adapter. An input/output unit can include, for example, a wireless communication interface, and a computing device may communicate wirelessly through the wireless communication interface, which may include digital signal processing circuitry where necessary. A wireless communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through a radio-frequency transceiver. In addition, short-range communication may occur, such as using a Bluetooth, Wi-Fi, or other such transceiver (not shown). In addition, Global Positioning System ("GPS") receiver may provide additional wireless data to the computing device, which may be used as appropriate by applications running on the computing device, including transmitting such data to other computing devices. Any computing device may also communicate audibly using one or more audio device, such as a speaker or a microphone, which may receive spoken information from a user and convert it to usable digital information using an appropriate audio codec or may likewise generate audible sound for a user using a suitable audio codec, such as through a speaker, e.g., in a handset of device. Such sound may include sound from voice telephone calls, may include recorded sound (e.g., voice messages, audio/music files, etc.) and may also include sound generated by applications operating on device.

Various implementations of the systems and techniques described here can be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device such as a CRT (cathode ray tube) or LCD (liquid crystal display) monitor to display information to the user and a keyboard and a pointing device (e.g., touch-screen sensor, a mouse, or a trackball) by which the user can provide input to the computer. Other categories of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet. The computing system can include clients and servers. A client and server are generally remote from each other and typically interact through a communication network. The relationship of client and server arises by virtue of computer programs running on the respective computers and having a client-server relationship to each other.

Embodiments may be implemented, e.g., at least in part, in hardware or software or combinations of hardware software. Hardware may include, for example, analog, digital or mixed-signal circuitry, including discrete components, integrated circuits (ICs), or application-specific ICs (ASICs). Embodiments may also be implemented, in whole or in part, in software or firmware, which may cooperate with hardware. Processors for executing instructions may retrieve instructions from a data storage medium, such as EPROM, EEPROM, NVRAM, ROM, RAM, a CD-ROM, a HDD, and the like. Computer program products may include storage media that contain program instructions for implementing embodiments described herein.

A number of implementations have been described. Nevertheless, it will be understood that various modifications may be made without departing from the spirit and scope of this disclosure. Accordingly, other implementations are within the scope of the claims. Various embodiments may further include receiving, sending or storing instructions and/or data implemented in accordance with the foregoing description upon a computer-accessible medium. Generally speaking, a computer-accessible/readable storage medium may include non-transitory storage media, such as magnetic or optical media, (e.g., disk or DVD/CD-ROM); volatile or non-volatile media, such as RAM (e.g. SDRAM, DDR, RDRAM, SRAM, etc.), ROM, etc. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be used independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

Although many of the examples provided in the specification involve using IP geolocation as the source of the probabilistic client geographic locations, other sources are available through other means, for example, using a device positioning techniques (e.g., GPS-based position, Wi-Fi positioning, etc.), user preferences, user search history, and so on. The probabilistic nature of probabilistic client geographic locations identified through such means results from the fact some estimation or uncertainty may be involved in any of the foregoing techniques or different techniques may produce different results. Different probabilistic locations and different confidence levels (e.g., probabilities) may be obtained by different methods, and each of the probabilistic distributions among such geographic locations can be determined independently or collectively (e.g., a composite distribution) for the purposes of systems, methods, and computer-readable media described herein.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms of articles, such as "a", "an" and "the," include plural referents unless the content clearly indicates otherwise. Thus, for example, reference to "an element" includes a combination of two or more elements, and features attributed to that element may be features of each of the two or more elements or different elements of the two or more elements may each have different, potentially overlapping, subsets of the attributed features. Words related to numbering used herein—such as "primary," "secondary," "first," "second," "third" or other ordinal numbers—are merely descriptive and do not define or connote any specific order or degree of importance except as expressly qualified herein. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic, optical, or magnetic quantities within memories, registers, or other information storage devices, transmission devices, or display devices of the special purpose computer or similar special purpose electronic processing/computing device.

The invention claimed is:

1. A method to provide internet-based services targeted to a geographic location, the method comprising:
receiving a request from a user to provide internet-based services based on a target geographic location;
obtaining a plurality of candidate geographic locations associated with the user, each candidate geographic location being associated with a respective candidate confidence level;
calculating, with a computer, for one of the candidate geographic locations, a respective aggregate probabilistic utility score, the aggregate probabilistic utility score being based, at least in part, on distances from the respective candidate geographic location to the other candidate geographic locations and the confidence level scores of the other candidate geographic locations;
selecting a geographic location based, at least in part, on the aggregate probabilistic utility score from among the candidate geographic locations; and
providing internet-based services to the user targeting the selected geographic location.

2. The method of claim 1, wherein calculating an aggregate probabilistic utility score further comprises:
obtaining a route-utility factor indicative of the burden of traveling from the respective candidate geographic location to one of the other candidate geographic locations; and
calculating the aggregate probabilistic utility score based on the route-utility factor.

3. The method of claim 2, wherein the route-utility factor is based, at least in part, on a driving distance between the respective candidate geographic location to the one of the other candidate geographic locations.

4. The method of claim 2, wherein the route-utility factor is based, at least in part, on an estimated driving time between the respective candidate geographic location to the one of the other candidate geographic locations.

5. The method of claim 1, wherein calculating an aggregate probabilistic utility score further comprises:
obtaining utility scores for each of the other candidate geographic locations, the utility scores being uniquely associated with the respective candidate geographic location; and
calculating the aggregate probabilistic utility score based, at least in part, on the utility scores.

6. The method of claim 5, wherein the utility scores for each of the other candidate geographic locations decrease exponentially as a function of the distance from the respective candidate geographic location.

7. The method of claim 5, wherein calculating the aggregate probabilistic utility score based, at least in part, on the utility scores further comprises:
combining the candidate confidence level for the respective candidate geographic location with the utility scores.

8. The method of claim 5, wherein calculating the aggregate probabilistic utility score based, at least in part, on the utility scores further comprises:
for each of the other candidate geographic locations, weighting the utility scores with the candidate confidence level of that candidate geographic location; and
summing the weighted the utility scores and the candidate confidence level of the respective candidate geographic location.

9. The method of claim 1, wherein the aggregate probabilistic utility score A for the respective candidate geographic location d is calculated according to the equation:

$$A_d = \sum_{c=1}^{C} (R_{cd} * P_c);$$

wherein $P_c$ is a candidate confidence level for any probabilistic client geographic location c of any plurality of candidate geographic locations having C number of candidate geographic locations;
wherein $R_{cd}$ is a route-utility factor for the candidate geographic location d and corresponding to the probabilistic client geographic location c; and
wherein $(R_{cd}*P_c)$ is a probabilistic utility score for the candidate geographic location d and corresponding to the route-utility factor $R_{cd}$.

10. The method of claim 1, further comprising:
calculating an aggregate probabilistic utility score for each of the candidate geographic locations, and
wherein providing internet-based services to the user further comprises ranking web resources in accordance with the aggregate probabilistic utility score by:
selecting the candidate geographic location with the highest aggregate probabilistic utility score as a targeted geographic location; and
responsive to the selection, ranking web resources associated with the targeted geographic location higher than the associated web resources would ranked absent the selection.

11. The method of claim 1, further comprising:
calculating an aggregate probabilistic utility score for each of the candidate geographic locations, and
wherein providing internet-based services to the user further comprises ranking web resources in accordance with the aggregate probabilistic utility score by:

selecting as targeted geographic locations candidate geographic locations with aggregate probabilistic utility scores exceeding a threshold; and responsive to the selection, ranking web resources associated with the targeted geographic locations higher than the associated web resources would ranked absent the selection.

12. The method of claim 1, wherein calculating an aggregate probabilistic utility score further comprises:
obtaining a trip-utility factor indicative of utility of a trip to one of the other candidate geographic locations to the user irrespective of distance; and
calculating the aggregate probabilistic utility score based on the trip-utility factor.

13. The method of claim 1, wherein calculating an aggregate probabilistic utility score further comprises:
obtaining a destination-utility factor indicative of utility of one of the other candidate geographic locations to the user irrespective of distance; and
calculating the aggregate probabilistic utility score based on the trip-utility factor.

14. The method of claim 13, wherein the destination-utility factor is determined based on user preferences.

15. The method of claim 1, wherein:
receiving a request to select a target geographic location to provide internet-based services to a user comprises receiving a text search query from the user; and
calculating for one of the candidate geographic locations, a respective aggregate probabilistic utility score further comprises selecting a utility-decay rate based on text of the text search query, the utility-decay rate indicating the rate at which a utility score for a candidate geographic location decays as a function of distance.

16. The method of claim 1, further comprising:
identifying an interstitial geographic location between candidate geographic locations; and
wherein the aggregate probabilistic utility score is based, at least in part, on distances to the interstitial geographic location.

17. The method of claim 1, wherein:
each of the plurality of candidate confidence levels express a relative probability that a corresponding candidate geographic location includes a positional location of a client device associated with the user;
obtaining a plurality of candidate geographic locations associated with the user further comprises:
obtaining an IP address from the client device of the user; and
querying a geolocation repository with the IP address to obtain candidate geographic locations and associated confidence levels;
the candidate geographic locations include cities;
receiving a request from a user to provide internet-based services comprises receiving a text search query; and
providing internet-based services to the user further comprises ranking web pages geocoded to the cities according to the aggregate probabilistic utility score and relevance of the web page to the text search query.

18. The method of claim 1, wherein providing internet-based services to the user further comprises:
selecting an advertisement to present to the use based, at least in part, on the aggregate probabilistic utility score; and
presenting the selected advertisement to the user.

19. A system to provide internet-based services targeted on a targeted geographic location, the system comprising:
one or more processors; and
non-transitory computer-readable storage medium having stored thereon a set of executable instructions that, when executed by the one or more processors, causes the system to perform the following operations comprising:
receiving a request from a user to provide internet-based services based on a target geographic location;
obtaining a plurality of candidate geographic locations associated with the user, each candidate geographic location being associated with a respective candidate confidence level;
calculating, with a computer, for one of the candidate geographic locations, a respective aggregate probabilistic utility score, the aggregate probabilistic utility score being based, at least in part, on distances from the respective candidate geographic location to the other candidate geographic locations and the confidence level scores of the other candidate geographic locations;
selecting a geographic location based, at least in part, on the aggregate probabilistic utility score from among the candidate geographic locations; and
providing internet-based services to the user targeting the selected geographic location.

20. A tangible, non-transitory, machine-readable medium storing instructions that when executed by a computer system, cause the computer system to perform operations comprising:
receiving a request from a user to provide internet-based services based on a target geographic location;
obtaining a plurality of candidate geographic locations associated with the user, each candidate geographic location being associated with a respective candidate confidence level;
calculating, with a computer, for one of the candidate geographic locations, a respective aggregate probabilistic utility score, the aggregate probabilistic utility score being based, at least in part, on distances from the respective candidate geographic location to the other candidate geographic locations and the confidence level scores of the other candidate geographic locations;
selecting a geographic location based, at least in part, on the aggregate probabilistic utility score from among the candidate geographic locations; and
providing internet-based services to the user targeting the selected geographic location.

* * * * *